United States Patent
Hammershøj et al.

(10) Patent No.: US 12,490,964 B2
(45) Date of Patent: Dec. 9, 2025

(54) APPLICATOR FOR ROBOTIC-ASSISTED SURGERY

(71) Applicant: Ferrosan Medical Devices A/S, Søborg (DK)

(72) Inventors: Peter Lund Hammershøj, Søborg (DK); Henning Uzoma Igwebuike, Søborg (DK); Lisbeth Nøhr Demant, Søborg (DK); Christian Brüel, Søborg (DK); Mikael Engmark, Søborg (DK); Vikram Kjøller Bhatia, Søborg (DK); Lars Tamstrup Axelsson, Søborg (DK); Simon Batchelor, Søborg (DK)

(73) Assignee: Ferrosan Medical Devices A/S, Søborg (DK)

( * ) Notice: Subject to any disclaimer, the term of this patent is extended or adjusted under 35 U.S.C. 154(b) by 0 days.

(21) Appl. No.: 18/568,044

(22) PCT Filed: Jul. 14, 2022

(86) PCT No.: PCT/EP2022/069720
§ 371 (c)(1),
(2) Date: Dec. 7, 2023

(87) PCT Pub. No.: WO2023/285589
PCT Pub. Date: Jan. 19, 2023

(65) Prior Publication Data
US 2024/0277326 A1  Aug. 22, 2024

(30) Foreign Application Priority Data

Jul. 16, 2021 (EP) .................................... 21186164
Jul. 16, 2021 (EP) .................................... 21186177
(Continued)

(51) Int. Cl.
*A61B 17/00* (2006.01)
*A61B 34/30* (2016.01)

(52) U.S. Cl.
CPC .. *A61B 17/00491* (2013.01); *A61B 17/00234* (2013.01); *A61B 34/30* (2016.02);
(Continued)

(58) Field of Classification Search
CPC ........ A61B 17/00491; A61B 17/00234; A61B 34/30; A61B 2017/00876;
(Continued)

(56) References Cited

U.S. PATENT DOCUMENTS

| 5,754,741 A | 5/1998 | Wang et al. |
| 10,194,906 B2 | 2/2019 | Auld et al. |

(Continued)

FOREIGN PATENT DOCUMENTS

| CA | 2295249 | 7/2001 |
| EP | 1876962 | 1/2008 |

(Continued)

OTHER PUBLICATIONS

Li et al., Haptic Feedback Modalities for Minimally Invasive Surgery, 2018, pp. 229-249.
(Continued)

*Primary Examiner* — Katherine M Shi
(74) *Attorney, Agent, or Firm* — Hamilton, Brook, Smith & Reynolds, P.C.

(57) ABSTRACT

The present disclosure relates to a laparoscopic applicator for dispensing a substance, e.g. a substance comprising a haemostatic agent, at a selected site by means of a surgical robotic arm, the laparoscopic applicator comprising a delivery tube; and an applicator tip connected to a distal end of the delivery tube, wherein the applicator tip is configured for being controllable operated by the robotic arm by a grip
(Continued)

section in axial extension of the delivery tube, the grip section having a perimeter transverse to the axis comprising an apex shaped section, such that the grip section is configured for being clamped and spatially manipulated by the robotic arm.

20 Claims, 50 Drawing Sheets

(30) Foreign Application Priority Data

Jan. 14, 2022 (WO) .................. PCT/EP2022/050707
Mar. 24, 2022 (EP) ..................................... 22164064

(52) U.S. Cl.
CPC ............... *A61B 2017/00876* (2013.01); *A61B 2017/00946* (2013.01); *A61B 2034/301* (2016.02); *A61B 2034/305* (2016.02)

(58) Field of Classification Search
CPC .... A61B 2017/00946; A61B 2034/301; A61B 2034/305; A61B 2017/00398; A61B 2017/00495; A61B 2017/00862; A61B 2034/302; A61B 34/35; A61B 34/37; A61M 5/1452
See application file for complete search history.

(56) References Cited

U.S. PATENT DOCUMENTS

| | | | |
|---|---|---|---|
| 2003/0100824 | A1 | 5/2003 | Warren et al. |
| 2003/0236573 | A1 | 12/2003 | Evans et al. |
| 2007/0299404 | A1 | 12/2007 | Katoh et al. |
| 2008/0103452 | A1* | 5/2008 | Voegele ........... A61B 17/00491 604/187 |
| 2009/0171332 | A1 | 7/2009 | Bonneau |
| 2009/0247985 | A1 | 10/2009 | Melsheimer et al. |
| 2009/0281500 | A1 | 11/2009 | Acosta et al. |
| 2010/0312186 | A1 | 12/2010 | Suchdev et al. |
| 2012/0289894 | A1 | 11/2012 | Douglas et al. |
| 2013/0261605 | A1 | 10/2013 | Gregersen et al. |
| 2014/0276633 | A1 | 9/2014 | Visveshwara |
| 2015/0112352 | A1 | 4/2015 | Krause et al. |
| 2016/0074117 | A1 | 3/2016 | Mohr |
| 2017/0065346 | A1 | 3/2017 | Weisberg et al. |
| 2019/0200844 | A1 | 7/2019 | Shelton, IV et al. |
| 2020/0015897 | A1 | 1/2020 | Scheib et al. |
| 2021/0060308 | A1 | 3/2021 | Willard et al. |

FOREIGN PATENT DOCUMENTS

| | | |
|---|---|---|
| EP | 1915950 | 4/2008 |
| JP | 6610867 | 11/2019 |
| WO | WO 99/44509 | 9/1999 |
| WO | WO 2012/124595 | 9/2012 |
| WO | WO 2012/158516 | 11/2012 |
| WO | WO 2013/163549 | 10/2013 |
| WO | WO 2016/138018 | 9/2016 |
| WO | WO 2017/220822 | 12/2017 |
| WO | WO 2019/134007 | 7/2019 |
| WO | WO 2020/096587 | 5/2020 |
| WO | WO 2021/007542 | 1/2021 |
| WO | WO 2021/013714 | 1/2021 |
| WO | WO 2022/015442 | 1/2022 |
| WO | WO 2022/152824 A1 | 7/2022 |
| WO | WO 2022/180476 | 9/2022 |

OTHER PUBLICATIONS

Notification of Transmittal of the International Search Report and the Written Opinion of the International Searching Authority, or the Declaration for International Application No. PCT/EP2022/050707, "Applicator for Robot-Assisted Surgery" date of mailing: Apr. 12, 2022.
International Preliminary Report on Patentability and Annex for International Application No. PCT/EP2022/050707, "Applicator for Robot-Assisted Surgery" date of completion: Apr. 14, 2023.
International Preliminary Report on Patentability for International Application No. PCT/EP2022/069720, "Applicator for Robotic-Assisted Surgery", date of completion: Nov. 22, 2023.
Notification of Transmittal of the International Search Report and the Written Opinion of the International Searching Authority, or the Declaration for International Application No. PCT/EP2022/069720, "Applicator for Robot-Assisted Surgery" date of mailing: Nov. 8, 2022.

* cited by examiner (A)

(B)

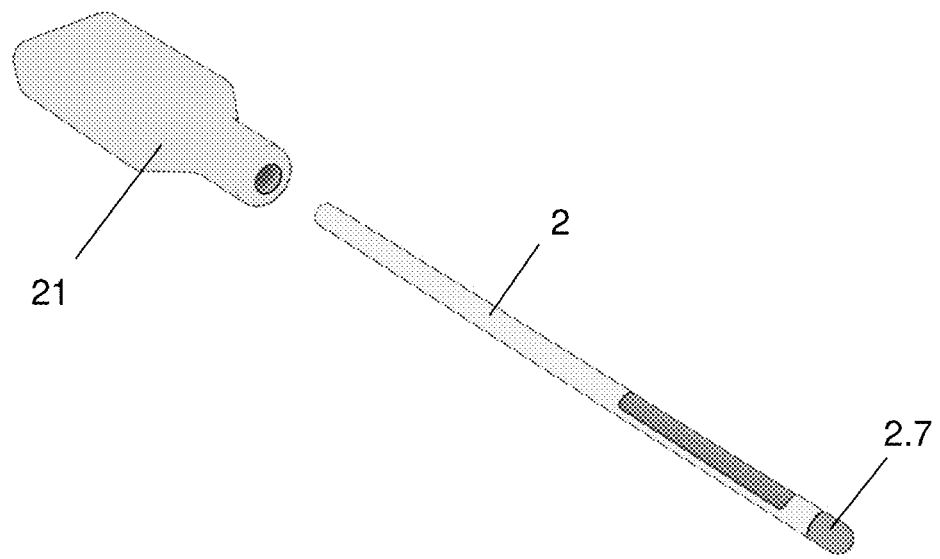
FIG. 27
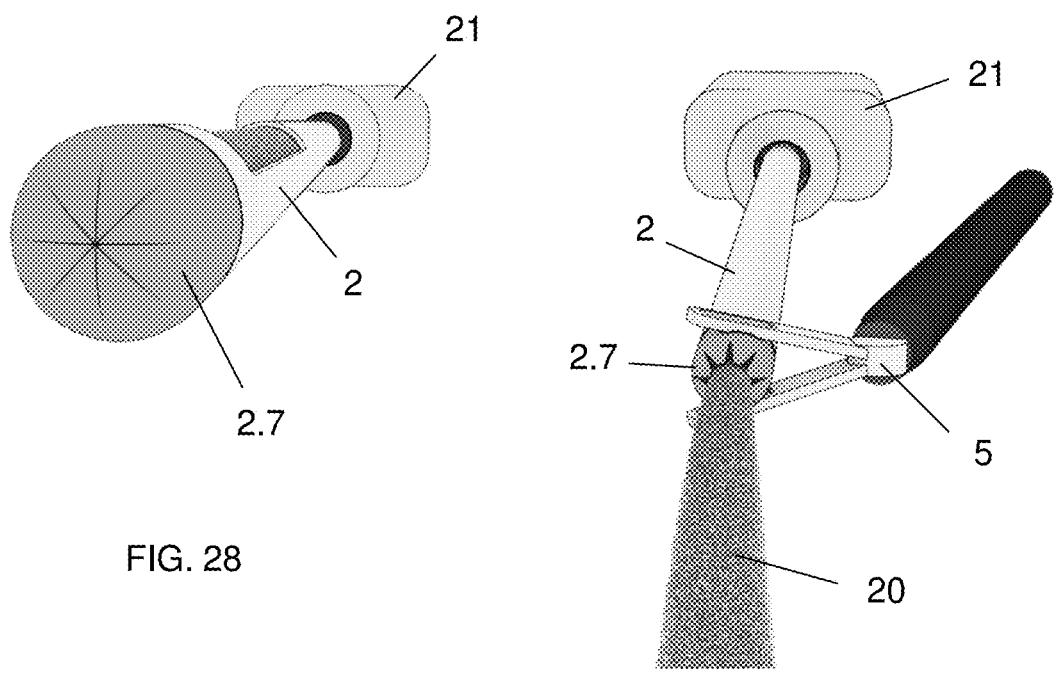
FIG. 28
FIG. 29

(A)

(B)

(A)

(B)

(A)

(B)

(A)

(B)

(C)

(A)

(B)

(A)

29.2   29

(B)

29.2   29

(C)

29.2   29

(D)

29.2   29

(E)

(F)

(A)

(B)

(C)

APPLICATOR FOR ROBOTIC-ASSISTED SURGERY

This application is the U.S. National Stage of International Application No. PCT/EP2022/069720, filed Jul. 14, 2022, which designates the U.S., published in English, and claims priority under 35 U.S.C. § 119 or 365(c) to European Application No. 22164064.2, filed Mar. 24, 2022, European Application No. 21186177.8, filed Jul. 16, 2021, and European Application No. 21186164.6, filed Jul. 16, 2021, and International Application No. PCT/EP2022/050707, filed Jan. 14, 2022. The entire teachings of the above applications are incorporated herein by reference.

TECHNICAL FIELD

The present disclosure relates to an applicator, more specifically a laparoscopic applicator for dispensing a medical substance or fluid at a selected site by means of a surgical robotic arm. The invention further relates to a laparoscopic applicator tip for the laparoscopic applicator, a kit of parts comprising said applicator tip and/or applicator.

BACKGROUND

Robotic systems are increasingly used in surgery, particularly minimally invasive surgical procedures, to avoid the more invasive traditional open surgery techniques. A robotic system includes a number of robotic arms to which medical devices are attached, and where the robotic arms and the medical devices are controlled and manipulated by the surgeon from a console, e.g. via control devices such as a joystick and foot pedal. Hence, the robotic arms replace the surgeon's hands at the surgical site, and the surgeon is instead located remotely from the patient and views the surgical site via a display showing a three-dimensional view of the surgical site.

Similarly to traditional open surgery techniques, where an assistant provides the physically present surgeon with the required medical devices, in robotic surgery an assistant is positioned near the robotic arms to provide the arms with the required medical devices. For example, the assistant may replace the medical devices of the robotic arms, and provide medical fluids, either directly as a medical device to the robotic arm, or via an applicator tube introduced into the body via a trocar port.

Surgical haemostatics, as well as other medical fluids and pastes, are traditionally dispensed to a target site by use of a manually operated syringe comprising the paste within the syringe barrel. However, for minimally invasive surgical procedures, the target site is not directly accessible to syringe cannula. Hence, to dispense paste to a target site within a bodily cavity, an elongated applicator tube prefilled with the paste is typically introduced into the body via a trocar port. The insertion of the elongated applicator tube occurs at the trocar port, and is therefore not visible to the surgeon performing the minimally invasive surgical procedure, because the surgeon's field of view is limited to the display showing the internal target site in high-definition. Thus, the insertion of the applicator tube, as well as the dispensing of the paste from the applicator tube, is typically performed by the surgeon's assistant, via oral instructions of the surgeon. Consequently, the dispensing of the paste using the presently available systems is not controlled directly by the surgeon.

U.S. Pat. No. 9,636,177 discloses a robotic arm to which a haemostatic applicator, comprising a catheter and a syringe filled with a haemostatic agent, is attached, and where the haemostatic agent is discharged from the catheter to the surgical site, when the surgeon depresses a button actuating the syringe plunger.

US 2012/0289894 discloses a suction/irrigation device for laparoscopic surgery, comprising a tip graspable by a robotic tool. The supply of liquid/vacuum to the device is delivered from a remotely located valvular unit including valves located outside and remotely from the surgical field. Hence, the device is adapted for irrigation with free-flowing fluids, such as liquids and gasses, from a remote source.

EP 1 915 950 discloses an adhesive applier, where the distal applicator tip may be moved via cables extending to a proximal manual handle. Similarly, US 2009/171332 discloses a distal applicator tip which may be moved by cables.

To further improve robotic-assisted surgery, medical devices that are adapted to be controlled by robotic arms, and hence directly by the surgeon, are desired. Particularly, there is a need for devices which may be controlled by robotic arms with a higher precision, accuracy, and intuitive haptic control, such that the reproduced remote operation of the robotic arm simulates the surgeon's interactions to a higher degree. Furthermore, there is a desire to have medical devices that give feedback to the surgeon, e.g. relating to the amount of paste available in the elongated applicator tube.

SUMMARY OF INVENTION

The present disclosure relates to an applicator, which is particularly suitable for robotic-assisted surgery. Particularly, the present disclosure provides an applicator suitable for insertion into a trocar port and having an applicator tip, where the orientation and/or the activity of the applicator, is actuated via the inserted applicator's distal end or the applicator tip. Thus, the applicator may be manipulated and activated via the applicator tip, and hence it is particularly suitable for being manipulated and activated by a robotic arm interacting with the applicator distal end/tip e.g. intra-abdominally during the medical procedure at the surgical site, e.g. wherein the applicator is configured for intra-abdominal delivery of a medical substance. The medical substance may be a medical fluid, a medical paste and/or a medical powder.

Replacing the movements of actual human hands by robotic arms controlled by computer software, facilitates very precise and controlled movements. Hence, a laparoscopic applicator being spatially manipulated by a robotic arm may be more precise and accurately controlled, as well as being more reliable with reduced risk of accidental movements, which are critical during surgery. Thus, for example a laparoscopic applicator for dispensing a medical substance by means of a robotic arm, will be able to dispense the substance at a selected site more precisely and reliably. Specifically, a robotic manipulated applicator for dispensing a haemostatic substance at a selected site, may result in a bleeding being stopped more efficiently.

Since robotic arms and fingers as such have restricted haptic feedback and design compared to human hands, the means for manipulating and/or activating the applicator's distal end/tip may advantageously be adapted for robotic arms/fingers to enhance the safety, accuracy and reliability of the applicator.

Applicator and Applicator Tip

Hence, the present disclosure is generally related to an applicator, which orientation and/or activity may be accurately and reliably controlled by a robotic arm with restricted design and haptic feedback. Particularly, the present disclosure is generally related to an applicator having an applicator tip configured for being controllable operated by the robotic arm, such that only the tip needs to be accessible and visible to robotic arm.

A first aspect of the present disclosure relates to a laparoscopic applicator for dispensing or withdrawing a substance, such as a substance comprising a haemostatic agent, at a selected site by means of a surgical robotic arm, the laparoscopic applicator comprising:

a delivery tube for holding the substance; and
an applicator tip connected to a distal end of the delivery tube, the applicator tip configured for:
being spatially manipulated by the robotic arm, and/or controllably releasing the substance from the delivery tube by the robotic arm, or controllably withdrawing the substance from the selected site into the delivery tube.

Preferably, the applicator tip is configured for being controllable operated by the robotic arm by either the tip being spatially manipulated by the robotic arm, and/or the tip being configured for releasing/withdrawing substance by the robotic arm.

Spatial manipulation of the applicator tip by a robotic arm may be obtained by the robotic arm physically contacting the applicator tip. To ensure precise and reliable spatial manipulation, the applicator tip is advantageously configured to be gripped by the robotic arm, such that at least two opposing contact points are obtained, thereby providing a stable and robust contact. For example, the applicator tip may be configured to be gripped by the robotic arm in the manner of a tweezer having a gripping direction in parallel with the longitudinal axis of the applicator and tip and substance flow direction. Hence, the tweezer jaws are gripping or clamping around a cross section or perimeter transverse to the axis of the applicator tip. This is particularly obtained, when the applicator tip comprises a grip section in axial extension of the delivery tube and configured to be gripped and spatially manipulated by the robotic arm, where the grip section has a cross section shape or a shape of the perimeter transverse to the axis, where the shape is particularly stable and robust towards a robotic grip force, and especially towards stronger and non-tactile robotic grip forces. Advantageously, the grip section has a cross section or perimeter shape comprising an apex shaped section, such that at least a part of the apex shape may essentially match the gripping parts of the robotic arm, such that a more efficient contact area and contact surface may be obtained. Typically, the grip of a robotic arm is a jaw grip, and the apex shape may correspondingly be an ellipse or triangle.

Hence, a related first aspect of the present disclosure, relates to a laparoscopic applicator for dispensing a substance, e.g. a substance comprising a haemostatic agent, at a selected site by means of a surgical robotic arm, the laparoscopic applicator comprising:

a delivery tube; and
an applicator tip connected to a distal end of the delivery tube, the applicator tip configured for being controllable operated by the robotic arm by a grip section, in axial extension of the delivery tube, the grip section having a perimeter transverse to the axis comprising an apex shaped section, such that the grip section is configured for being clamped and spatially manipulated by the robotic arm.

Further, to ensure simple, precise and reliable spatial manipulation, the delivery tube is advantageously configured to be flexible, deformable, and configured to be mechanically stress free or stress released upon the deformation associated with the tip manipulation. The spatial discharge of the substance is mainly determined by the orientation of the distal end of the delivery tube and/or the orientation of the applicator tip. A flexible orientation of the distal end/applicator tip may be obtained by a partially deformable applicator, e.g. wherein at least a part of the delivery tube is stretchable and/or flexible. Hence, the delivery tube may comprise a deformable section. In addition or alternatively, the delivery tube may comprise an energy dissipating material and/or a material with lower elastic modulus, such that tension built-up within the delivery tube is reduced or eliminated. To facilitate that the delivery tube may be both spatially manipulated with minimal tension build-up to and at a target site within a bodily cavity, while also being easily introduced or inserted and directed from the surroundings to the target site, the applicator advantageously further comprises an insertion guide for at least temporarily supporting a mechanically deformable and soft delivery tube during insertion. A temporarily or provisional mechanical support may be in the form of a partially supporting frame or a retractable frame.

The distal end of the tube/applicator tip is preferably manipulated by a robotic arm during laparoscopic surgery, such that the surgeon may orient and position the distal end/tip by use of the robotic arm. In order to reduce the risk of the robotic arm squeezing, breaking or kinking the applicator during the manipulation, the applicator may include a surface area adapted for safe interaction with the robotic arm. For example, the applicator may include a rigid section, which is less deformable and therefore particularly tangible and adapted for safe manipulation by the robotic arm. The rigid section may be provided on the delivery tube and/or on the applicator tip. The release of the substance is preferably controlled by the robotic arm in-situ during the laparoscopic surgery. Thus, the applicator may include at least one actuator adapted for safe interaction with a robotic arm, such as an actuator configured to be activated by a specific pressure level and/or a specific pressure orientation applicable via a robotic arm. The actuator(s) may alternatively be activated by pulling or rotation of the actuator. Hence, the substance release may be activated by the robotic arm in-situ, and thus be activated by the surgeon controlling the robotic arm. Alternatively, the substance release may be activated remotely from the target site, e.g. activated by the assistant.

Advantageously, the delivery tube of the applicator is configured for holding the substance under a pressure or holding a pressurized substance at least immediately before the substance is discharged. This may provide a more precise and reliable discharge of a substance at a determined site and at a determined time, For example, this has the advantage that the substance may be released from the delivery tube by a simple interaction with the applicator tip without significant time delay.

Thus, a related aspect of the present disclosure relates to a laparoscopic applicator for dispensing or withdrawing a substance, such as a substance comprising a haemostatic agent, at a selected site by means of a surgical robotic arm, the laparoscopic applicator comprising:

a delivery tube configured for holding the substance under a pressure, and
an applicator tip connected to a distal end of the delivery tube, the applicator tip configured for controllably releasing the substance from the delivery tube by the robotic arm.

Depending on the form of the substance to be pressurized, the distal end of the delivery tube may thus include one or more flow controlling elements, such as valves adapted such that the substance may be contained and pressurized within the delivery tube. Alternatively or in addition, the delivery tube may be dimensioned such that the substance may be pressurized due to the capillary forces present. The capillary forces may also be defined as the pressure drop occurring across the length of the delivery tube. Hence, the delivery tube, and particularly the applicator tip, is advantageously dimensionally configured for holding the substance under a pressure or holding a pressurized substance, and/or configured to include one or more flow controlling elements.

A second aspect of the present disclosure relates to a laparoscopic applicator tip for connecting to a laparoscopic delivery tube for holding a substance, such as a substance comprising a haemostatic agent, the applicator tip comprising:
  at least one valve configured for releasing the substance from the delivery tube upon opening of said valve; and
  at least one actuator configured to open/close the at least one valve.

The applicator tip may be detachably attached to the distal end of the delivery tube, which allows reusing the tip while discarding the delivery tube (possibly including the fluid source or pressure source, as further described below). Accordingly, the delivery tube and/or the applicator tip and/or the fluid source may be disposable/configured for single-use. Alternatively, the applicator tip may be an integral part of the delivery tube, such that the delivery tube and the applicator tip is a single unit. In some embodiments, the applicator tip simply refers to the distal end of the delivery tube. The applicator tip may comprise a rigid section configured to be gripped by the robotic arm. The applicator tip may further comprise an adjustable nozzle for adjusting the dispensing rate and or dispensing angle of the substance. The applicator tip may further comprise a pressure sensor, such as a resistive film pressure sensor, for sensing a pressure applied to the actuator (e.g. by the robotic arm). In this case, the applicator tip preferably further comprises a pressure indicator light for indicating the pressure applied to the at least one actuator.

Kit of Parts

The applicator according to the present disclosure may be provided as a part in a kit of parts for laparoscopic procedures, and particularly as a kit of parts suitable for robotic-assisted surgery. Optionally, the applicator may be provided as separate parts of the kit, e.g. as a delivery tube and an applicator tip, which upon assembly forms the applicator according to the first aspect, The kit may optionally further comprise one or more substance reservoirs for loading or charging the delivery tube prior to use. For example, the substance reservoir may be a syringe configured to be filled with a substance and configured for forming a fluid connection to the delivery tube of the applicator, such as the distal opening of the delivery tube.

To reduce the number of parts and to simplify the assembly, the kit of parts may comprise the applicator and a pressure source, which is easily assembled and which upon assembly is configured for delivering a substance under pressure. For example, the pressure source may be a gas cartridge configured for forming a fluid connection to the delivery tube of the applicator, such as the proximal opening of the delivery tube.

To further simplify the assembly, the one or more pressure sources may be integrated into the applicator. For example, the pressure source may be integrated into the delivery tube in the form of a spring located at a proximal end, where the spring energy is pre-stored and/or stored upon loading the delivery tube with a substance.

A third aspect of the disclosure relates to a kit of parts comprising the applicator according to the first aspect, or the applicator tip according to the second aspect, one or more pressure sources, and optionally one or more substance reservoirs. For example, the substance reservoirs may be one or more syringes configured to be filled with a substance and configured for forming a fluid connection to the delivery tube, such as the distal opening of the delivery tube. An embodiment relates to a kit of parts comprising the applicator according to the first aspect, one or more pressure sources, and optionally a syringe configured to be filled with a substance The kit of parts has the advantage that all parts may be manually assembled and operated, and that all the parts are disposable after use and adapted for single-use.

Alternatively, the kit of parts may include parts adapted for multiple uses to obtain a more reproducible and sustainable applicator design. For example, the applicator may be assembled into a reusable unit or holder, which may include the pressure source in the form of a reusable piston or motor.

The kit of parts may further comprise a driver unit for holding the parts, i.e. the applicator and the pressure source.

A fourth aspect of the present disclosure relates to a kit of parts comprising:
  the laparoscopic applicator according to the first aspect, and
  a driver unit for holding:
    at least one fluid source for holding a fluid, said fluid source being in fluid connection with the delivery tube; and/or
    at least one pressure source, such as a motor, configured for applying a pressure to the at least one fluid source and/or configured for applying a pressure to the inside of the delivery tube.

To further increase the sustainable impact, the driver unit may be refilled with the fluid source. Hence, the kit of parts optionally comprises one or more fluid source reservoirs, where the fluid source reservoirs are configured to be detachably attached to the fluid source within the driver unit.

Pressure Source

The release of a substance, e.g. a medical paste, from the applicator implies that the substance held within the tube is being pushed through the delivery tube to the distal end and tip, where it is expelled and dispensed. The pressure source for pressurizing the substance within the applicator may be any sufficient pressure source, e.g. in the form of a solid stylus or a fluid being forced to advance into the tube via a manually or motor driven piston, spring force, and/or trigger.

For precise and reliable discharge of a substance at a determined site and at a determined time, the delivery tube or applicator tip is advantageously configured for holding the substance under a pressure, at least immediately before the substance is discharged. Depending on the form of the substance to be pressurized, the distal end of the delivery tube or the applicator tip may include one or more flow controlling elements, such as valves adapted such that the substance may be contained and pressurized within the delivery tube. Alternatively, the delivery tube may be dimensioned such that the substance may be pressurized due to the capillary forces present.

A fifth aspect of the disclosure relates to a laparoscopic applicator further comprising at least one pressure source configured for applying a pressure to the at least one fluid source and/or configured for applying a pressure to the inside of the delivery tube, such as the substance within the delivery tube.

Hence, the pressure source advantageously comprise a drive mechanism configured for moving the at least one fluid source and/or the substance within the delivery tube towards the distal end. The drive mechanism may be mechanically and/or electrically operated. For example, the at least one pressure source may comprise a drive mechanism, selected from the group of: manual piston, motorized piston, spring force, and gas pressure.

Mechanical Drive Mechanism

For easy assembly of the kits according to the third and fourth aspects, reducing the numbers of operative steps, and for manual operation of the laparoscopic applicator, the pressure source may advantageously comprise a predefined and/or controllable pressure force. For example, the pressure source may include a fluid source comprising a predefined propellant, such as a predefined gaseous pressure within a gas cartridge or a syringe with a predefined amount of liquid. Alternatively, the pressure source may be a spring with a predefined spring energy stored. Thus, the drive mechanism of the pressure source is mechanically controlled. For example, by simple assembly of the applicator and the pressure source, the applicator is adapted for dispensing a (medical) substance, such as a medical paste.

Electrical Drive Mechanism

In addition or alternatively, the drive mechanism of the pressure source may be controllable via a motor, e.g. as a piston driven by a motor, which pressurizes the substance within the delivery tube and provides discharge of the substance. The pressure source may also be a fluid flow driven by a motor, e.g. a fluid flow obtained from bellows, piston, paddle wheel, or a compressor, which pressurizes and dispenses the substance from the delivery tube. Thus, the drive mechanism of the pressure source is motor or electrically controlled. For example, an actuator of the laparoscopic applicator or applicator tip may be configured to send an electrical signal to the drive mechanism or motor, which upon receipt of the electrical signal is configured to exert a pressure on the pressure source or the substance within the delivery tube.

Powder

The laparoscopic applicator is configured for dispensing or withdrawing a substance comprising a haemostatic agent, and said substance may be in the form of a liquid, a paste, or a powder. Due to the flow characteristics of powders, the pressure source or drive mechanism for transporting the haemostatic powder through the delivery tube to the outside of the delivery tube advantageously comprises a combination of a variable rate feeder, such as a screw conveyor, or a vibrating device, in combination with a gas pressure source.

A sixth aspect of the present disclosure relates to a laparoscopic applicator for dispensing a haemostatic powder at a selected site by means of a surgical robotic arm, the laparoscopic applicator comprising:
 a delivery tube holding the haemostatic powder; and
 a variable rate feeder, such as a screw conveyor, configured for transporting the haemostatic powder through the delivery tube to the outside of the delivery tube, whereby the haemostatic powder is dispensed from the applicator.

A seventh aspect of the present disclosure relates to a laparoscopic applicator for dispensing a haemostatic powder at a selected site by means of a surgical robotic arm, the laparoscopic applicator comprising:
 a delivery tube holding the haemostatic powder;
 a valve located at a distal end of the delivery tube, wherein the valve is configured to open at a pre-defined opening pressure; and
 a vibrating device, such as an ultrasonic vibrating device, configured for shaking the haemostatic powder out of the delivery tube when the valve is open.

Preferably, the applicator for dispensing a haemostatic powder further comprises one or more pressure sources, such as one or more gas pressure sources configured for transporting the haemostatic powder through the delivery tube. The gas pressure source may for example be a motorized gas pressure source, or a pressurized container, such as a gas cartridge. A pressurized container may be characterized as having pressure energy stored, where the pressure energy may be converted to kinetic energy by releasing the pressure, e.g. upon manually opening the container. For example, a pressurized container may contain a fluid, and the fluid is discharged from the container simultaneously as the pressure is released.

An eighth aspect of the present disclosure relates to use of the laparoscopic applicator according to the first aspect, to dispense a substance, such as a substance comprising a haemostatic agent, from the applicator.

DESCRIPTION OF DRAWINGS

The invention will in the following be described in greater detail with reference to the accompanying drawings.

FIG. 27 shows an embodiment of the applicator according to the present disclosure, wherein the applicator comprises a vibrating device for shaking a powder through the delivery tube.

FIG. 28 shows the embodiment of FIG. 27 from another angle, wherein the end of the valve is visible.

FIG. 29 shows the embodiment of FIG. 27 from another angle, wherein a robotic arm is squeezing the valve, thereby forcing the valve to open such that powder is released from the applicator.

DETAILED DESCRIPTION

Figure 1:
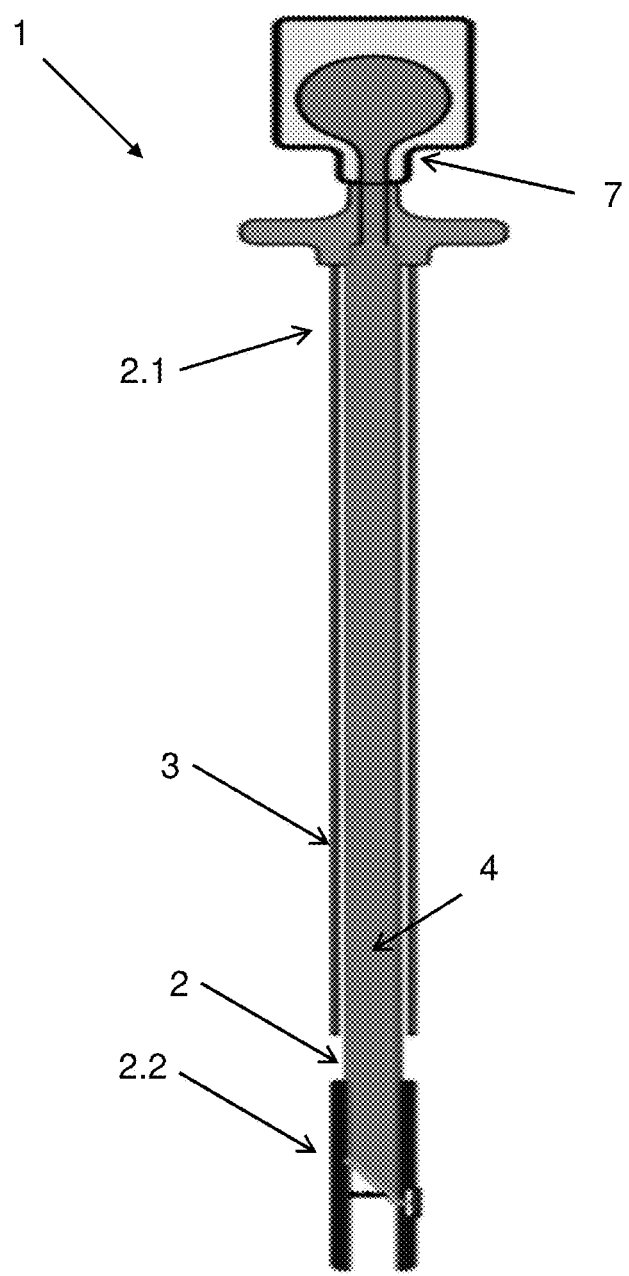
FIG. 1 shows an embodiment of an applicator according to the present disclosure.

The invention is described below with the help of the accompanying figures. It would be appreciated by the people skilled in the art that the same feature or component of the device are referred with the same reference numeral in different figures. A list of the reference numbers can be found at the end of the detailed description section.

Applicator for Dispensing a Substance

For surgical procedures, and particularly endoscopic and/or laparoscopic procedures, a substance such as a medical substance such as a surgical haemostatic substance e.g. in the form of a powder, a fluid or a paste, is dispensed to a target site within a body cavity, via an elongated applicator 1 comprising a delivery tube 2 prefilled with the medical fluid/paste/powder 4, or configured to be filled with the medical fluid/paste/powder during the surgery, as illustrated in FIG. 1. The delivery tube may also be referred to as a cannula, and the inner lumen of the tube or cannula may also be referred to as a flow channel for the substance. The distal end 2.2 of the delivery tube may be introduced into the body cavity e.g. via a trocar port, e.g. manually by an assistant. To facilitate the handling and insertion of the delivery tube, which may be flexible, the applicator advantageously comprises a rigid sheath 3 configured for inserting the delivery tube into the trocar. The rigid sheath may for example be in the form of a rigid tubular sheath, which may be positioned around a section of the delivery tube, such as attached to a section of the delivery tube, or forming a coating layer around a section of the outer delivery tube, as illustrated in FIG. 1.

The delivery tube can have an inner diameter, or an inner lumen with a diameter, of approximately 1-8 mm, e.g. approximately 5 mm, which will ensure a good flow of the substance without the need for much power from the pressure source or the variable rate feeder for transporting the substance through the delivery tube. The delivery tube may have an inner diameter of less than 5 mm, or less than 3 mm, or less than 2 mm. In case the delivery tube comprises a plurality of lumens, the inner diameter refers to the inner diameter of the lumen configured to contain the substance to be dispensed.

In case the delivery tube or a lumen for holding the substance has an inner diameter of less than 2 mm, this implies that only a small residue of the substance will be left in the delivery tube after the dispense of the substance.

In an embodiment of the disclosure, the applicator further comprises a rigid sheath configured for inserting the delivery tube into a trocar, such as a sheath configured to be positioned around a section of the delivery tube.

The delivery tube may be prefilled with the substance (e.g. a medical fluid, paste or powder), and/or configured to be filled with the substance after insertion into the trocar port. Accordingly, the delivery tube may contain a substance, such as a substance comprising a bioactive agent, said substance being in the form of a fluid, a paste, or a powder. The substance may be a haemostatic substance comprising a haemostatic agent. Advantageously, the filling of the delivery tube may be performed via the proximal end 2.1 of the delivery tube, which is accessible to the surgeon or an assistant during surgery, as illustrated in FIG. 1. The filling of the delivery tube is advantageously done using a separate syringe comprising the substance within a syringe barrel, where the syringe may be prefilled with the substance, or configured for aspirating the substance from a substance source such as a medical fluid source. Hence, the container or syringe comprising the substance may be referred to as a substance reservoir 24. To facilitate safe and precise filling with a minimum of substance waste, the proximal end 2.1 advantageously comprises one or more connectors 6 for detachably attaching the fluid source, such as a syringe prefilled with the substance. An example of a connector is a Luer lock for attaching a syringe, or a compression joint or adhesive joint for attaching a substance reservoir or fluid container. Alternatively, the delivery tube and the fluid source, e.g. the syringe, may be attached without the use of a connector.

The substance is subsequently dispensed from the filled delivery tube by a driving force, such as a pressure source 8. The driving force for expelling the substance is advantageously a pressure generated at the proximal end 2.1 of the delivery tube, which is directly accessible to the assistant during surgery. For example, the pressure may be generated by a second fluid, which is forced to enter the proximal end from a separate fluid source 7, and thereby pressurizing the substance present within the delivery tube, as seen from FIG. 1.

In an embodiment of the disclosure, the applicator further comprises at least one pressure source configured for applying a pressure to the at least one fluid source and/or configured for applying a pressure to the inside of the delivery tube, such as the substance within the delivery tube.

It follows that the pressure source advantageously comprise a drive mechanism configured for moving the at least one fluid source and/or the substance within the delivery tube towards the distal end. The drive mechanism may be mechanically and/or electrically operated. For example, the at least one pressure source may comprise a drive mechanism, selected from the group of: manual piston, motorized piston, spring force, and gas pressure.

Further advantageously, the pressure of the second fluid is predefined and/or controllable, e.g. by being in the form of a predefined pressurized fluid source, where the predefined pressure is released upon fluid connection with the proximal end of the delivery tube. To facilitate safe and precise pressure transfer, the proximal end of the delivery tube advantageously comprises one or more connectors 6 for detachably attaching the pressure source 8 or fluid source 7, such as a fluid container, and more preferably a fluid container configured to be pressurized.

Further advantageously, the fluid connectors are configured for forming a fluid connection between the fluid source and the proximal end of the delivery tube upon connection, e.g. in the same manner as a vial adapter wherein a rubber sealing of the fluid source is pierced by a hollow piercing element. Hence, a fluid connection may be obtained between a sealed fluid source and the delivery tube via the piercing element. Alternatively, the fluid source does not need to be pierced in order to form a fluid connection. Instead, it may simply be attached to the delivery tube, either directly (e.g. tube and syringe connected) or via a connector.

In an embodiment of the disclosure, the proximal end of the delivery tube comprises one or more connectors 6 for detachably attaching the fluid source, such as a Luer lock, a compression joint, and/or an adhesive joint for attaching a syringe and/or a fluid container. In a further or alternative embodiment, the one or more connectors comprise a hollow piercing element for piercing the fluid source, whereby a fluid connection between the fluid source and the delivery tube is established.

Hence, the drive mechanism of the pressure source may be mechanically controlled by the attachment of the pressure source to the applicator. Thus by the mechanical assembly, the applicator is adapted for dispensing a (medical) substance, such as a medical paste.

In addition or alternatively, the drive mechanism of the pressure source may be controllable via a motor, e.g. as a piston driven by a motor, which pressurizes the substance within the delivery tube or the fluid source, and hence provides discharge of the substance. For example, the pressure source 8 may be a fluid source 7 flow driven by a motor, Thus, the drive mechanism of the pressure source is motor or electrically controlled.

Advantageously, the delivery tube of the applicator is configured for holding the substance under a pressure or holding a pressurized substance at least immediately before the substance is discharged. This provides a more precise and reliable discharge of a substance at a determined site and at a determined time, For example, this has the advantage that the substance may be released from the delivery tube by a simple interaction with the applicator tip without significant time delay.

Depending on the form of the substance to be pressurized, the distal end of the delivery tube may thus include one or more flow controlling elements 26, such as valves adapted such that the substance may be contained and pressurized within the delivery tube. For example, the applicator tip may comprise at least one valve configured for holding and releasing the substance under a pressure, or a flow controlling element, such as a three-way valve. In addition, or alternatively, the valve may be a constriction valve. A valve is defined as a device that regulates, directs or controls the flow of a fluids (i.e. gases, liquids, and fluidized solids, such as paste and slurries) by opening, closing, and/or partially obstructing the flow passageway. Thus, an example of a valve includes a flow constriction element, such as a protrusion within a fluid passageway, where the protrusion blocks fluid passage, when the fluid pressure is below a threshold value, and when the fluid pressure is above the threshold valued, the fluid flows and circumvents the protrusion. A valve including a flow constriction element is also referred to as a "constriction valve".

In an embodiment of the disclosure, the delivery tube is configured for holding the substance under a pressure or holding a pressurized substance. In another or further embodiment, the laparoscopic applicator tip comprises at least one valve configured for holding and releasing the substance under a pressure. For example the valve may comprise a flow controller, such as a tree-way valve, which may control the amount and direction of a flow.

Alternatively, or in addition, the delivery tube and/or applicator tip may be dimensioned such that the substance may be pressurized within the delivery tube due to the capillary forces present. Hence, advantageously, the delivery tube has a length above 200 mm, preferably a length between 300-600 mm or 350-500 mm, such as 440 mm or 500 mm, where the length is defined as going from the proximal pressure source to the distal end of the tip. Further, the outer diameter of the delivery tube is preferably between 3-10 mm, such as 5 mm; or between 2.5-4.5 mm, such as 3, 3.5, or 4 mm. Further, the inner diameter or lumen of the delivery tube, or at least the inner diameter of the applicator tip, is preferably equal to or less than 2 mm, preferably between 1.5-2.0 mm, such as 1.5, 1.6, 1.7, 1.8, or 1.9 mm. Further, the applicator tip may comprise an inner diameter or lumen, which is the same or has a different shape or size than the inner diameter of the main delivery tube, as e.g. the grip section shown in FIG. 46A. For example the delivery tube may comprise a lumen with a cross sectional diameter (indicated as D_FC in FIG. 46A) of between 1.2-1.5 mm or a cross sectional area corresponding to a diameter of between 1.2-1.5 mm for a non-circular shaped lumen or flow channel. In case the delivery tube comprises a plurality of lumens, the inner diameter refers to the inner diameter of the lumen configured to contain the substance to be dispensed. In case the delivery tube or a lumen for holding the substance has an inner diameter of less than 2 mm, this implies that only a small residue of the substance will be left in the delivery tube after the dispense of the substance.

Hence, the delivery tube, and particularly the applicator tip, is advantageously dimensionally configured for holding the substance under a pressure or holding a pressurized substance, and/or configured to include one or more flow controlling elements.

Figure 22:
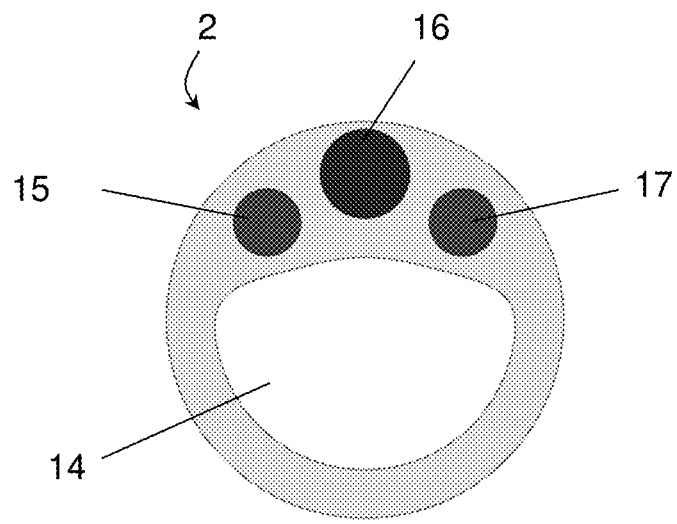
FIG. 22 shows a cross-section of an embodiment of the delivery tube according to the present disclosure, wherein the delivery tube comprises a plurality of lumens (here four lumens).
Figure 23:
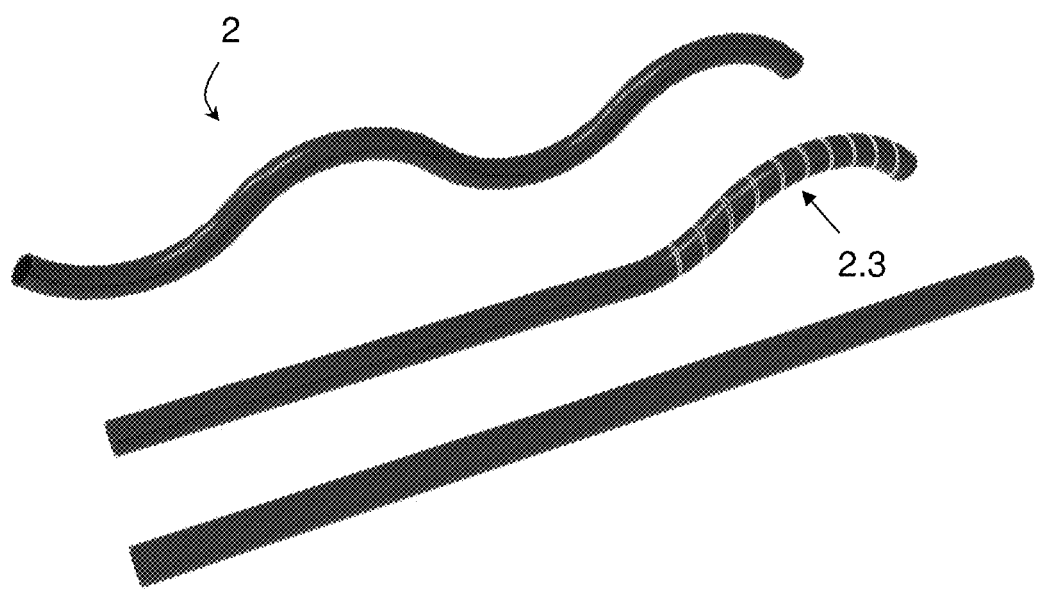
FIG. 23 shows three different embodiments of a delivery tube with various deformable and rigid sections.
Figure 30:
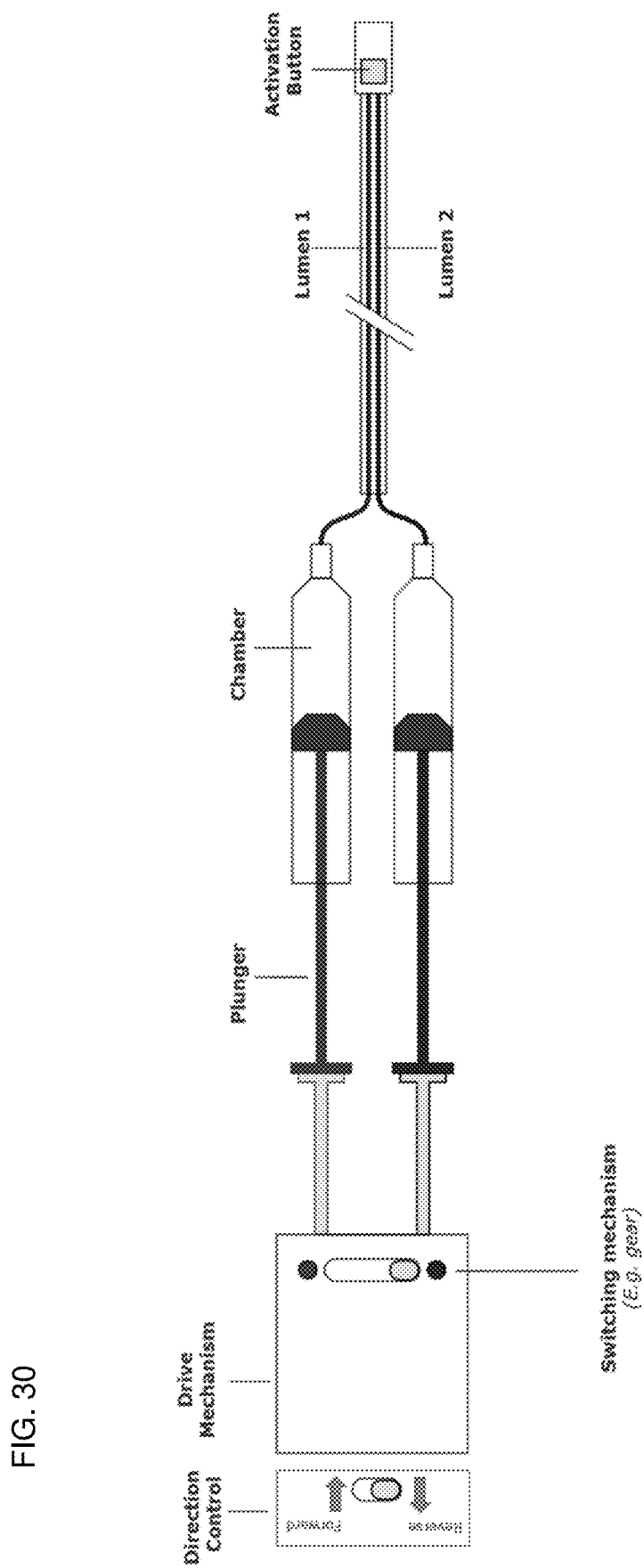
FIG. 30 shows an embodiment of the applicator according to the present disclosure, wherein the applicator comprises two fluid sources (here two syringes) and a drive mechanism for pressurizing the two fluid sources.

The delivery tube may comprise a plurality of lumens, such as at least two lumens, or at least three lumens, or at least four lumens. FIG. 22 illustrates an embodiment, wherein the delivery tube comprises four lumens. At least one of the plurality of lumens should be configured to contain the substance to be dispensed from the applicator, i.e. act as flow channel for the substance. In one embodiment, the delivery tube comprises a first lumen and a second lumen, wherein the first lumen is configured to contain the substance and the second lumen is configured to contain electrical wiring or an optical fibre. The electrical wiring may be used to electrically connect an actuator, e.g. located at the distal end of the tube or at the tip, to a control unit or a pressure source, e.g. located at the proximal end of the tube. The delivery tube may also comprise a plurality of lumens, wherein at least two lumens are configured for holding a substance. As an example, the tube may comprise a first lumen for holding a first type of substance and a second lumen for holding a second type of substance. In some applications, the two types of substances are mixed once the substances are dispensed or before they are dispensed. In this case, one substance may be in the form of a liquid and the other substance could be a powder to be mixed in the liquid. The two substances could also be two liquids or two pastes, or other combinations of liquid, paste, and powder. An applicator with a delivery tube having two lumens is shown in FIG. 30.

Figure 24:
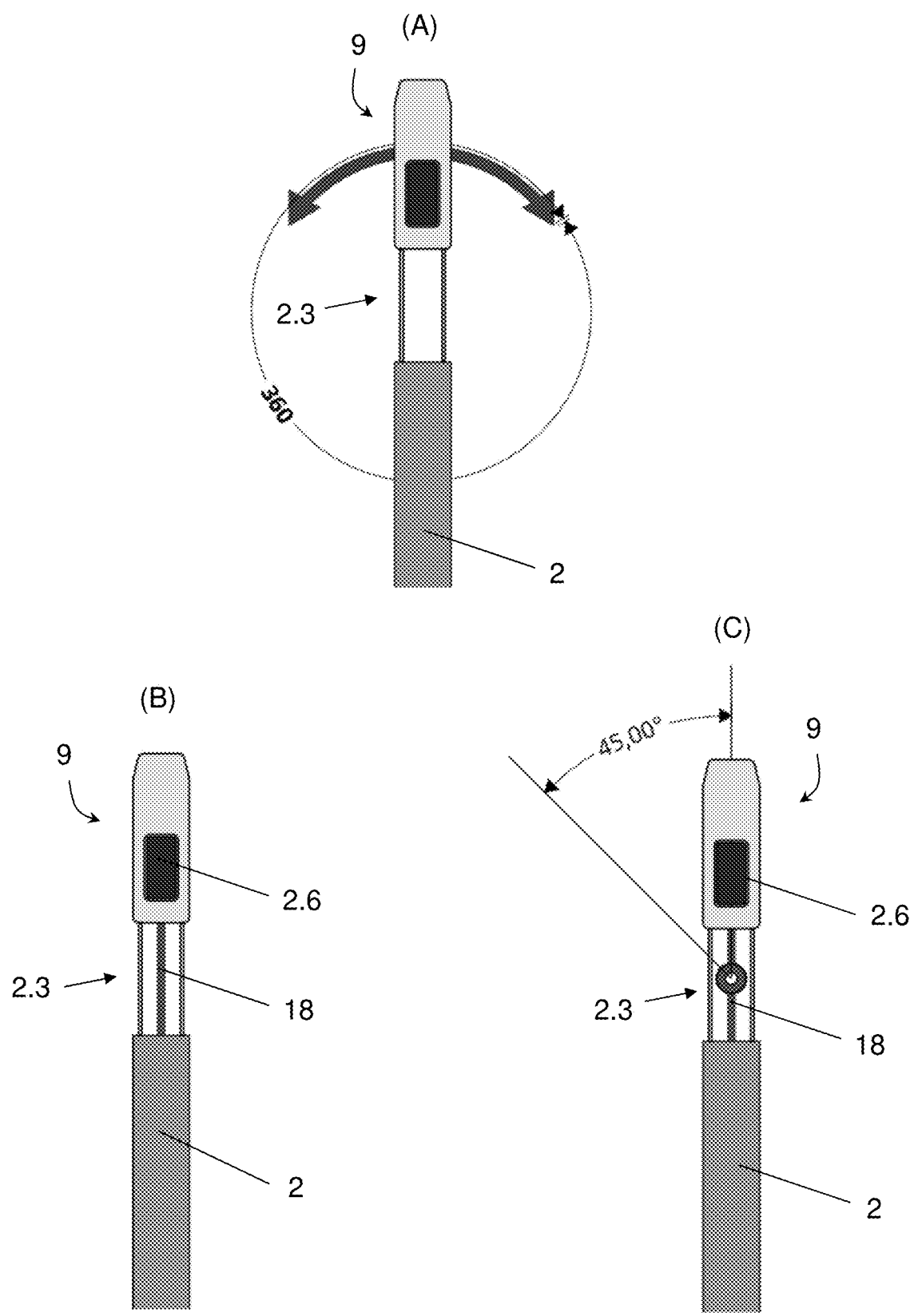
FIG. 24 shows three embodiments of the applicator according to the present disclosure, wherein the deformable section allows approximately 360° manipulation of the applicator tip (A), wherein the delivery tube comprises a malleable wire such that the position of the applicator tip can be varied but remain in the same position relative to the tube (B), and wherein the wire allows bending the deformable section along one or more planes at predefined angles (C).

In another embodiment, at least one of the plurality of lumens is configured to contain a malleable wire or rod, which is placed in a lumen inside the delivery tube (illustrated in FIGS. 24(B) and (C)). Accordingly, the applicator may further comprise a malleable wire or rod, configured such that the deformable section of the delivery tube may be bent into a desired shape, said shape being approximately maintained upon release of the delivery tube. This has the advantage that the deformable section may be bent without the tube returning to the point of origin. This gives the surgeon more freedom to put the distal end of the tube and/or the applicator tip in desired orientations, e.g. such that hard-to-access areas inside the body are more easily reached. In one embodiment, the deformable section of the delivery tube may be bent along two planes at two pre-determined angles, such as at least 30° or at least 45°. This may similarly be achieved by using a malleable wire or rod placed inside the delivery tube.

Figure 53:
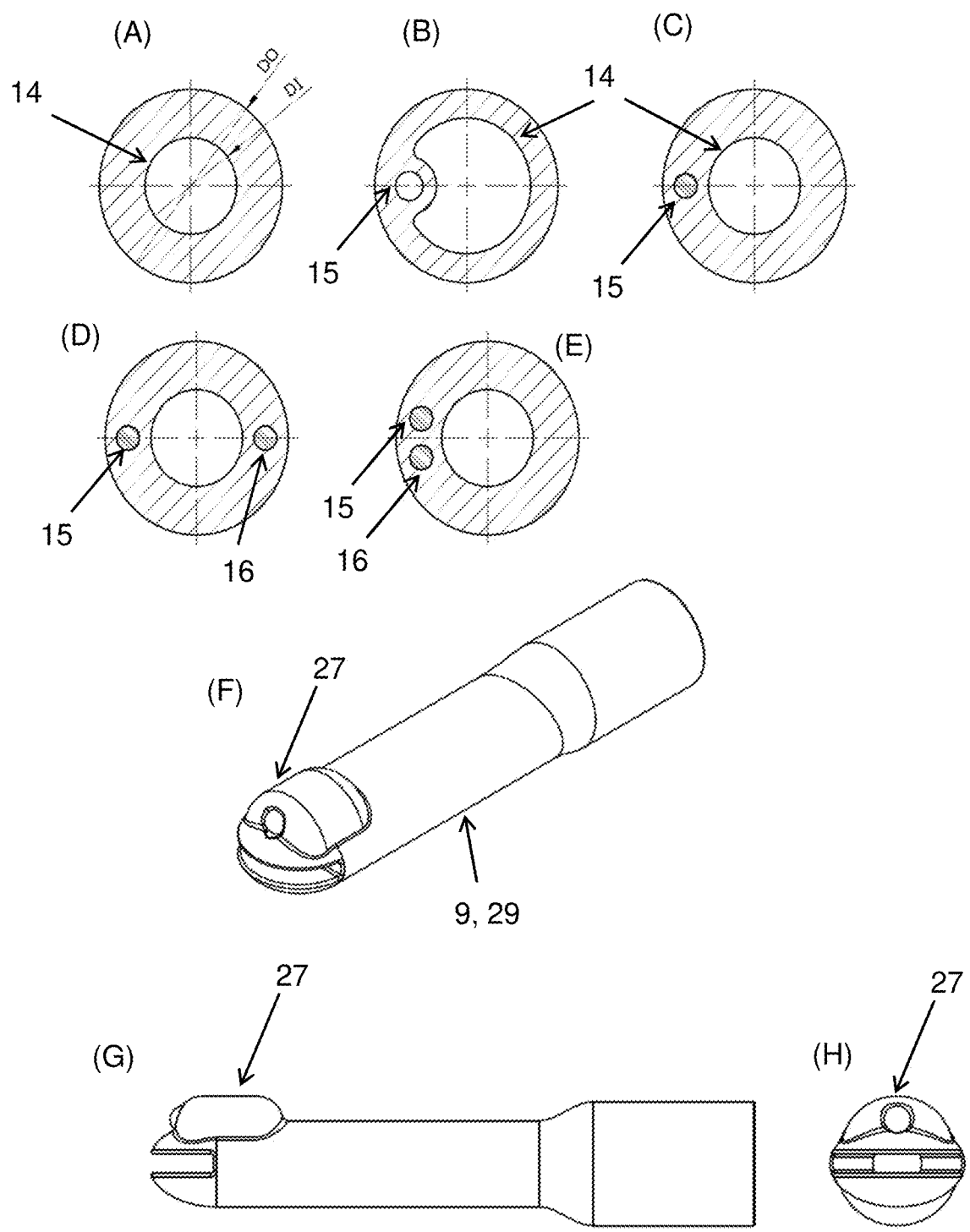
FIG. 53 shows embodiments of the grip section according to the present disclose comprising a transmitting unit, as seen in transverse cross section (A-E), perspective view (F), seen from the side (G), and seen from a distal end perspective (H).

A grip section in axial extension of the delivery tube is advantageously adapted, such that any lumens are also in axial extension. FIGS. 53A-E show embodiments of the delivery tube or cannula or grip section as seen in transverse cross sectional view, i.e. transverse to the tube axis. For flexible and safe spatial manipulation, the grip section dimension or profile is advantageously circular, such as circular with an outer diameter (DO) of between 2.5-4.5 mm, as shown in FIG. 53A. The inner dimension or profile of the tube or lumen configured as flow channel is also advantageously circular and concentric for efficient flow, as shown in FIGS. 53A, C-E. For example, the inner diameter (DI) may have a diameter of between 1.5-2.0 mm.

As described above, the delivery tube may comprise one or more additional lumens configured to contain signal carriers or transmitters 28, such as electrical wiring or an optical fibre. For example, a lumen may comprise a wire configured to carry or transmit an electrical signal from a distally located transmitting unit 27 to a proximally located receiving unit, optionally connected to the drive mechanism for applying a pressure to the substance inside of the delivery tube. A tube including one or more wires may for example be obtained by co-extrusion.

For example the distally located transmitting unit may be a light source, a sensor, and/or a camera. Examples of sensors include detection sensors and/or actuators, such as electro-mechanical switches, pressure sensitive films, and optical pressure sensors. The transmitting unit may be integrated into the applicator tip and/or grip section, and preferably the transmitting unit is integrated and dimensioned such that the applicator tip and/or grip section dimensions allow for entrance through a trocar. For example, the maximum diameter of the applicator tip and/or grip section including an integrated transmitting unit is preferably below 5 mm, such as 4.5 mm.

Figure 49:
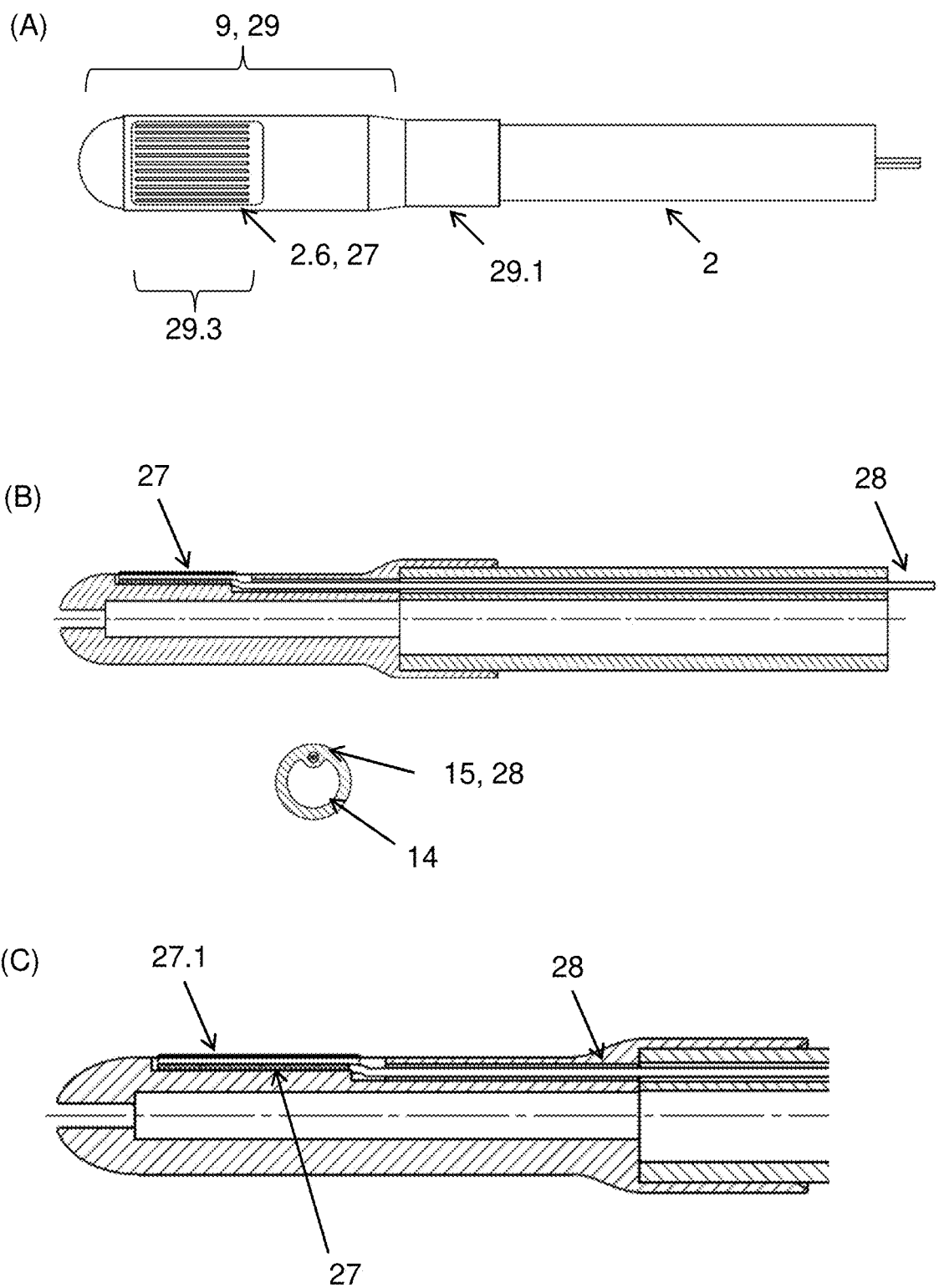
FIG. 49 show embodiments of the grip section according to the present disclosure comprising a transmitting unit, seen in perspective side view (A) and in longitudinal cross sectional view (B-C), and transverse cross sectional view (B insert).

FIGS. 53F-H s show an applicator tip 9 including a grip section 29 comprising an integrated camera or light source 27, optionally located in a separate compartment, at the more distal end of the applicator tip and grip section. FIG. 49 shows an applicator tip 9 including a grip section 29 comprising an integrated actuator 2.6 or sensor 27 located adjacent to the more distal end of the applicator tip and grip section, as seen in perspective side view (A) and in longitudinal cross sectional (B,C) and transverse cross section (B insert), where the signal carrying or transmitting wire 28 is placed in a second lumen 15 of the tube. To facilitate the contact between the robot arm and the actuator or sensor, the surface of the actuator/sensor may comprise one or more protrusions, such as a series of parallel ridges as shown in FIG. 49A. The actuator/sensor may alternatively or additionally comprise a transmitting unit cover 27.1, such as a rigid cover in physical, mechanical or electro-mechanical contact with the transmitting unit below, such that only the cover is in direct contact with the robot arm, as shown in FIGS. 49B-C.

In an embodiment of the disclosure, the applicator tip and/or grip section comprises one or more integrated transmitting units, selected from the group of: light sources, sensors, cameras, and combinations thereof. In a further embodiment, the applicator comprises one or more lumens configured for comprising one or more signal carriers or transmitters, such as carriers of electrical or optical signals.

Spatial Manipulation

Replacing the movements of human hands by robotic arms controlled by computer software, facilitates very precise and controlled movements. Hence, a laparoscopic applicator being spatially manipulated by a robotic arm may be more precise and accurately controlled, as well as being more reliable with reduced risk of accidental movements. Thus, for example a laparoscopic applicator for dispensing a substance by means of a robotic arm will be able to dispense the substance at a selected site more precisely and reliably. Specifically, a robotic manipulated applicator for dispensing a haemostatic substance at a selected site, may result in a bleeding being stopped more efficiently.

Figure 2:
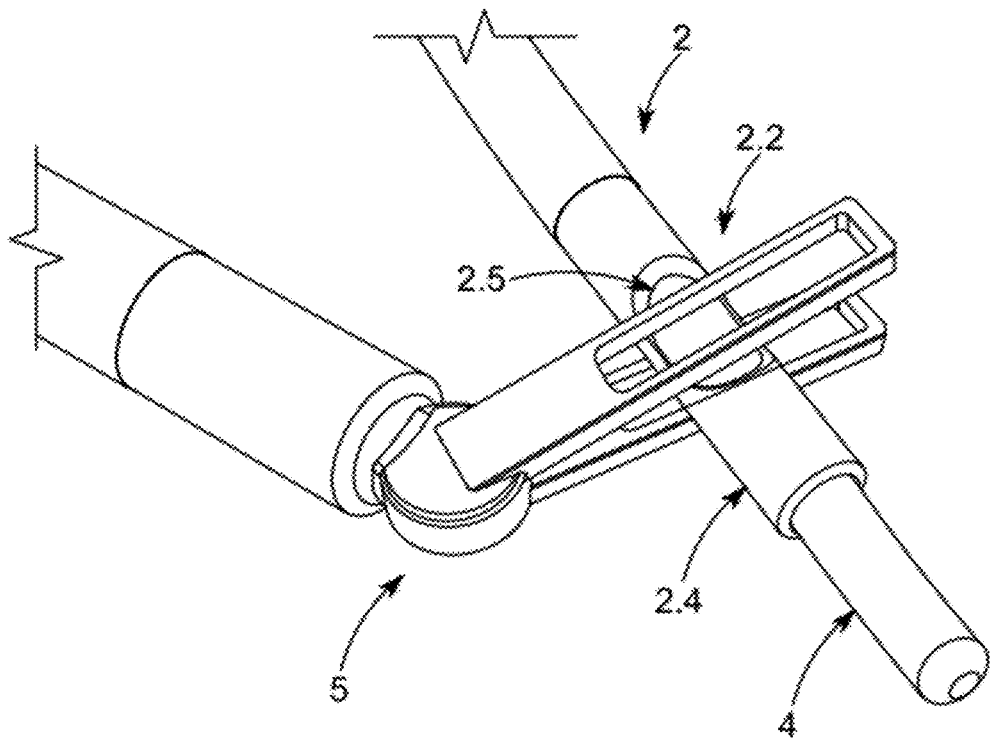
FIG. 2 shows perspective views of an embodiment of an applicator according to the present disclosure, being manipulated by a robotic arm.
Figure 2:
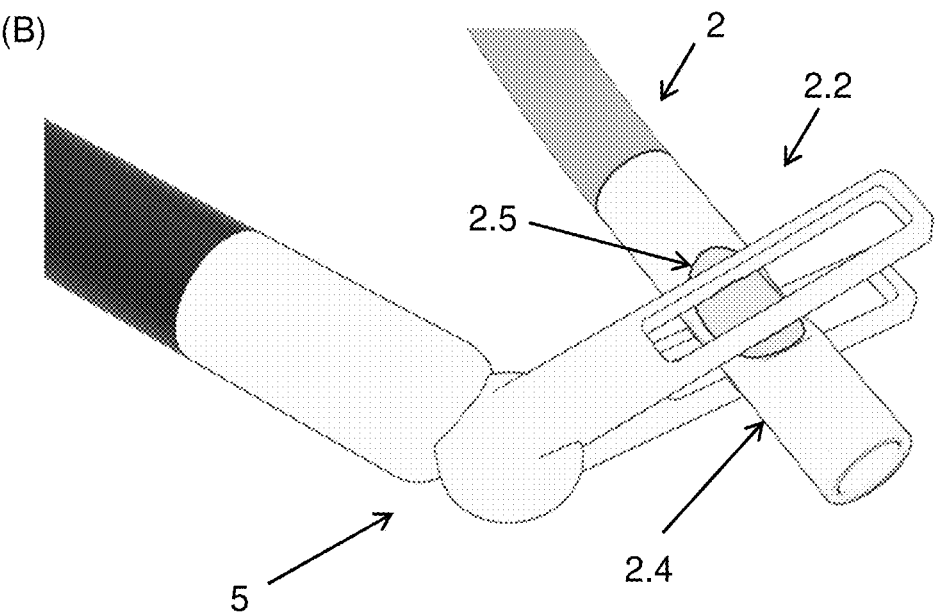

FIG. 2 shows perspective views of an embodiment of an applicator configured for being spatially manipulated by a robotic arm 5. The robotic arm may include a medical device, e.g. a tool for surgery, such as a grasper, tweezer, or a similar robotic finger element for gripping, pushing, or forming an attachment to the applicator.

Robotic arms and fingers may not include haptic feedback. Thus, to ensure safe robotic use of the applicator with reduced risk of breaking the applicator, the applicator may advantageously comprise a rigid surface area 2.4 or rigid section 2.8, the area or section configured for manipulation by the robotic arm/fingers. Accordingly, the delivery tube may comprise at least one rigid section, such as a rigid tubular section or a rigid surface area. The rigid section and/or rigid surface area is preferably dimensioned such that the robotic arm/fingers may grip, push, or form an attachment to the rigid surface area without risking breaking the applicator. For example, for a robotic arm including a grasper the rigid surface area is advantageously a rigid tubular section, as illustrated in FIG. 2. The rigid section is preferably provided with an opening, such that the robotic arm may press an actuator placed in said opening, wherein the actuator is configured for opening a valve when the pressure exceeds a predefined pressure level, whereby the medical substance can be dispensed from the applicator.

In an embodiment of the disclosure, the distal end of the delivery tube comprises one or more rigid surface areas configured for manipulation by the robotic arm. In a further embodiment, the rigid surface areas are dimensioned such they are tangible by the robotic arm, such as tangible by gripping, pushing, or attachment. In a further embodiment, the distal end comprises a rigid tubular section.

To facilitate precise and user friendly discharge of the substance at a selected site, the one or more rigid surface areas 2.4 are advantageously located at the distal end 2.2 of the applicator and/or on the applicator tip, as illustrated in FIGS. 1 and 2. It follows that the substance discharge may be more precisely and easily directed, when the rigid surface is in the vicinity of where the substance is dispensed.

Figure 3:
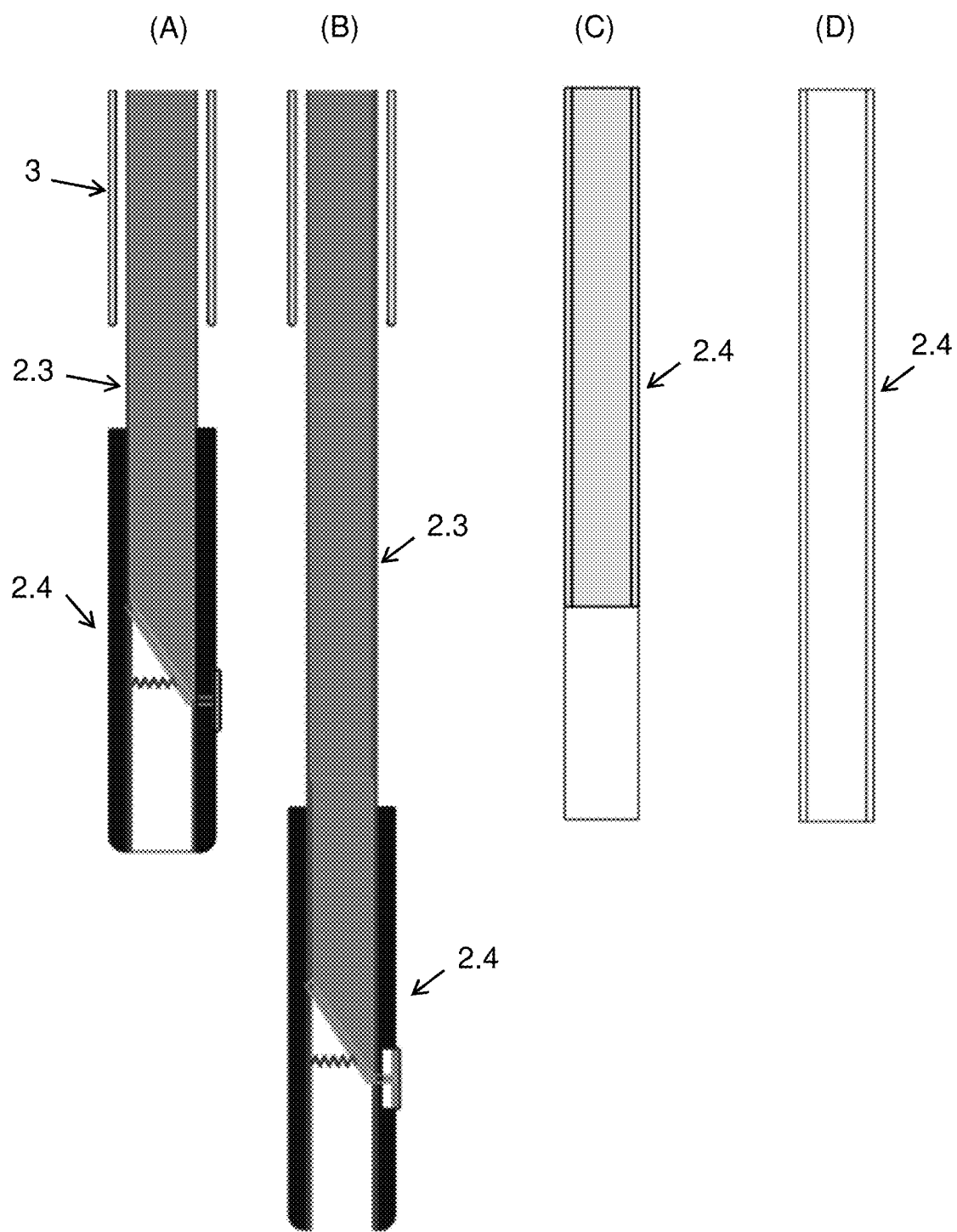
FIG. 3 shows an embodiment of an applicator according to the present disclosure comprising embodiments of: (A, B) a delivery tube being stretchable and comprising a rigid surface area at the tip, (C) a delivery tube comprising a rigid surface area located at a distance from the tip, and (D) a delivery tub being semi-rigid.

However, the rigid surface area 2.4 may also be located at a distance from the distal tip, as illustrated in FIG. 3C. This may be advantageous when the substance is to be dispensed at a location, where there is restricted space within the body cavity. Hence, the rigid surface area may be a rigid tubular section of the delivery tube 2, located at a distance from the distal tip, as shown in FIG. 3C. The orientation of the distal end is thus manipulated by use of the rigid tubular section located at a distance from the tip.

In addition, or alternatively, flexible manipulation of the distal end of the delivery tube, may be obtained by use of a delivery tube, where either a section of the delivery tube, or optionally the entire delivery tube, comprises a semi-flexible or semi-rigid material, as illustrated in FIG. 3D. Since the semi-rigid material is sufficiently tangible by the robotic arm/fingers, the interaction may occur at any point along the delivery tube and at any distance to the distal tip 2.2, which is being spatially manipulated.

Figure 4:
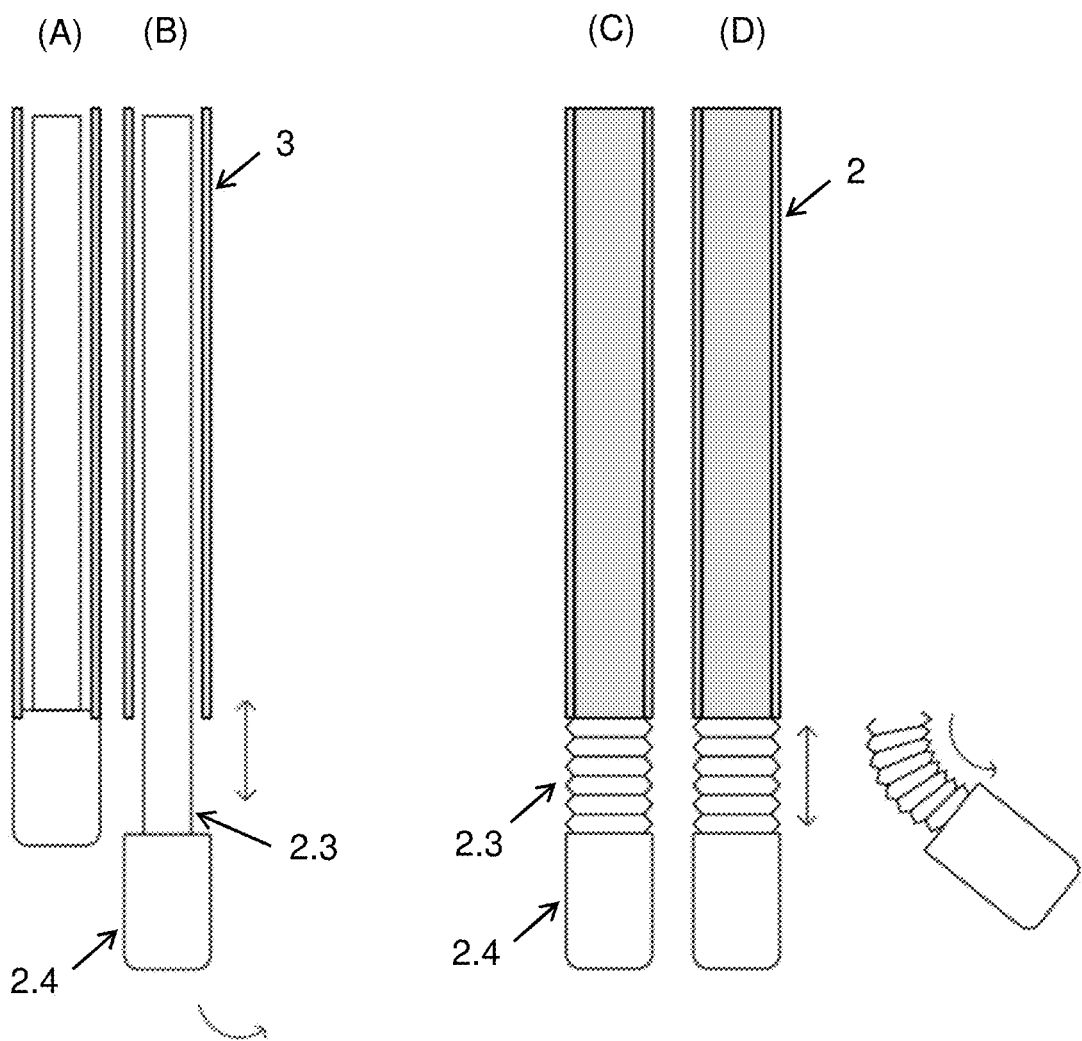
FIG. 4 shows an embodiment of an applicator according to the present disclosure comprising embodiments of a deformable section being stretchable, compressible, and/or flexible.

The flexible and precise manipulation of the distal end may be further improved by the delivery tube comprising a deformable section 2.3. By the term deformable section is meant a section, which may be plastically or elastically deformed when subjected to a deformation force, such as a tensile, compressive, or bending force. Advantageously, the deformable section is plastically deformed, meaning that the deformation remains after the deformation force is removed. Alternatively, the deformation is elastic, meaning that the deformation is reversible upon removal of the deformation force. For example, the deformable section 2.3 may be configured to be stretchable or extendable, such that when subjected to a tensile force in the longitudinal direction, e.g. by a robotic arm pulling at delivery tube tip, the delivery tube is stretched, as illustrated in FIGS. 3A-B and FIGS. 4A-B as shown by the arrows. In addition, and correspondingly, the deformable section may be configured to be compressible, such that the delivery tube may be compressed when subjected to a compressive force, e.g. by a robotic arm pushing at the delivery tube tip, as indicated in FIG. 4B. In addition, and correspondingly, the deformable section is further advantageously configured to be flexible or bendable, as indicated by the arrows in FIG. 4B.

Figure 17:
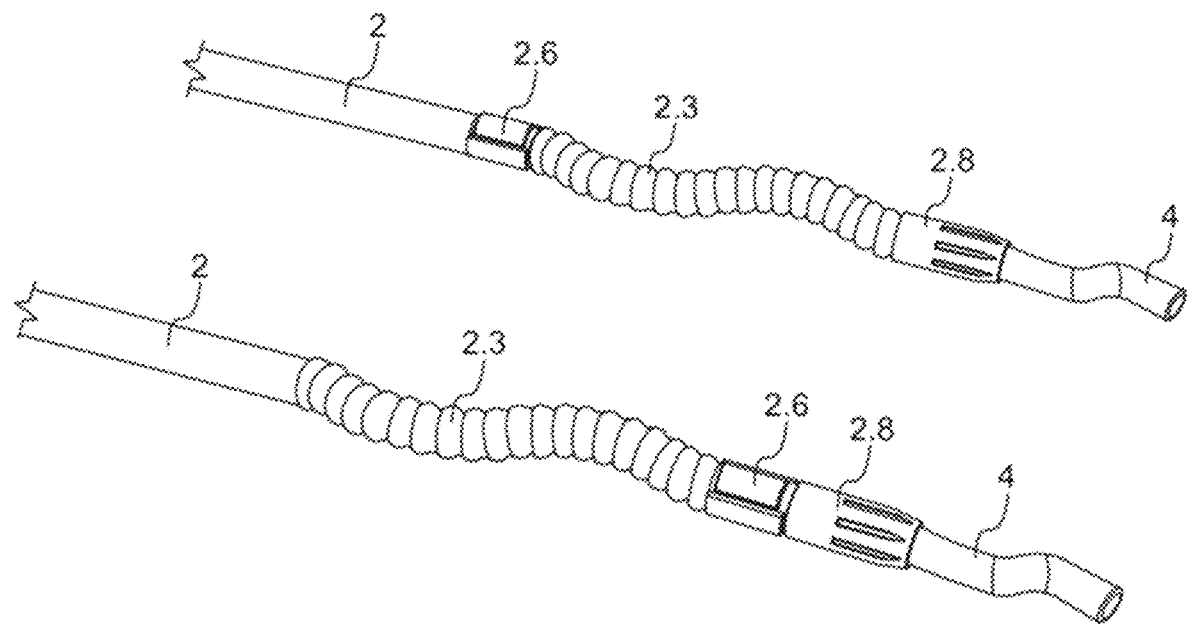
FIG. 17 shows an embodiment of the applicator according to the present disclosure, wherein the applicator comprises a deformable section and an actuator, which can be placed on either side of the deformable section.

The deformable section may comprise an elastically or plastically stretchable, compressible, and/or flexible material. In addition, or alternatively, the deformable section may comprise a corrugated surface profile, e.g. in the form of multiple, circumferentially extending kinked folds, as illustrated in FIGS. 4C-D and FIG. 17. The corrugated surface profile enables extension, compression, and/or bending in the same manner as a drinking straw. Accordingly, the delivery tube may comprise a deformable section that is compressible, e.g. in the form of a corrugated tube, such that the length of the tube may be varied.

In an embodiment of the disclosure, the delivery tube comprises a deformable section. Advantageously, the deformable section is located at the distal end of the delivery tube, such that the applicator tip may be manipulated by a smaller torque/moment. Alternatively, the deformable section is located at a distance from the distal end of the delivery tube, such that the tip may be manipulated by a defined torque/moment. In a further embodiment, the deformable section is configured to be stretchable and/or flexible, such as comprising a stretchable and/or flexible tube material. In a further or alternative embodiment, the deformable section comprises a corrugated surface profile. In a further embodiment, the corrugated surface profile comprises a plurality of circumferential folds in the manner of the kink of a drinking straw.

Spatial Manipulation—Grip Section

Figure 44:
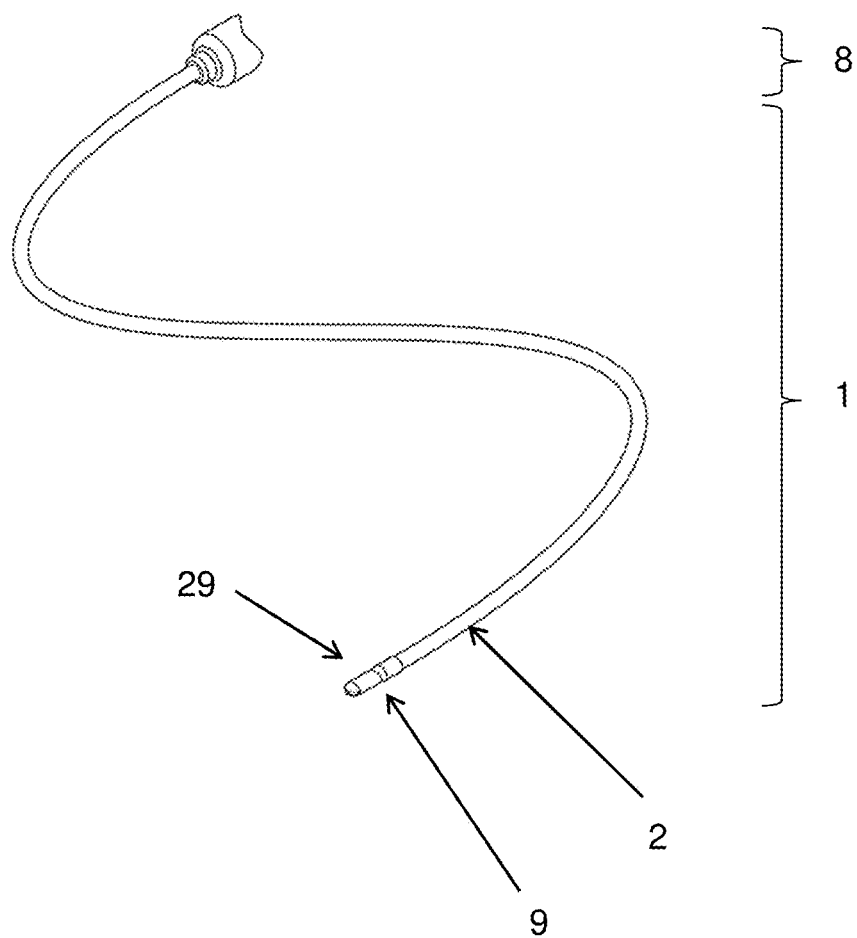
FIG. 44 shows an embodiment of the applicator according to the present disclosure comprising a grip section.

As described above, spatial manipulation of the applicator tip by a robotic arm implies the robotic arm physically contacting the applicator tip. To ensure precise and reliable spatial manipulation, the applicator tip is advantageously configured to be gripped by the robotic arm, such that at least two opposing contact points are obtained thereby providing a stable and robust contact. For example, the applicator tip may be configured to be gripped by the robotic arm in the manner of a tweezer having a gripping direction in parallel with the longitudinal axis of the applicator and tip and substance flow direction. Hence, the tweezer jaws are gripping or clamping around a cross section or perimeter transverse to the axis of the applicator tip. This may particularly be obtained when the applicator tip comprises a grip section 29 in axial extension of the delivery tube 2 as shown in e.g. FIGS. 44 and 48, where the robotic arm grip and clamp around a cross section or perimeter transverse to the longitudinal axis.

Figure 45:
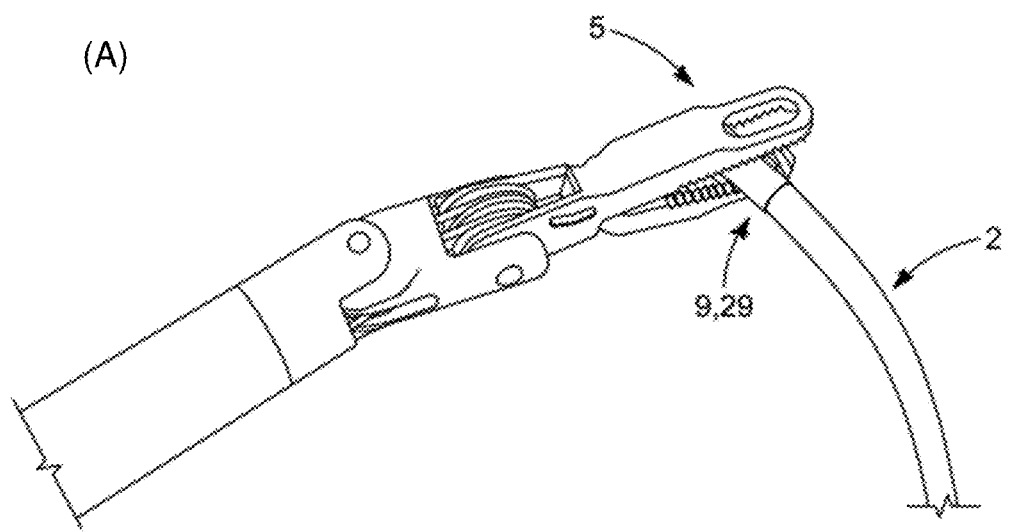
FIG. 45 shows an embodiment of the applicator according to the present disclosure during spatial manipulation.
Figure 45:
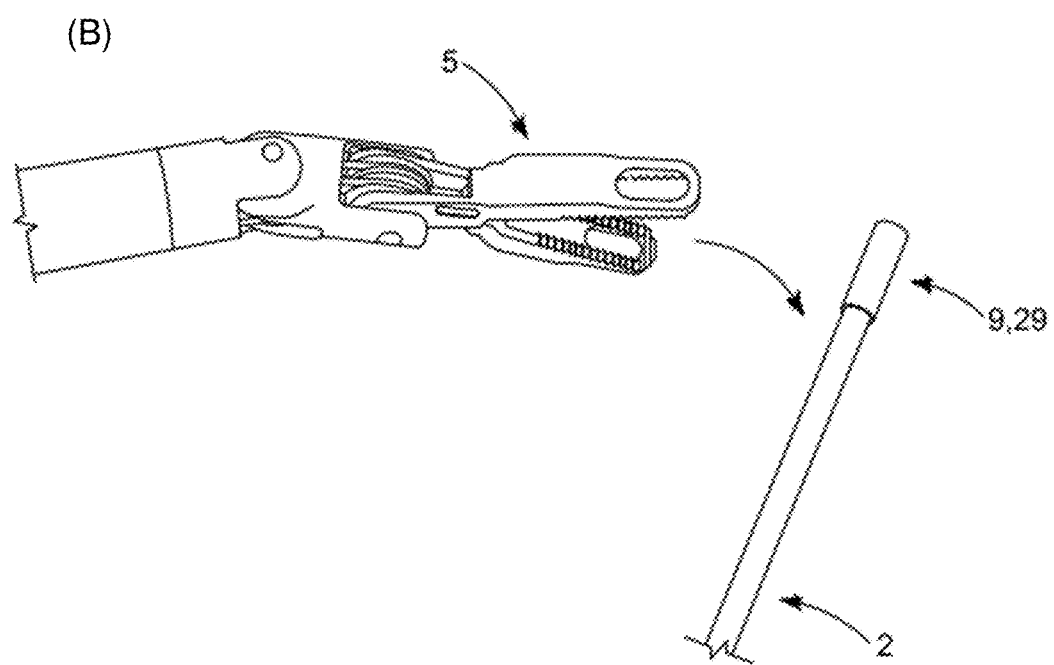

Accordingly, the grip section may be configured to be gripped by a robotic arm, such that a particularly stable and robust contact area and surface may be obtained, particularly towards a robotic non-tactile grip force. Advantageously, the grip section has a perimeter transverse to the longitudinal axis comprising an apex shaped section, such that the apex shape may be essentially matching at least a part of the grip shape of the robotic arm. Hence, a maximum contact area between the grip section and robotic arm may be obtained. Typically, the grip of a robotic arm is a jaw grip acting transversely to the applicator tip length or axis, i.e. the jaw opening is clamping transversely over the grip section, as shown in FIGS. 2 and 45. Accordingly, the grip section 29 of the applicator tip may comprise a matching cross-fall to the jaw opening. For example, the grip section may have a perimeter comprising an apex shaped section in the form of an oval, as shown in perspective view in FIG. 48 and in cross-sectional view in FIG. 46B.

An embodiment of the disclosure relates to a laparoscopic applicator for dispensing a substance, e.g. a substance comprising a haemostatic agent, at a selected site by means of a surgical robotic arm, the laparoscopic applicator comprising:
  a delivery tube; and
  an applicator tip connected to a distal end of the delivery tube, the applicator tip configured for being controllable operated by the robotic arm, by a grip section in axial extension of the delivery tube and configured to be gripped and spatially manipulated by the robotic arm, wherein the grip section has a perimeter comprising an apex shaped section.

Hence, when the robot arm or jaw 5 clamps the applicator tip 9 or grip section 29 it will stay in place without sliding inside or sliding out of the instrument jaws, and any resistance from the flexible tube during movement and manipulation can be overcome, as shown in FIG. 45A. The surgeon can then grasp and hold the applicator tip by the robot arm or the one or more instruments docked into the robot arms.

The grip section facilitates that the applicator tip is configured to establish a well-defined grip and fixation to the robot arm or instrument, allowing the surgeon to move it around freely following the high mobility degree of the robot. Examples of robot instruments which may be docked into the robot arm include: forceps (Bipolar Fenestrated Forceps), graspers (Pro Grasps), and needle drivers. These instruments are particularly suitable for miniature surgery, where the site of surgery has smaller dimensions. The robot instruments for miniature surgery are adapted with a jaw opening angle of below 55°, such 30°, and a jaw length of below 28 mm, such as 10 mm.

Advantageously, the applicator tip or grip section is configured to be gripped by a robotic arm comprising a robot instrument, selected from the group of forceps, graspers, needle drivers, and combinations thereof. Thus, the applicator tip or grip section is configured to be gripped by an arm or instrument with a jaw opening angle of below 55°, such as 50°, 45°, 40°, 35°, 30° or 25°, and/or a jaw length of below 28 mm, such as 25, 20, 15, 10, or 5 mm.

Figure 46:
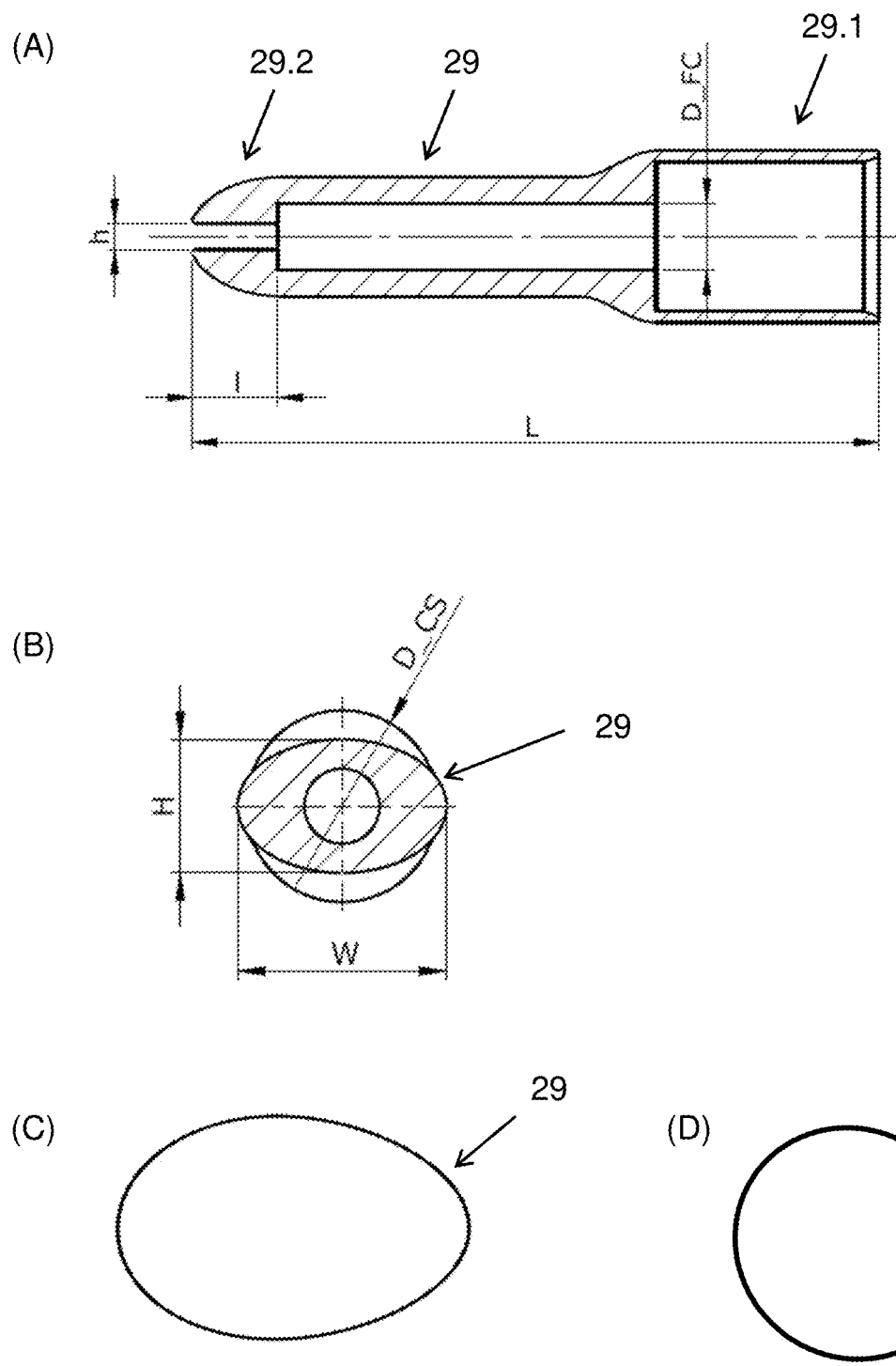
FIG. 46 shows an embodiment of the grip section according to the present disclosure seen in longitudinal cross section (A), and transverse cross sections (B-D).
Figure 48:
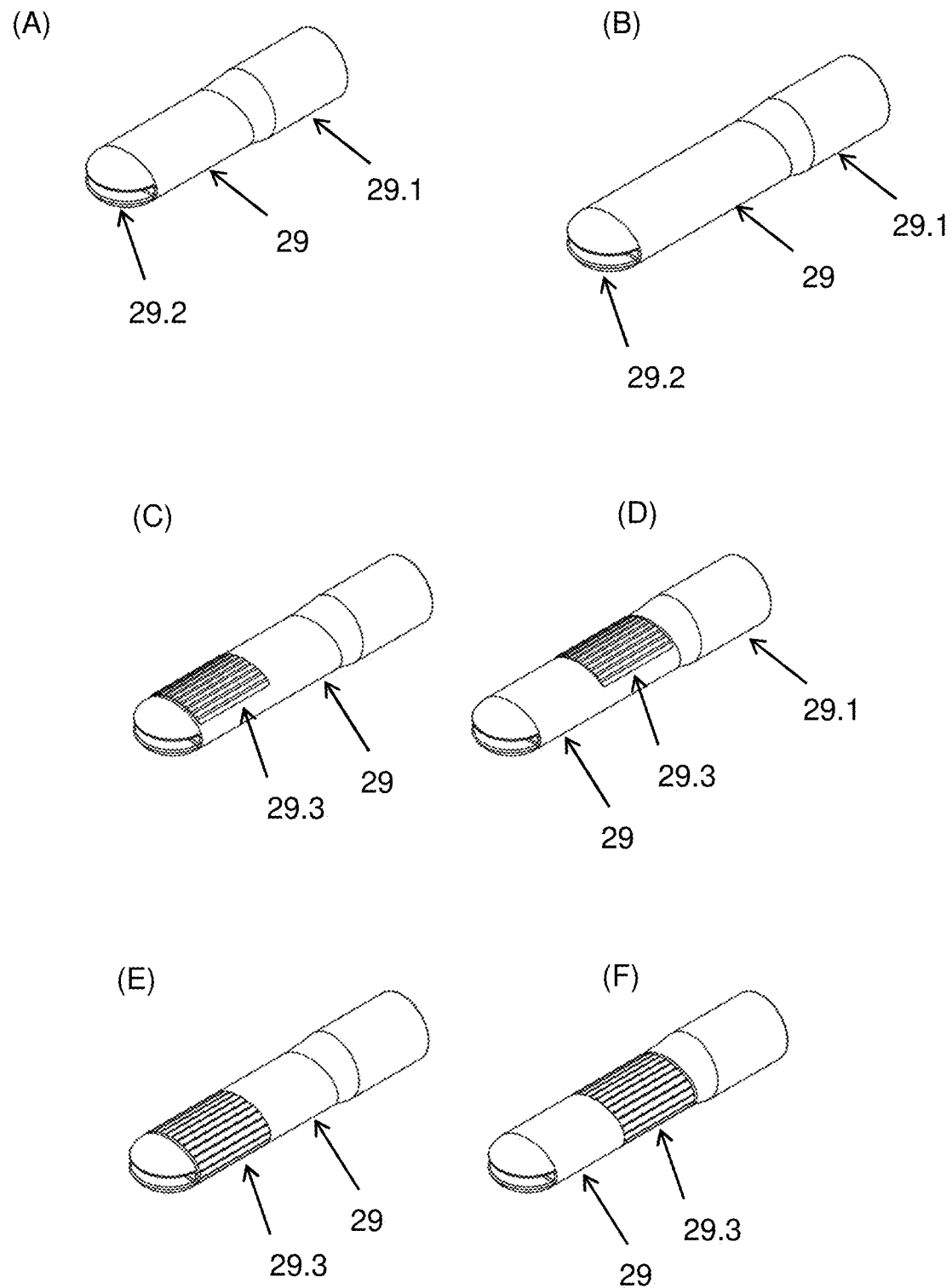
FIG. 48 shows embodiments of the grip section according to the present disclosure in perspective view, where the grip section comprises no activation section or a combined activation section (A), or a separate activation section (B-F).

To further improve the stability and robustness of the grip section 29, the apex shaped section of the perimeter may have a rounded shape, e.g. the grip section may have a perimeter shape or cross sectional shape that is an ellipse or oval, as shown in the perspective view of FIG. 48, and in cross sectional view in FIG. 46B. However, other apex shapes and perimeter shapes may be applied, e.g. oval with one axis of symmetry (FIG. 46C) or triangular (FIG. 46D).

In an embodiment of the disclosure, the apex shaped section is selected from the group of: rounded apex, obtuse apex, acute apex, acuminate apex, and combinations thereof. In a further embodiment, the perimeter has a shape selected from the group of: ellipse, oval with one axis of symmetry, oval with two axes of symmetry, equilateral triangle, isosceles triangle, scalene triangle, parallelogram, and rhombus.

Figure 16:
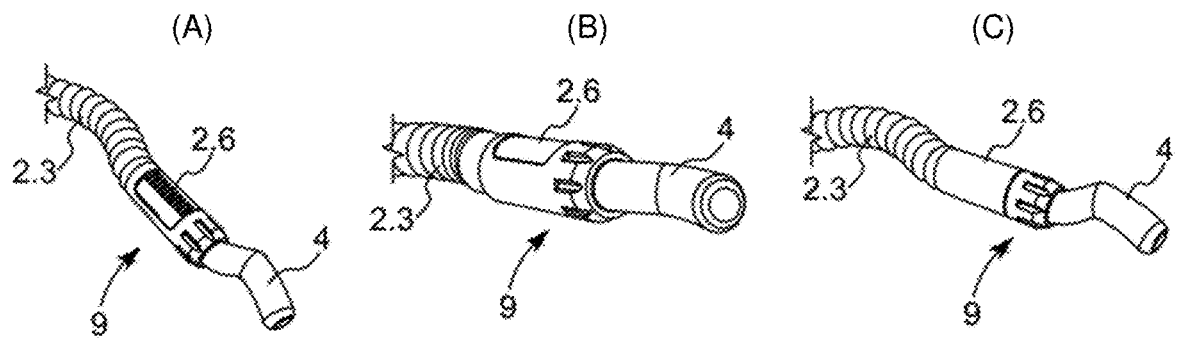
FIG. 16 shows three different embodiments of the actuator: a single button covering a part of the applicator tip (A), two buttons placed opposite each other on the tip (B), and a single button surrounding the entire circumference of the applicator tip (C).

The applicator tip and grip section is advantageously dimensioned, such that it may be gripped stably and robustly by a robotic arm or robot instrument. For the applicator tip shown in FIG. 46A-B, examples of dimensions are shown in the table below. The length of the grip section (L) may be adapted to include an activation section 29.3, which may include an actuator or sensor partially covering the grip section and configured to active a substance release mechanism. The activation section may be placed on the front/distal part of the grip section (FIG. 48C), or the rear/proximal part of the grip section (FIG. 48D), on opposite sides (FIG. 48E), or enclosing the circumference (FIG. 48F), as also described in connection with FIG. 16. For an applicator without an activation section, or with an activation section which is combined or coinciding with the grip section, the grip section may be relatively short, e.g. 30-35 mm, since it only provides area for grasping and fixation.

| | |
|---|---|
| L | 20-25 mm (Short version) |
| | 30-35 mm (Long version) |
| D_FC | Ø1.2-1.5 mm (or corresponding cross-section area for other non-circular flow channel shapes) |
| I | 2.0-3.5 mm |
| h | 0.5-1.0 mm |
| H | 2.5-3.5 mm |
| W | ≤5.2 mm |
| D_CS | ≤5.2 mm |

In an embodiment of the disclosure, the perimeter is defined by a major axis defining the longest dimension, and a minor axis defining the shortest dimension. In a further embodiment, the major axis is between 2.5-5.2 mm, more preferably between 3-4.5 mm, and most preferably between 3.5-4 mm. In a further embodiment, the minor axis is between 2.5-3.5 mm, more preferably between 2.7-3.3 mm, and most preferably between 2.9-3.1 mm, such as 3 mm. In an embodiment of the disclosure, the grip section has a length of between 20-25 mm, such as 21, 22, 23, or 24 mm. In an alternative embodiment, the grip section has a length of between 30-35 mm, such as 31, 32, 33, or 34 mm.

Figure 55:
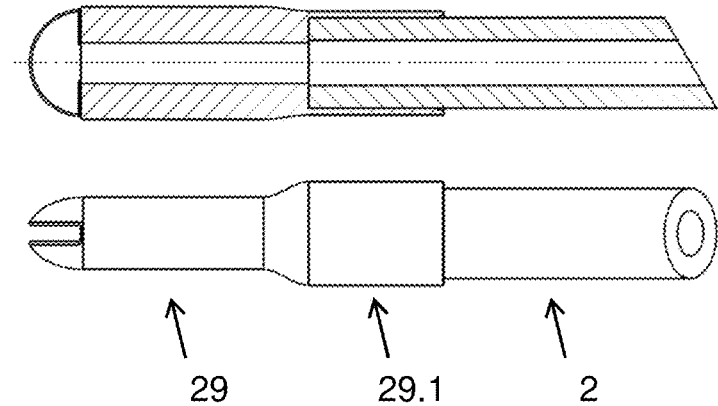
FIG. 55 shows three embodiments (A-C) of the grip section according to the present disclose as seen in cross section (upper image) and side view (lower image).
Figure 55:
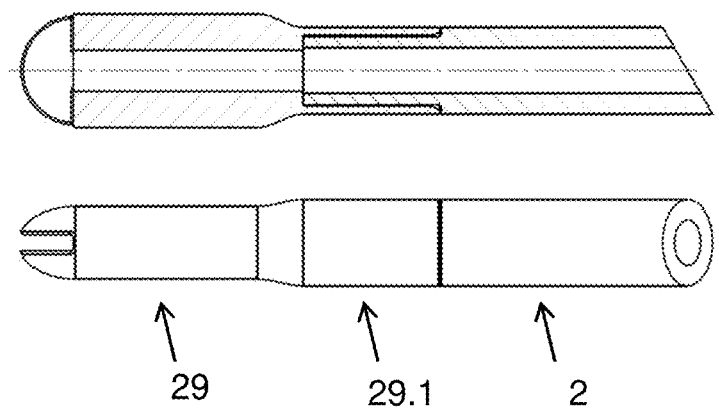
Figure 55:
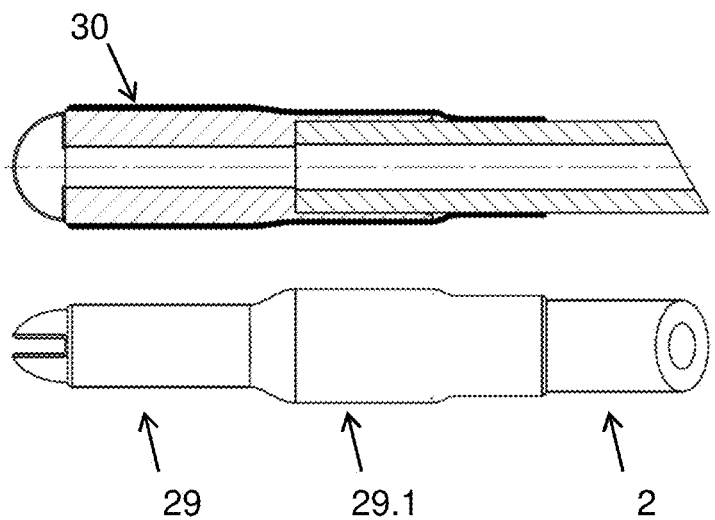

As exemplified in FIG. 46A, the grip section 29 may include a connection section 29.1 configured for connecting or joining the applicator tip and grip section to the delivery tube 2, and thereby forming a fluid communication with the delivery tube. The connection section be in axial extension of the grip section and may have rounded outer perimeter, e.g. be in the form of a cylindrical section with a lumen, such that it provides a smooth transition from the delivery tube to the tip/grip section, as shown in FIG. 46A. The connection may be obtained by a joint or glue joint, including an overlap in the axial direction between the connection section 29.1 and the delivery tube 2, optionally where there is glue in-between, as shown in FIG. 55. For example, the overlap may be obtained by perpendicular cut delivery tube inserted into the connection section, as shown in FIG. 55A. Alternatively, the overlap may be obtained by a step-cut tube inserted into the connection section, as shown in FIG. 55B. In addition or alternatively, the connection section 29.1 may include a shrink tube 30, as shown in FIG. 55C. The shrink tube may cover the connection section 29.1 and optionally a part of the grip section 29. Hence, the shrink tube further establish a smooth transition between the delivery tube 2 and the grip section 29, and may also provide protection of the joint between the tip and tube. Advantageously, the shrink tube is covering at least a portion of the grip section, such that the grip section may provide a more stable and robust grip. For example, the shrink tube may comprise a material configured to have low hardness properties, e.g. a soft polymeric material such as polyolefin, which enable a more stable and robust grip of the robotic arm to the tip due to the higher friction.

In an embodiment of the disclosure, the grip section comprises a connection section in fluid communication with the delivery tube. In a further embodiment, the connection section comprises a joint selected from the group of: perpendicular cut connection, step-cut connection, glue joint, shrinking tube connection, and combinations thereof.

Spatial Manipulation—Grip Materials

The grip section and/or connection section advantageously comprises a robust material, e.g. having a sufficient mechanical strength such that the material is an occlusion robust material, such that the lumen of the applicator tip and grip section is not occluded, crushed or permanently deformed, even when subjected to a stable and robust grip of the robotic arm, e.g. including a sufficient grip force. Further, the material is advantageously a high wear-resistant and tough material, such that shedding of particles is avoided, even after long-term handling by robotic arm. Hence, the applicator tip and grip section preferably comprises a material with high wear-rate constant (i.e. specific wear rate). Furthermore the material should be tough i.e. not brittle, to reduce the risk of a sudden brittle fracture during an operation.

In an embodiment of the disclosure, the grip section comprises an occlusion robust material selected from the group of: steel, stainless steel, polymers, such as ABS, polycarbonate, polyamide, PEEK, and combinations thereof.

Figure 47:
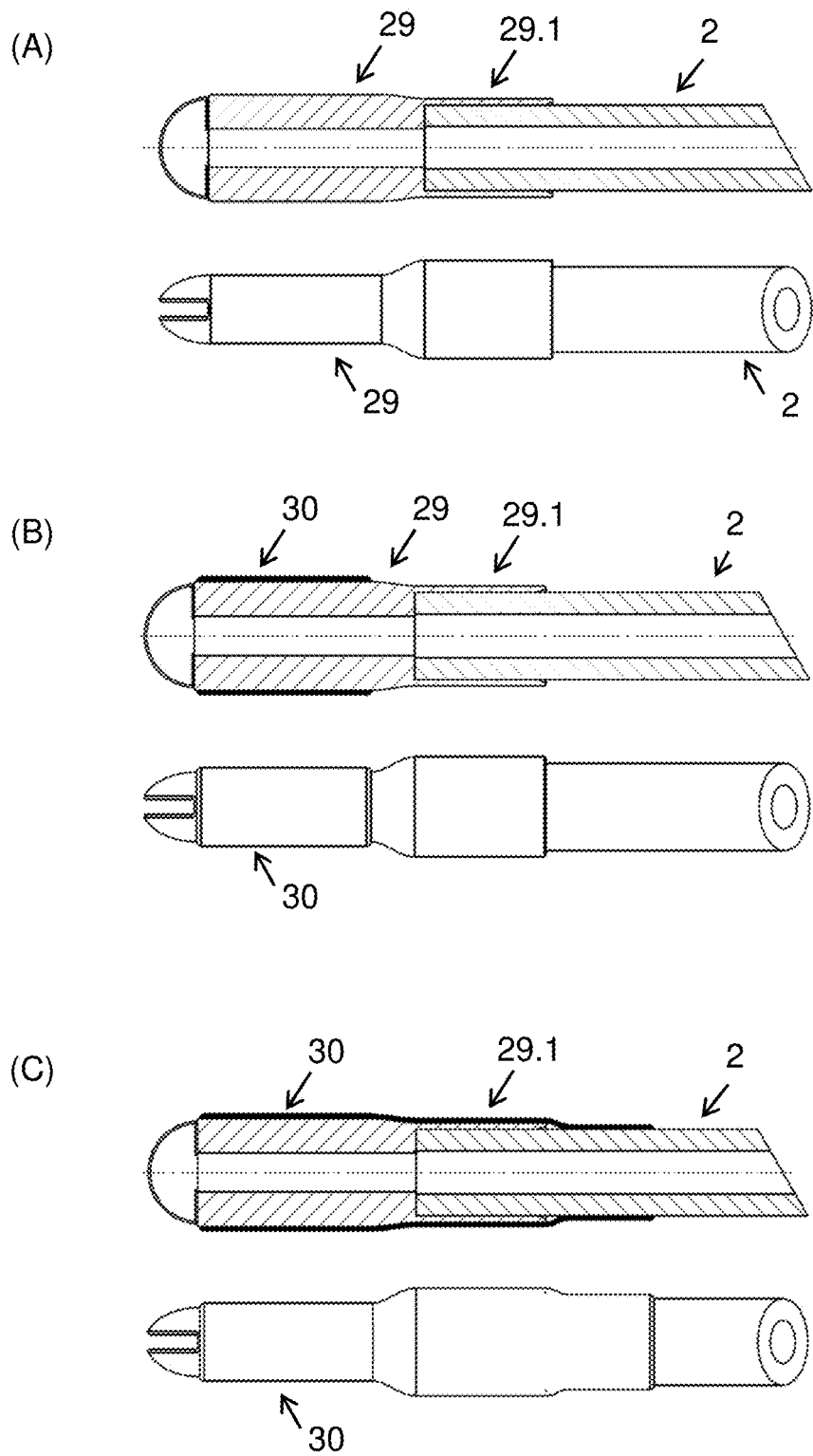
FIG. 47 shows three embodiments (A-C) of the grip section according to the present disclosure seen in perspective side view (lower images) and cross sectional view (upper images).

The grip section 29 may comprise or consist of the robust material, such as steel, as shown in FIG. 47A. In addition, the grip section may include a shrink tube 30, as shown in FIG. 47B-C. The shrink tube may cover only the grip section 29, as shown in FIG. 47B, or the grip section 29, a part or the entire the connection section 29.1, and/or a part of the delivery tube 2, as shown in FIG. 47C. The shrink tube may comprise a material configured to have a lower hardness, e.g. a soft polymeric material such as polyolefin, which enable a more stable and robust grip of the robotic arm to the tip due to the higher friction. Particularly, the coating material may have a low level of hardness relative to the surgical tools, and the material may have a high coefficient of friction. Hence, the robust grip section may comprise a strong and tough steel covered with a softer polyolefin coating. To further improve the grip stability and robustness, the grip section may be designed with geometrical features e.g. ridges that provide entanglements with the surgical tools to achieve a better grip, as illustrated in FIG. 49A.

In an embodiment of the disclosure, the grip section comprises a coating comprising a soft polymer selected from the group of: polyolefin, ABS, and combinations thereof. In a further embodiment, the coating is obtained by shrink tubing.

In the case of a surgeon inadvertently releasing the robotic arm or instruments grip on the applicator tip or grip section, it is beneficial to have safe release mechanism included within the applicator tip and/or grip section. For example, a magnet may be embedded in the tip with a holding force that is sufficient to secure the tip to the surgical instrument (including the weight of the tubing), and at the same time have a holding power that is low enough to ensure that the surgeon can easily detach the instrument from the tip if desired. An example of such a magnet could be a Neodymium magnet with a holding force of 400 g/cm$^2$.

In an embodiment of the disclosure, the applicator tip and/or grip section comprises a magnetic element configured for magnetically attaching the tip to a surgical instrument. the magnetic element is a neodymium magnet, preferably with a holding force of at least 400 g/cm$^2$, more preferably between 425-800 g/cm$^2$ or 450-700 g/cm$^2$, and most preferably between 500-600 g/cm$^2$.

Spatial Manipulation—Delivery Tube

The grip section facilitates that the robot arm or jaw may clamp the applicator tip, such that it will stay in place without sliding inside or sliding out of the instrument jaws, and that any resistance from the flexible cannula or delivery tube during movement and manipulation can be overcome, as shown in FIG. 45A. To further ensure simple, precise and reliable spatial manipulation, the delivery tube is advantageously configured to be flexible, deformable, soft, and configured to be mechanically stress free or stress released upon the deformation associated with the tip manipulation. This will reduce the whiplash or snapback of the delivery tube, as illustrated in FIG. 45, which may occur when a delivery tube is bent or manipulated (FIG. 45A) and subsequently released (FIG. 45B).

When operating in robotic surgery, the image the surgeon sees via the endoscopic camera is magnified e.g., up to 15 times. This means that the field of view is very narrow and even relatively small movements in instruments, or an applicator will move it out of the field of view of the camera and surgeon. A common situation that occurs when manipulating an applicator tip attached to a flexible tube, is that tension is built up in the flexible tube as the surgeon moves the tip with an instrument, because the tube is partially fixated by the trocar through which it has been inserted. If the surgeon then releases the tip, the built-up tension is released leading to a whiplash effect where the tip is moved out of the visual field. To reduce the "whiplash" problem as much as possible, it is important to select materials and tubing dimensions that produce as little "whiplash" as possible. Hence, advantageously, the delivery tube, or at least a part or section, is configured to be tension free flexible, meaning that the material is adapted to be bend without being mechanically stressed. This may be obtained by materials having sufficient flexibility (i.e. sufficient low Young's modulus) in combination with sufficient energy dissipating properties, such as sufficient dissipating vibrational energy (corresponding to a sufficiently high damping coefficient or mechanical loss coefficient). For example, a tension free flexible tube suitable for the relative movements occurring in surgery by robot arms, may have Young' modulus of between 0.0001-0.035 GPa as measured by tensile tests on plastics according to the standard ISO 527-1/-2 and further described in the ASTM D638 standard. Further, a tension free flexible tube suitable for the relative movements occurring in surgery by robot arms, may have a damping coefficient of between 0.2-2.0, as measured by the standards ASTM D4065-20 and ISO 6721-1:2019.

In an embodiment of the disclosure, at least a part of the delivery tube is configured to be tension free flexible. In a further embodiment, the delivery tube comprises a flexible material having a Young's modulus of between 0.0001-0.035 GPa, more preferably between 0.001-0.03 GPa or 0.01-0.25 GPa, and most preferably between 0.015-0.020 GPa. In a further embodiment, the delivery tube comprises a material having a damping coefficient of between 0.2-2.0, more preferably between 0.4-1.8 or 0.6-1.6, and most preferably between 0.8-1.4. In a further embodiment, the delivery tube comprises or consists of a vibrational energy dissipating material selected from the group of: silicone elastomers, butyl rubber, polyurethane, and combinations thereof.

Applicator Insertion

Figure 56:
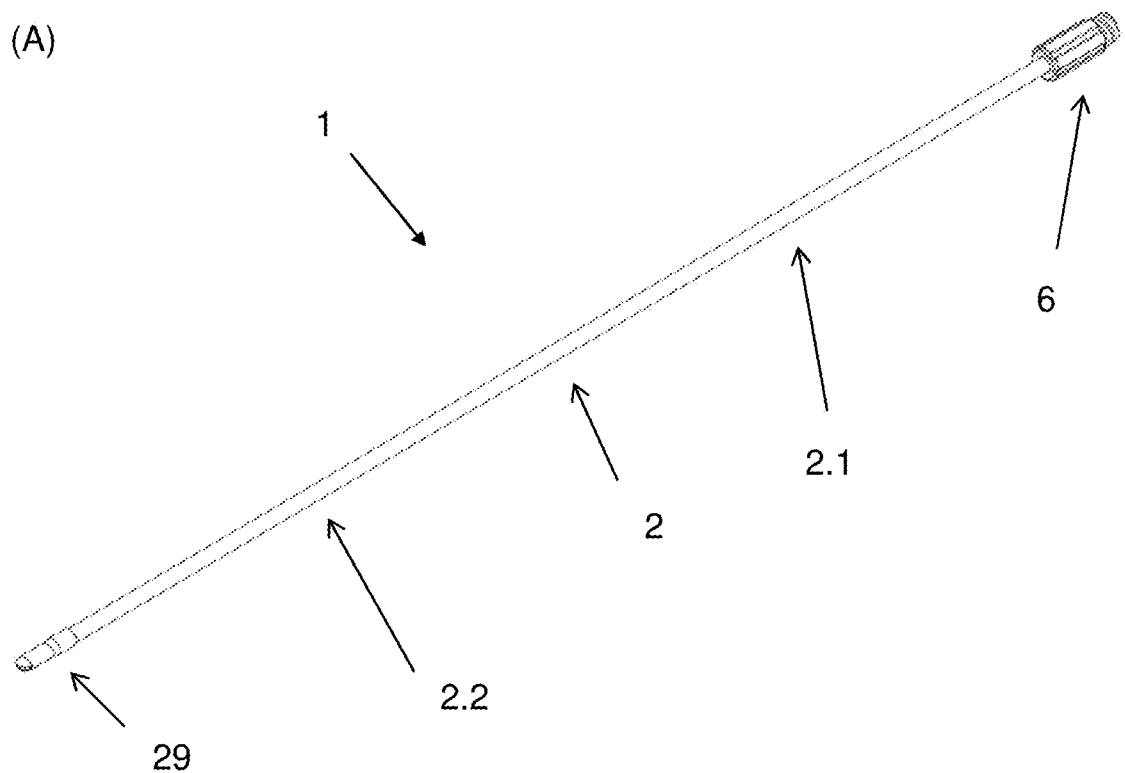
FIG. 56 shows an embodiment of the applicator according to the present disclosure optionally comprising a delivery tube with low tension build-up (A), and (B) when the applicator is inserted in a trocar.
Figure 56:
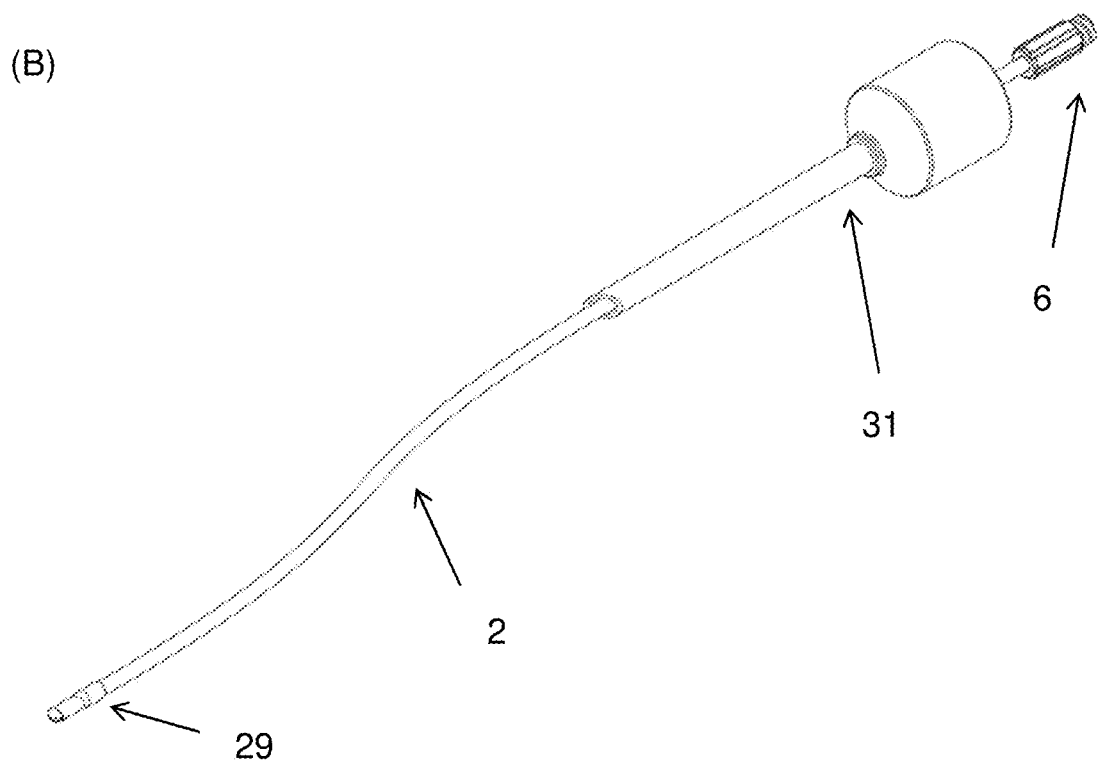

The applicator 1 is typically introduced or inserted from the surroundings and into the target site within a bodily cavity, e.g. an abdomen, via a trocar 31, as e.g. shown in FIG. 56B. Hence, the insertion includes navigating the distal end of the applicator into the console surgeons' field of view before the applicator is handed over to the robot instrument, and the applicator is being gripped and manipulated by the robotic arm.

The insertion navigation is performed by pushing the applicator forward, i.e. towards a distal direction, while directing the applicator distal end 2.2 or tip 9 towards the target site. The directing of the tip may be obtained by tilting the applicator or the trocar that pivots around the trocar insertion point. The insertion and navigation may be supported by a video transmission presented on an OR monitor, e.g. connected to a robot camera. This way, the assistant has the same view of the abdomen as the console surgeon.

The insertion navigation is facilitated by the mechanical properties of the delivery tube, and it may be specifically advantageous if the delivery tube 2 and/or an assembly including the delivery tube is stiff enough to carry the weight of the distal section 2.2, optionally including the grip section 29, such that the delivery tube is exiting or coming out of the trocar 31 with minimal deflection, as illustrated in FIG. 56B. If the delivery tube is soft (e.g. by comprising a material with a lower modulus of elasticity) and/or is deformable with limited tension build-up (e.g. by comprising a an energy dissipating material), then the tube will have no inherent mechanical support to be free-standing or self-supporting, and the distal end and tip will be pulled by gravity and just drop down immediately below the insertion point, such that they cannot be navigated to the desired target area. However, once inserted and handed over to the robot instruments, the delivery tube is advantageously soft, flexible without inherent mechanical rigidity, and deformable with limited tension build-up, such that it may be moved around freely without tension build-up, as described above.

To facilitate that the delivery tube may be both spatially manipulated with minimal tension build-up at a target site within a bodily cavity, while also being easily introduced or inserted and directed from the surroundings to the target site, the applicator advantageously further comprises an insertion guide 32 for at least temporarily supporting a mechanically deformable and soft delivery tube during insertion. Accordingly, the insertion guide may form an assembly with the delivery tube. Thus, the insertion guide facilitates an applicator, which is stiff and able to be directed during the insertion and hand over transition of the applicator to the robot instrument, and which is soft, flexible deformable without tension build-up once the robot arm and console surgeon has taken control. The insertion guide thus enables the changeover from a stiff to a flexible soft applicator.

In an embodiment of the disclosure, the applicator further comprises an insertion guide for supporting the delivery tube.

Figure 18:
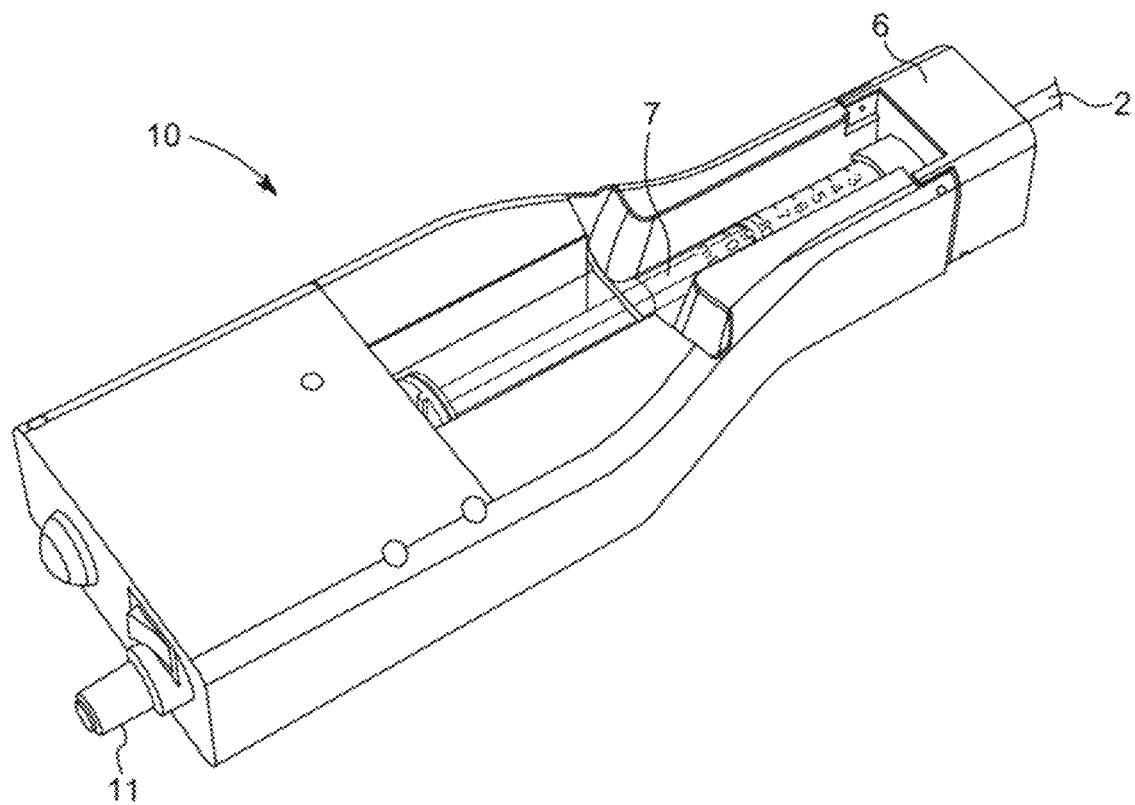
FIG. 18 shows a driver unit holding a fluid source (here a syringe). The driver unit may feature various controls such as a flow controller for controlling the flow rate of the substance being released from the applicator.

The insertion guide 32 is advantageously a temporarily or provisional mechanical support for the delivery tube, preferably when the delivery tube is configured to be flexible, deformable, soft, and configured to be mechanically stress free or stress released upon the deformation associated with the tip manipulation. FIG. 56A shows an embodiment of the applicator 1 according to the present disclosure, which may comprise a soft delivery tube 2 with low tension build-up. The distal end 2.2 may include a grip section 29, and the proximal end 2.1 may include a connector 6 for e.g. connection of the delivery tube to a fluid source. For example, the connector may be attached directly to a reservoir or syringe containing the hemostatic agent, e.g. via a luer connector, or may be configured to be integrated as a part of the driver unit, as shown in FIG. 18. When the applicator is inserted in a trocar 31, as shown in FIG. 56B, and the delivery tube is soft and has no inherent mechanical support to be free-standing or self-supporting, then the distal end and tip will just be pulled by gravity when exiting the trocar, and cannot be navigated to the desired target area.

Figure 57:
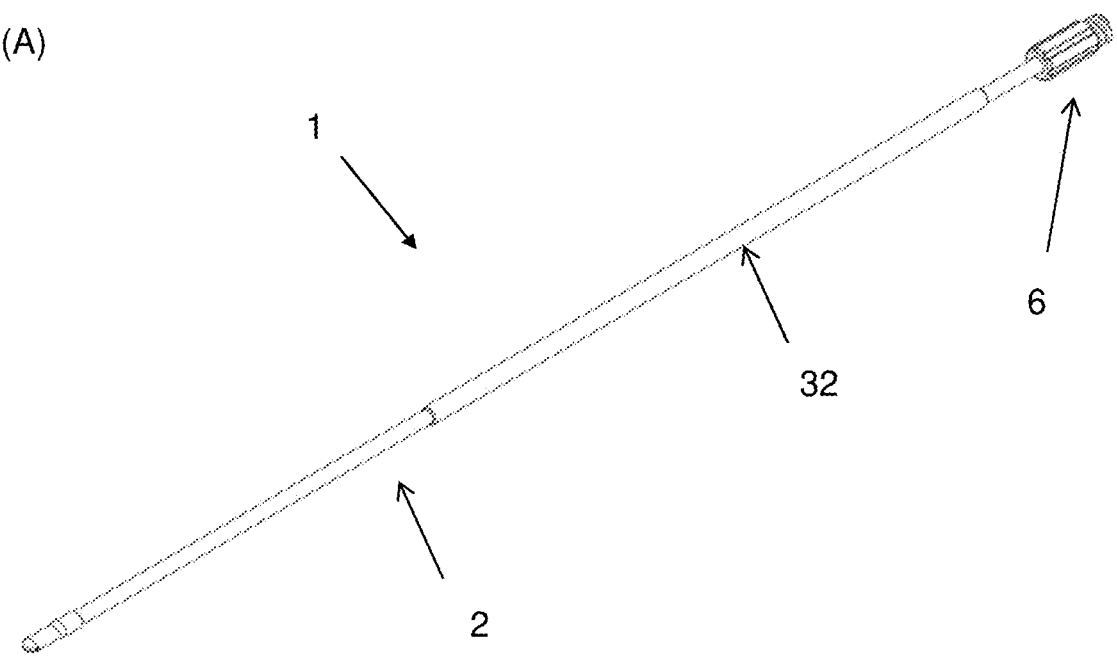
FIG. 57 shows an embodiment of the applicator according to the present disclosure comprising an insertion guide for supporting the delivery tube, where the insertion guide is (A) a reinforced rear section, and (B) a retractable exoskeleton as seen with and without the tube in respectively the upper and lower figure.
Figure 57:
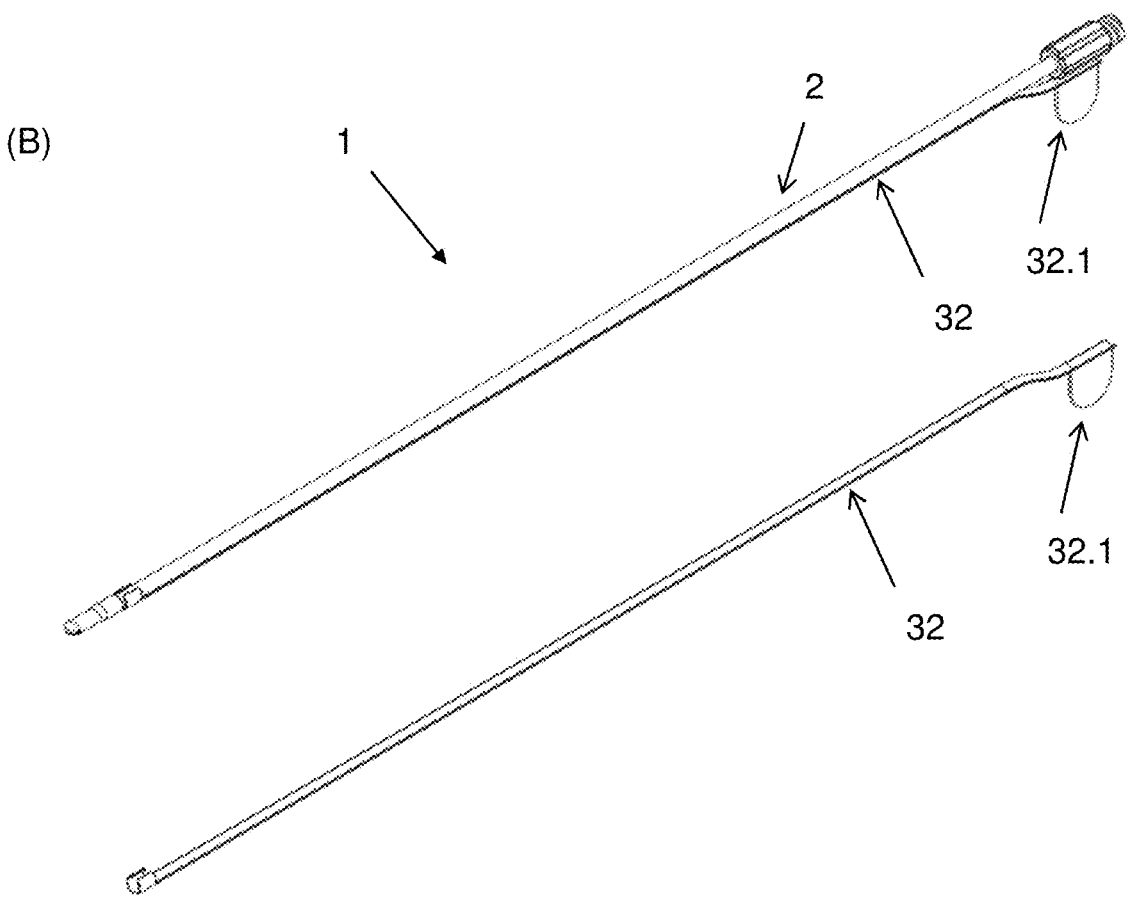
Figure 58:
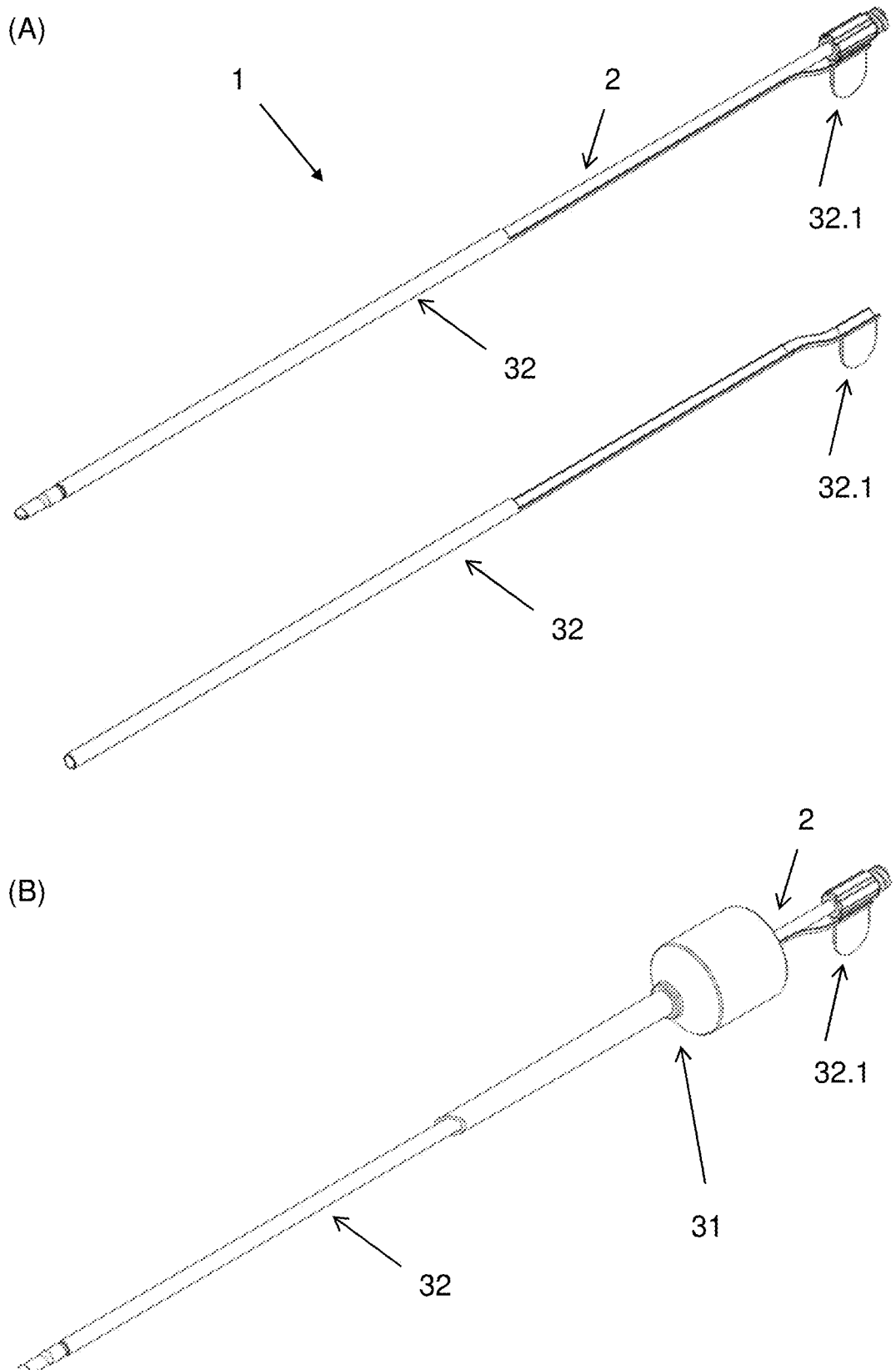
FIG. 58 shows an embodiment of the applicator according to the present disclosure comprising an insertion guide for supporting the delivery tube, where the insertion guide is (A) a retractable outer tube as seen with and without the tube in respectively the upper and lower figure, and (B) when the applicator with the retractable outer tube is inserted in a trocar.
Figure 59:
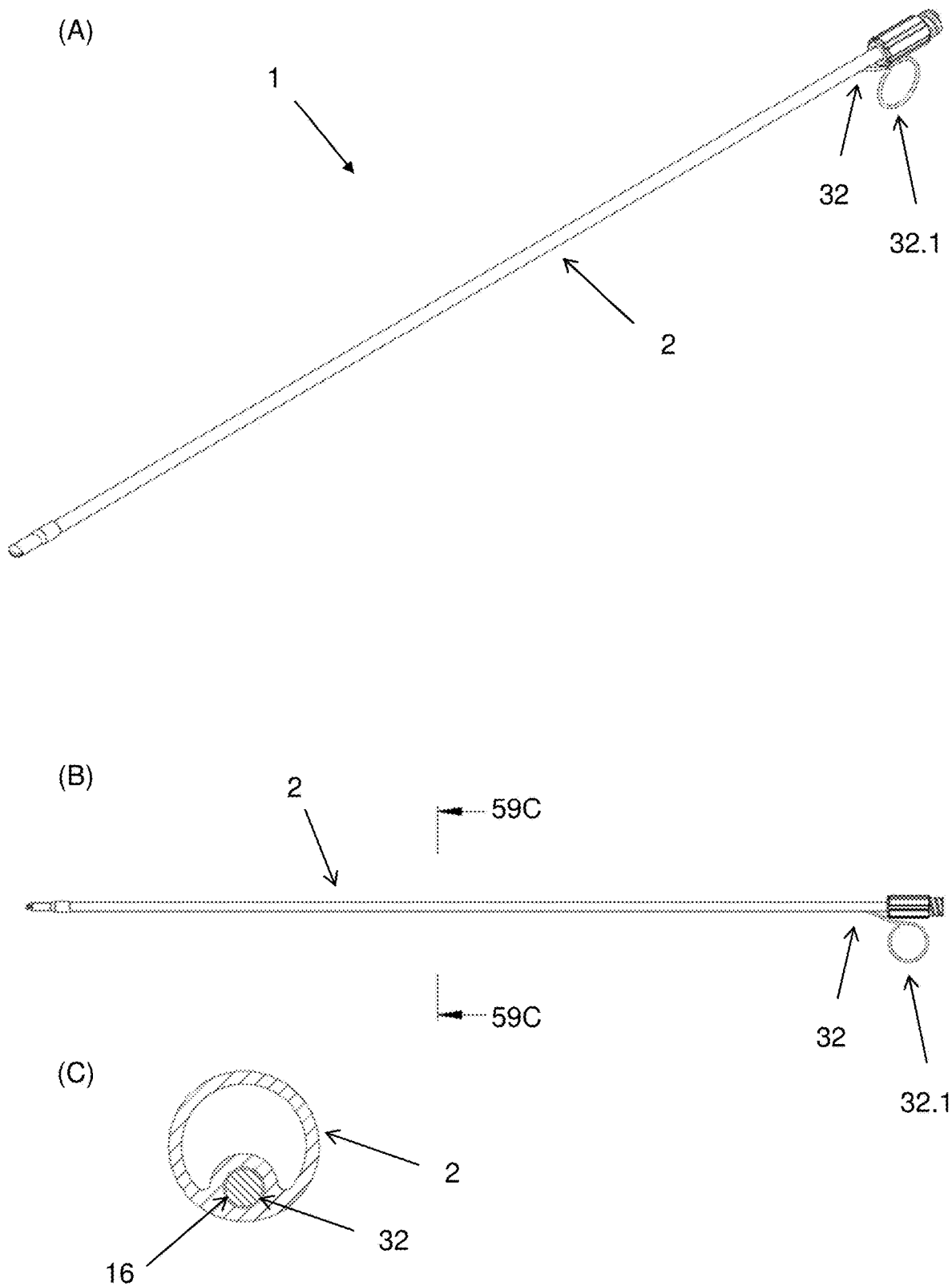
FIG. 59 shows an embodiment of the applicator according to the present disclosure comprising an insertion guide for supporting the delivery tube, where the insertion guide is a retractable guide wire as seen (A) in perspective view, and (B) in side view (upper figure) and (C) in cross sectional view (lower figure), wherein the cross section is taken along the line indicated by 59C in FIG. 59B.

The insertion guide may be in the form of a partially supporting frame or a retractable frame, as exemplified in FIGS. 57-59. Thus, the frame is supporting or carrying the delivery tube, such that the assembly thereby obtain a partial or temporary stiffness or rigidity such that it may be easily navigated to the desired target area, and handed over to the robot arm. For example, the frame may be detachably attached to the delivery tube, such as attached slidably in the axial direction of the tube, such that it is easily retractable after the robot arm has obtained contact with the delivery tube. To act as an insertion guide, the guide comprises a rigid material with a modulus of elasticity higher than the delivery tube.

In an embodiment of the disclosure, the applicator comprises an insertion guide for supporting the delivery tube, wherein the insertion guide is configured to be slidably along the axial direction of the delivery tube.

FIG. 57A shows an embodiment of the applicator 1 according to the present disclosure comprising an insertion guide 32 for supporting the delivery tube 2, where the insertion guide is a reinforced rear section or proximal end 2.1. Accordingly, the delivery tube is reinforced by an additional material, e.g. in the form of a sheath or an outer tube mounted on the flexible delivery tube, or by an addition of another material with higher modulus of elasticity. The reinforcement is located in the proximal end of the delivery tube, i.e. from a certain distance from the applicator tip, to facilitate a movement of the tube in the distal direction, and may extend such that it covers the flexible delivery tube up until or in a distance from the connector element 6, as shown in FIG. 57A.

FIG. 57B shows an embodiment of the applicator 1 according to the present disclosure comprising an insertion guide 32 for supporting the delivery tube 2, where the insertion guide is a retractable exoskeleton. The retractable exoskeleton is seen with the delivery tube in the upper figure, and without the tube in the lower figure.

The rigid exoskeleton may be mounted on the outside of the delivery tube, and comprise a retainer, such as a u-shaped hoop to ensure attachment of the distal end of the delivery tube to the frame, e.g. by the hoop being placed just behind the applicator tip. Thus the retainer or u-shaped hoop may maintain the assembly of the tube and insertion guide, and prevent the exoskeleton to fall off or be separated from the flexible tube unintentionally. The exoskeleton may push the applicator tip and flexible tube forward towards the distal direction during insertion by the user pushing a handle 32.1, as shown in FIG. 57B.

Once the distal end or applicator tip is transferred to the robot instrument and is thus in contact with the robot arm, the exoskeleton may be pulled backwards to release the tube, such that it is freely flexile and stress-free during maneuvering by the robot instrument. The u-shaped hoop may slide axially along the delivery tube and thereby move relatively to the tube the trocar. Further, the hoop may act as an end stop, such that the exoskeleton can only be pulled back until hitting the connector element 6. This may facilitate the reintroduction of the insertion guide. For example, if the applicator is removed and inserted again later during the surgical procedure, the exoskeleton can easily be pushed forward to the front position or distal end of the delivery tube once again.

FIG. 58 shows an embodiment of the applicator 1 according to the present disclosure comprising an insertion guide 32 for supporting the delivery tube 2, where the insertion guide is a retractable outer tube, i.e. a tube concentrically surrounding the delivery tube and slidable in the axial direction. FIG. 58A shows the retractable outer tube with a delivery tube (upper figure), and without a delivery tube (lower figure), and FIG. 58B shows the applicator with the retractable outer tube when inserted in a trocar 31.

For example, the outer tube may be a thin-walled tube mounted on the flexible delivery tube. Accordingly, the assembly with the applicator tip and the distal end of the tube may be pushed forward in the distal direction during insertion by the outer tube, as indicated in FIG. 58A.

Once the distal end or applicator tip is transferred to the robot instrument and is thus in contact with the robot arm, the outer tube may be pulled backwards to release the tube, such that it is freely flexile and stress-free during maneuvering by the robot instrument. The tube may be slidably advanced and pulled backwards along the axial direction of the tube by a handle 32.1 located on the outer tube, thereby allowing a user to slide it back and forth.

The proximal section of the outer tube may be cut up, e.g. cut open to form a halfpipe, as most clearly seen in the lower part of FIG. 58A. This may facilitate that the flexible delivery tube can deflected or bend aside at the trocar entrance when retracted. The length of the cut section may preferably be shorter or correspond to the length of the trocar to ensure an overlap between the outer tube and the trocar, and thereby provide sufficient stiffness of the distal section, as indicated in FIG. 58B.

In case the applicator must be removed and inserted again later during the surgical procedure, the outer tube may again be advanced in the distal direction by pushing it forward to the front position once again.

FIG. 59 shows an embodiment of the applicator 1 according to the present disclosure comprising an insertion guide 32 for supporting the delivery tube 2, where the insertion guide is a retractable guide wire. FIG. 59A shows the guide wire in perspective view, and (B) in side view (upper figure) and (C) in cross sectional view (lower figure), wherein the cross section is taken along the line indicated by 59C in FIG. 59B.

The guide wire can move back and forth inside a dedicated lumen 16 in the delivery tube 2. The lumen may be similar to the lumens described in FIG. 22. When the guide wire is located in a distal end of the delivery tube it may provide sufficient stiffness and rigidity during insertion. When the guide wire is retracted to be located in a proximal end, the distal end will be freely flexile and stress-free during maneuvering by the robot instrument. The advancement and retraction of the guide wire may be controlled by a handle 32.1, as shown in FIG. 59.

In case the applicator must be removed and inserted again later during the surgical procedure, the guide wire may be advanced in the distal direction by pushing it forward to the distal position once again.

Controllable Substance Release

Figure 15:
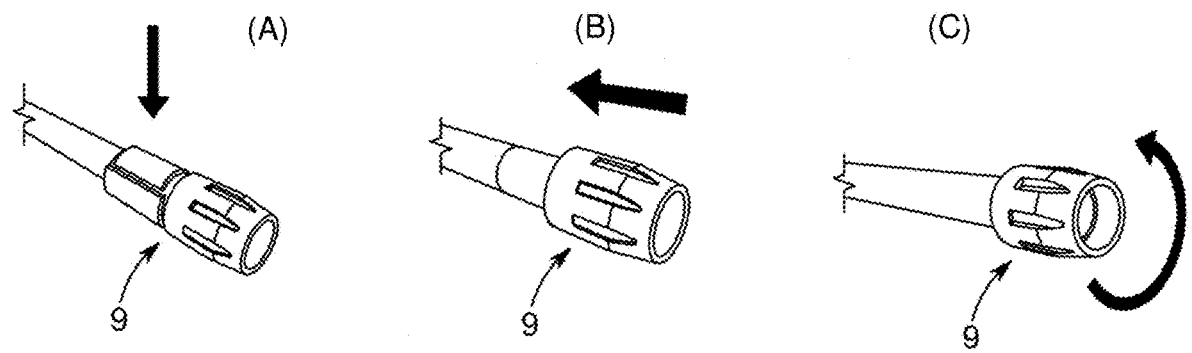
FIG. 15 shows three different activation mechanisms of the actuator: pushing (A), pulling (B), and rotating (C).

For precise, reliable and user friendly substance discharge at a selected site, e.g. for intra-abdominal substance dispense, the substance release may advantageously be controlled by the robotic arm. This may be obtained by one or more actuators 2.6, e.g. in the form of a valve, configured for releasing the substance from the delivery tube. To make the movements of the robotic arm more efficient, the one or more actuators are preferably located in the vicinity of the applicator tip used for the spatial manipulation of the delivery tube. Hence, the actuators are preferably located at the distal end, and/or within the one or more rigid surface areas of the delivery tube, and/or on the applicator tip. For example, the actuator 2.6 may advantageously be located within an opening 2.5 of the rigid surface area, as illustrated in FIG. 2. Thus, only a relative small translation of the robotic arm is needed after the robotic arm has oriented the distal end to a selected target site via the rigid surface area, and for the robotic arm to activate the actuator for releasing the substance. The actuator may be configured to activate by a pressure force, e.g. applied by the robotic arm, or by an electrical current, e.g. applied by an energy tool. In one embodiment, the actuator is provided in the form of a pressure-sensitive button, e.g. located on the applicator tip, wherein the button is configured to open the valve upon being pressed. The actuator/button may be sensitive to the amount of pressure (e.g. in a stepwise or continuous manner), such that the valve opens to a certain degree based on the applied pressure to the actuator/button. In another embodiment, the actuator is configured to be activated by pulling the actuator along a longitudinal axis of the tube/applicator tip and/or by rotating the actuator around the longitudinal axis. These embodiments are illustrated in FIG. 15.

In an embodiment of the disclosure, the distal end comprises one or more actuators configured for releasing the substance from the delivery tube by the robotic arm. In a further embodiment, the one or more actuators are located within the one or more rigid surface areas, such as within an opening of the rigid surface area.

In an embodiment of the disclosure, the at least one actuator covers a predefined circumferential section of the tube and/or applicator tip, such as less than 180° of the circumference of the tube and/or applicator tip 9, preferably less than 140°. This embodiment is illustrated in FIG. 16(A). The advantage is that the applicator and thus also the applicator tip can be rotated so that the risk is reduced that the robotic arm accidentally activates the actuator 2.6. In another embodiment, the at least one actuator covers at least 180° of the circumference of the tube and/or applicator tip.

The advantage is that the robotic arm can activate the actuator 2.6 irrespective of the rotational orientation of the applicator and the actuator. The substance can be delivered from the applicator without having the orient the applicator correctly in relation to the robotic arm. In yet another embodiment, two actuators are provided on opposite parts of the applicator tip and/or tube, each of said actuators covering less than 120° of the circumference of the tube and/or applicator tip, preferably less than 90° each. The advantage is again that the applicator and thus also the applicator tip can be rotated so that the risk is reduced that the robotic arm accidentally activates the actuator 2.6. This is illustrated in FIG. 16(B). In yet another embodiment, the at least one actuator covers 360° of the circumference of the tube and/or applicator tip, such that the at least one actuator surrounds a part of the tube and/or applicator tip. This is illustrated in FIG. 16(C). Providing the applicator tip with an actuator, e.g. a pressure sensitive button, surrounding the entire circumference of the tip has the advantage that it enables 360° activation, i.e. the robotic arm may activate the actuator/button regardless of how the actuator is gripped.

The one or more actuators 2.6 may be in the form of a valve 2.7, or in combination with one or more valves, such as electronically or manually controlled valves. Accordingly, the applicator may comprise at least one valve configured for releasing the substance from the delivery tube upon opening of said valve. The valve(s) may be controllable by an actuator located on the applicator and/or by an external actuator, such as a foot pedal. The actuator/button may be located at the distal end of the delivery tube, such as on the rigid section, on the applicator tip, or on an external device such as the driver unit. Preferably, the actuator/button is placed directly above the valve. Advantageously, the at least one valve is activated by a pressure, such as a manual pressure from a robotic arm. Hence, by pressing the actuator 2.6, the valve 2.7 is either electronically or manually activated to open and release the substance, as e.g. illustrated in FIG. 5. Accordingly, the applicator may comprise at least one actuator configured to open and/or close the at least one valve. To ensure the substance is efficiently transported to and through the distal tip, the valve is preferably a one-way valve. The at least one valve may be a pressure activated valve, such as a valve having a pre-defined opening pressure threshold. Preferably, the substance is dispensed from the applicator when the pre-defined opening pressure threshold is exceeded. The at least one valve may be located in the delivery tube and/or in the applicator tip. Alternatively, the applicator does not comprise a valve, but rather is dimensioned such that the substance is retained within the applicator below a certain pressure threshold. This can be achieved e.g. by providing a long delivery tube (e.g. more than 30 cm) with a small diameter (e.g. 2-4 mm or less), whereby the delivery tube itself provides a resistance to fluid flow inside the tube.

Figure 5:
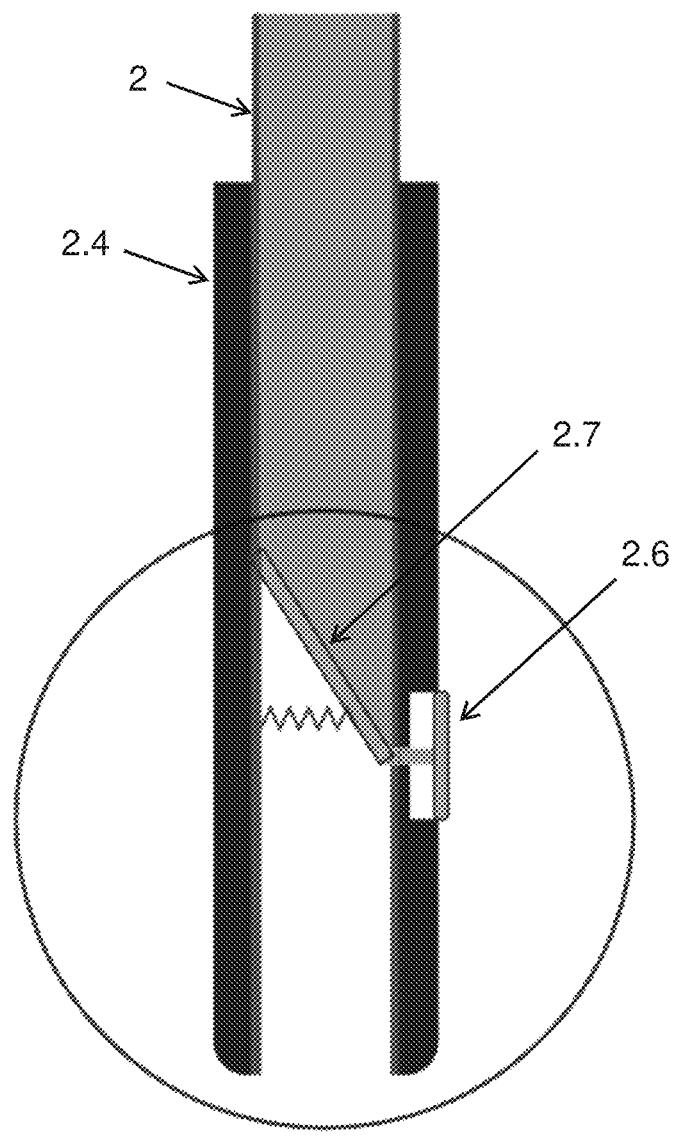
FIG. 5 shows an embodiment of an applicator according to the present disclosure comprising a spring-loaded check valve.

To improve the simplicity of the applicator and to reduce the number of electronic controls and components, the actuator is advantageously a manually controlled valve. An examples of manually pressure controlled valve is a spring-loaded check valve 2.7 as shown in FIG. 5, where the spring force may be configured to be overcome by the pressure applied by e.g. a robotic arm.

In another example, the actuator 2.6 when activated will not necessarily activate the valve 2.7 mechanically, but may send an electric signal to a pressure source (not shown) to be activated and provide a pressure on the substance that will overcome the spring of the spring-loaded check valve 2.7 so that the spring-loaded check valve 2.7 opens and the substance is flowing out of the delivery tube 2.

Another example of a one-way valve, which may be manually pressure controlled, is elastomeric one-way valves, such as duckbill valves and cross slit valves.

Figure 6:
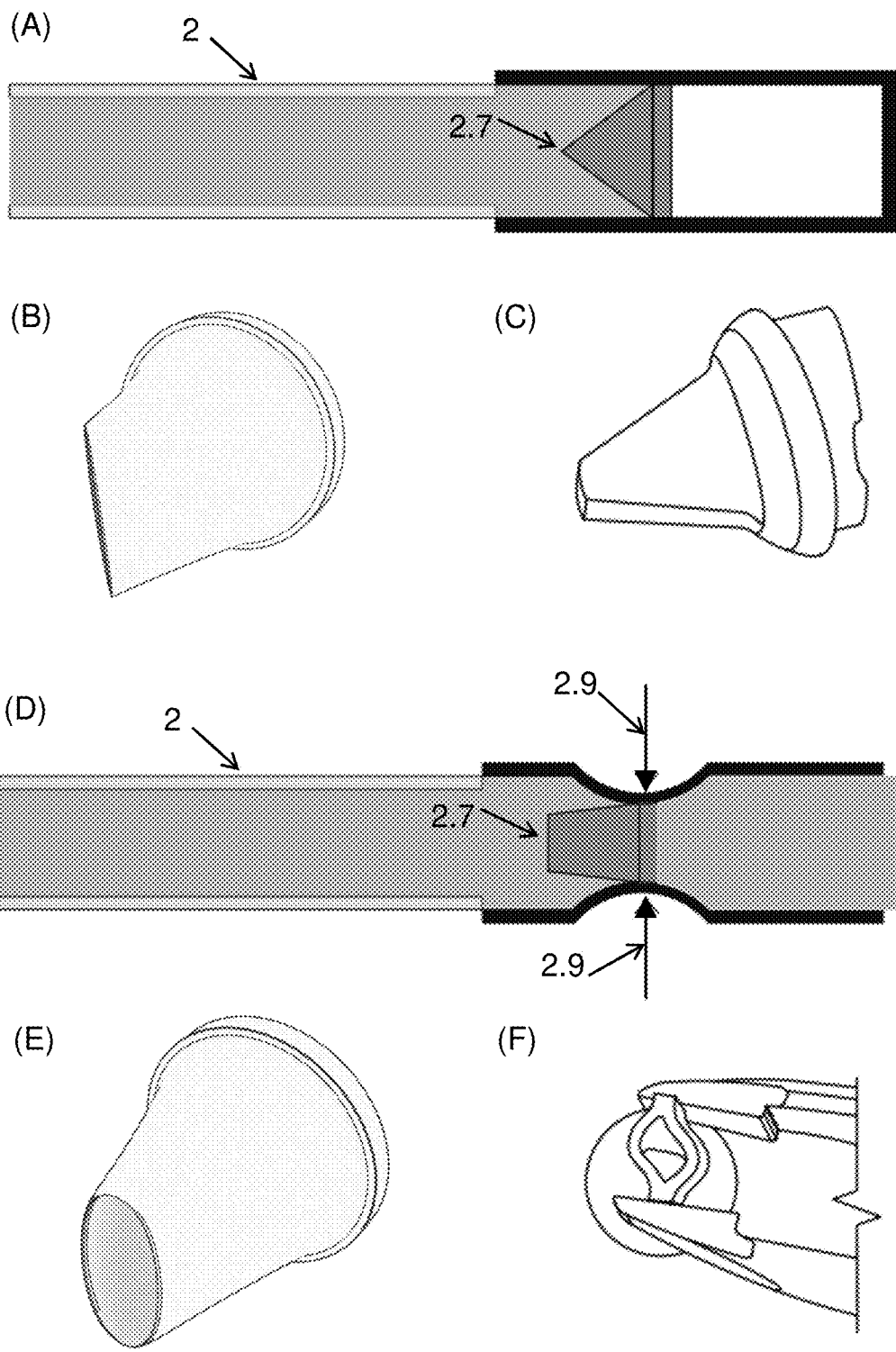
FIG. 6 shows an embodiment of an applicator according to the present disclosure comprising a duckbill valve.

For example of a manually pressure controlled valve is a duckbill valve 2.7 as shown in FIG. 6. A duckbill valve is made of an elastically deformable material, and comprises a deformable linear closure. A perspective view of a duckbill valve in the non-deformed and closed state is shown in FIGS. 6B-C. FIG. 6A shows an embodiment of a duckbill valve within the delivery tube 2, where the duckbill valve in the non-deformed state is seen to prevent flow from left to right in the Figure. When the duckbill valve is elastically deformed, e.g. by a compressive pressure along arrows 2.9 and in parallel with the linear closure, as illustrated in FIG. 6D, the linear closure is deformed, whereby the valve is opened and allows flow from left to right in the Figure. Close up perspective views of an embodiment of a duckbill valve in the deformed open state is shown in FIGS. 6E-F.

It follows that an elastomeric valve comprising any number and orientation of the deformable closures may be used. However, to ensure precise actuation, elastomeric valves, where the opening of the valve is obtained by a well defined pressure orientation, are preferred. For a duckbill valve, opening of the valve is only obtained when the compressive pressure is applied in parallel with the linear closure.

A cross slit valve is similar to a duckbill valve, but comprises two deformable linear closures, which are oriented perpendicular to each other. Thus, opening of the valve may be obtained when a compressive pressure is applied in parallel with any of the linear closures. This has the advantage that for a robotic grasper arm, the valve may be actuated in at least two positions.

In a further embodiment, the one or more actuators are one or more valves. In a further embodiment, the one or more valves are pressure activated valves. In a further embodiment, the one or more valves are selected from the group of: one-way valve, elastomeric one-way valve, duckbill valve, cross slit valve, and spring-loaded check valve.

Controllable Substance Release—Grip Section

The grip section 29 may include an activation section 29.3, which is located in longitudinal or axial extension of the grip section 29.1, as shown in FIGS. 48 and 49. The activation section may comprise an actuator 2.6 or transmitting unit 27, such that the applicator tip is configured to controllably releasing a substance from the delivery tube by the robotic arm, by an activation section configured to be subjected to a predefined force by the robotic arm.

To reduce the dimensions of the grip section, e.g. to a short length (L) of between 30-35 mm, the activation area may be combined and coinciding with the grip section, as shown in FIG. 48A. Hence, the grip section may be configured to both facilitate a robust grip for spatial manipulation, as well as to provide a separate activation signal. For example, the grip section may be both touched and clamped by the robot arm or instrument jaws with different grip forces, which may be detected by the combined grip and activation section. Different grip forces may be detected by a grip section comprising an electronic or electro-mechanical switch, pressure sensitive film, or optical pressure sensor.

At a certain pressure a signal is transferred to the driver system and hemostatic agent is delivered through the tip nozzle. Hence, in this tip there is also space for grasping without activating the driver system, so the surgeon can navigate the tip to the desired position for delivery with one instrument and initiate the activation with another instrument. The activation area and the force required for providing signal to the driver system can be balanced. Hereby the tip can be grasped on the activation area with a certain force, so it can be moved around without activation. Once the surgeon applies full clamping force the activation area exceeds a threshold, and a signal is transferred to the driver system. Thereby the tip can be navigated and activate by one instrument only.

In an embodiment of the disclosure, the activation section is located in axial extension of the grip section. In another embodiment, the activation section is coinciding with the grip section. In a further embodiment, the activation section is configured to activate a substance release mechanism, when the predefined force is exceeded.

Alternatively, the grip section may be dimensioned to include one or more separate grip sections and activation sections in axial extension, where the different sections may be configured to be subjected to different predefined forces by the robotic arm, as shown in FIGS. 48B-F.

Controllable Substance Release—Nozzle

The applicator tip comprises a nozzle for dispensing the substance, and the nozzle 29.2 may be comprised within the grip section 2, as illustrated in FIG. 46A. Hence, the nozzle is the geometry forming a transition from the inner flow path of the delivery tube and applicator tip, to the most distal end of the applicator tip. The outer geometry of the nozzle is preferably rounded, e.g. spherical or elliptical, as shown in FIG. 46A, to establish a smooth surface minimizing risk of injury to the patient in case of the tip being pushed against tissue, organs or intestines.

In an embodiment of the disclosure, the shape of the nozzle is selected from the group of: conic, spherically blunted conic, bi-conic, tangent ogive, elliptical, parabolic.

The nozzle geometry 29.2 comprises the nozzle opening and the nozzle lumen (h), as indicated in FIG. 46A. Hence, the nozzle lumen forms a part of the substance flow path going from the delivery tube 2. The geometry of the substance flow path from the lumen of the delivery tube to the nozzle opening, including the nozzle geometry, as well as the properties of the substance to be dispensed, determine the geometry or profile of the dispensed substance, when it is deposited on e.g. a tissue substrate. Specifically, the nozzle geometry may influence the dispense rate, dispense angle and coverage degree.

The geometry of the dispensed substance is particularly important for a dispensed hemostatic agent, because it determines the adhesion degree, the ability to cover an area, and the efficacy of the hemostatic agent. For example, a hemostatic agent often needs to be applied on inclined surfaces within the body, e.g. on an inclined tissue surface. Hence, the nozzle is advantageously configured to discharge substance, preferably a substance comprising a haemostatic agent, in a predefined geometry, which may provide improved coverage and adhesion. In an embodiment of the disclosure, the applicator tip and/or grip section comprises a nozzle at the distal end of the tip, wherein the nozzle is configured to discharge substance in a predefined geometry.

Figure 50:
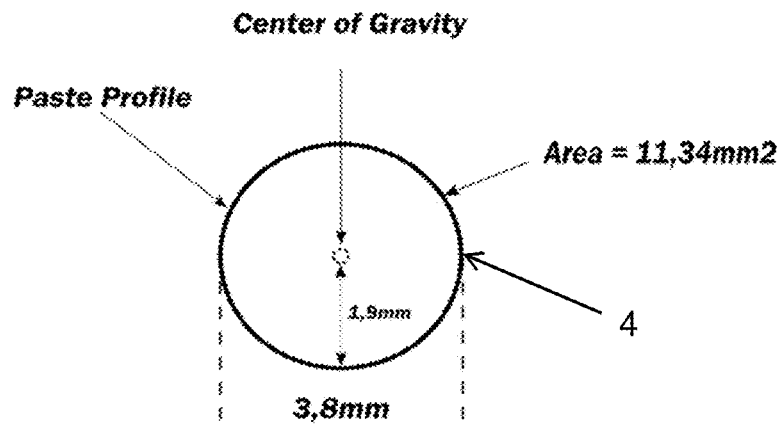
FIG. 50 shows embodiments of the cross sectional profile of the deposited substance after discharge of an applicator and nozzle according to the present disclosure, where the substance is discharged from a cylindrical nozzle (A), or a non-cylindrical nozzle (B-C).
Figure 50:
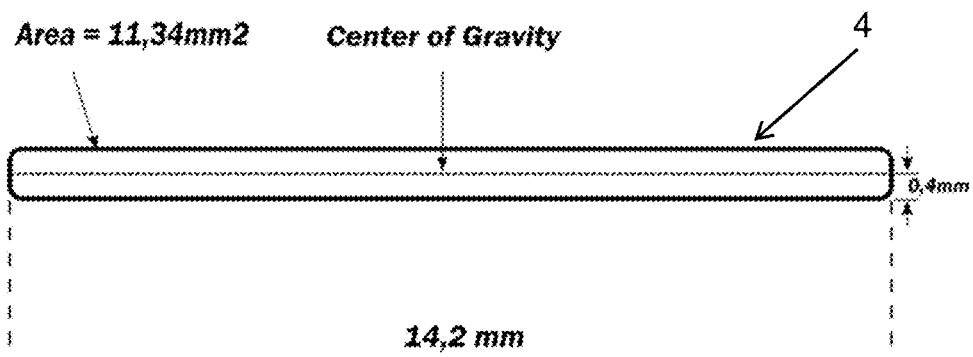
Figure 50:
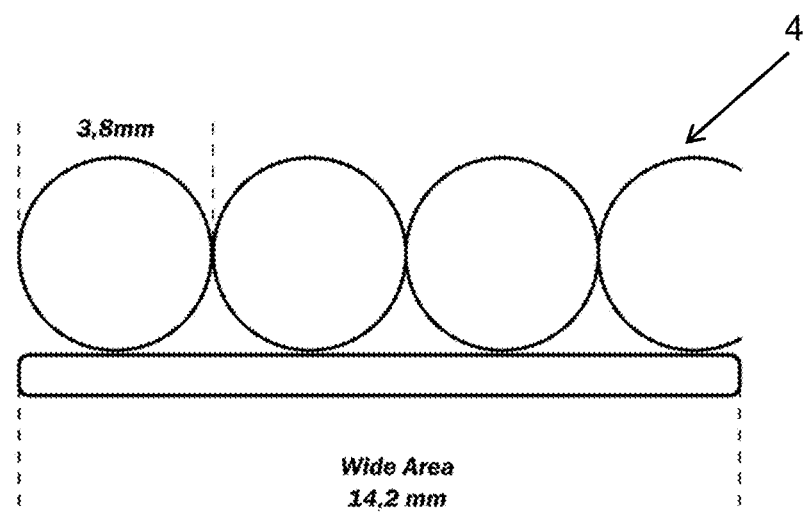

Applicators may comprise a nozzle 29.2 having a cylindrically shaped opening. Hence, the profile of the extruded hemostatic agent, e.g. a paste, will take the shape of the cylindrical opening, leading to cylindrical paste 4 profiles, seen in cross sectional view in FIG. 50A, and perspective view in FIG. 51A. A cylindrical profile has a relatively low contact area to the body surfaces, and will therefore be prone to fall off, as shown in FIG. 50A. The surgeon may try to smear on the hemostatic agent to the bleeding surface to achieve improved adhesion, but this can be difficult to achieve due to the location and type of bleeding.

Figure 51:
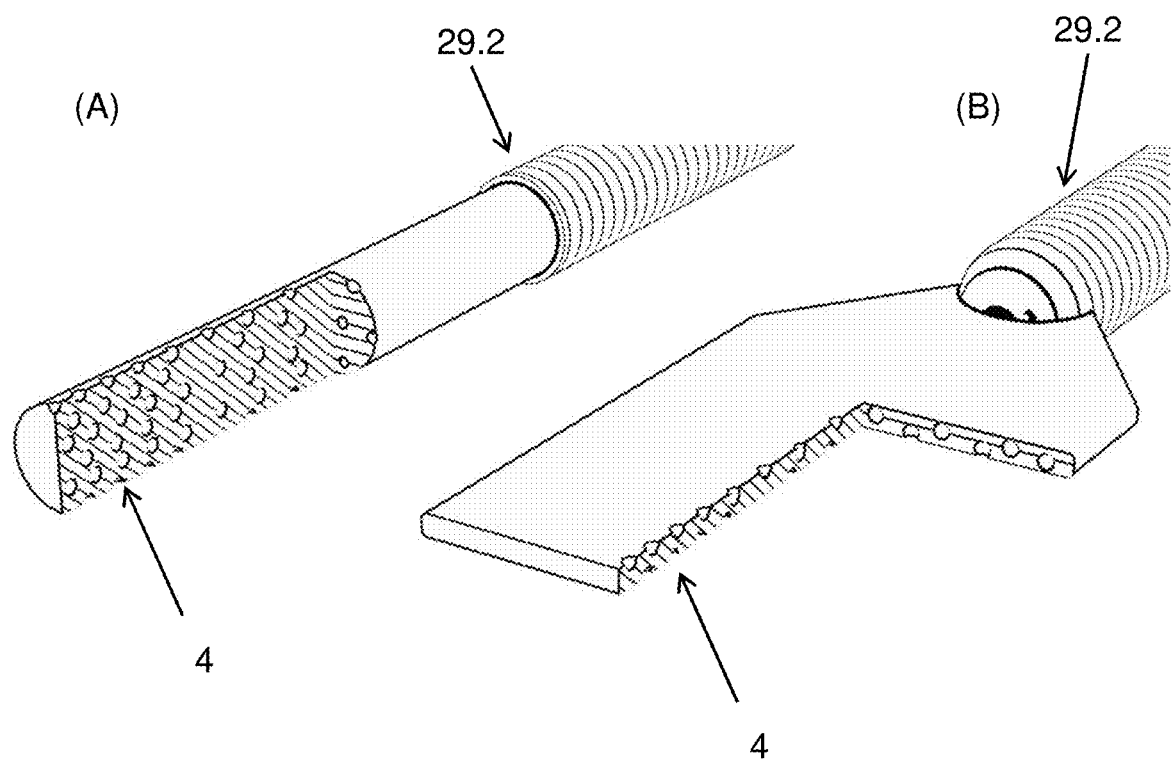
FIG. 51 shows embodiments of the profile of the deposited substance after discharge of an applicator and nozzle according to the present disclosure, where the substance is discharged from a cylindrical nozzle (A), or a non-cylindrical nozzle (B).
Figure 52:
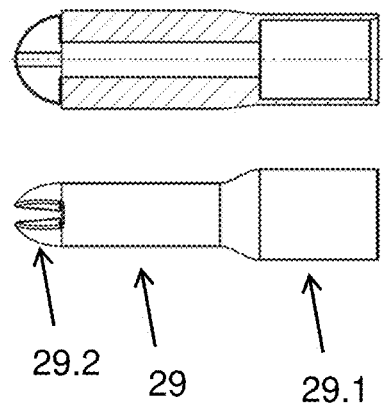
FIG. 52 shows two embodiments (A and B) of the grip section and nozzle according to the present disclosure seen in longitudinal cross section (left upper image), perspective side view (left lower image), and from a distal end view (right image).
Figure 52:
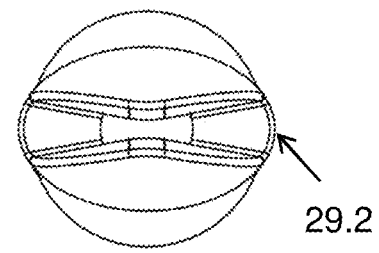
Figure 52:
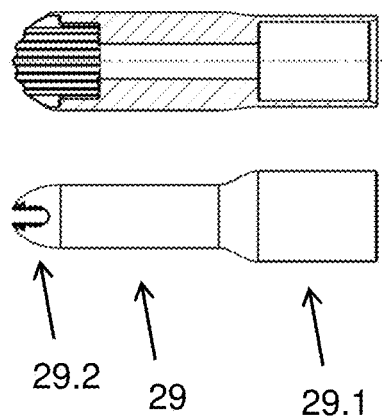
Figure 52:
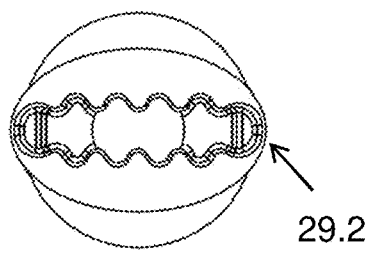

To provide improved adhesion, the nozzle 29.2 may be configured to discharge a substance 4 with a non-cylindrical profile, by having at least a non-cylindrical nozzle opening. Advantageously, the nozzle opening is shaped to discharge substance in a pattern with a lower center of gravity and having a wider area than height in cross section, as illustrated in cross sectional view in FIGS. 50B-C and perspective view in FIG. 51B. For example, the nozzle opening may comprise a series of cylindrical openings, as shown in FIG. 50C, or a relatively rectangular opening as seen in cross sectional view in FIG. 50B, and perspective view in FIG. 51B. The nozzle opening may further be configured to provide profiles which are irregular, such that the discharged and deposited substance has an irregular profile, as the one in FIG. 50C. For example, the nozzle opening geometry as seen from a distal end perspective may be convex and/or concavely inclined (as seen in FIG. 52A), or corrugated (as seen FIG. 52B). The irregular profile may further improve the adhesion.

In an embodiment of the disclosure, the nozzle is configured to discharge substance in a predefined geometry selected from the group of: cylinder, planar, and corrugated planer. In a further embodiment, the cross sectional shape of the nozzle opening is selected from the group of: circular, rhombic, rectangular, curved rectangular, and concave rectangular.

To further improve the dispense angle, the nozzle opening may have a diverging geometry, for example the nozzle opening 29.2 may be a slit in a cone shaped nozzle, as shown in e.g. FIG. 48, thereby providing a larger dispense angle, as indicated in FIG. 51B.

Hence, the nozzle geometry is configured to provide a coverage pattern, which cover a much larger surface area than a nozzle with cylindrical opening. For example, a non-cylindrical nozzle opening may cover a 3.7 times larger surface area than a cylindrical, as indicated in FIG. 50B. Hence, the nozzle geometry provides a paste profile with improved adhesion, because the deposited paste profile is relative wider and lower, thus the ratio of the surface area in contact with the bleeding site relative to the mass of applied hemostatic agent is high, and the center of gravity of the dispensed paste is therefore close to the surface of the bleeding site compared to a cylindrical nozzle opening.

The nozzle opening adapted to deposit substance 4 with a lower centre of gravity, further has the advantage of providing an increased foaming effect, within the dispensed substance. The foaming effect is illustrated in FIG. 51, and is associated with the pressure drop when the substance exits the nozzle opening. Hence, the high pressure within the delivery tube, creates a foaming effect within the substance upon release, because there occurs a rapid transition from a high-pressure environment to a low-pressure environment as the hemostatic agent leaves the high-pressure environment within the delivery tube. For a substance with a lower centre of gravity, the travel distance for the air bubbles trapped within the film to the surface is shorter, due to the flat and thin layer of hemostatic agent deposited from the nozzle (FIG. 51B), compared to a cylindrical substance (51A), and hence the foaming effect will be stronger.

The foaming effect also depends on the dimensions of the delivery tube. The force applied to the delivery tube to dispense a paste is typically above 100 N for a delivery tube having an inner diameter below 2 mm. The force will be smaller, the larger the inner diameter, and for an inner diameter of ca. 3.8 mm, the force may be ca. 30 N to dispense a corresponding paste, and the foaming effect may be negligible.

Foaming is advantageous because it is associated with an increased dispense angle, further increasing coverage and improving adhesion. Foaming in the dispensed substance is further advantageous because the number of cavities in the foamy hemostatic agent, create a larger internal surface area with a corresponding increase in the number of sites on which blood platelets can adhere to and initiate hemostasis.

The improve the foaming effect, the nozzle geometry 29.2 may be adapted to enhance the pressure drop. This may e.g. be obtained by a nozzle opening having a height (h) below 1.0 mm, and/or a nozzle length (l) below 3.5 mm, as indicated in FIG. 46A. Further, the nozzle opening or lumen may be configured to be diverging towards the distal end, as shown in e.g. FIGS. 52A and 54D.

In an embodiment of the disclosure, the height of the nozzle opening is between 0.5-1.0 mm, such as 0.6, 0.7, 0.8, or 0.9 mm. In a further embodiment, the length of the nozzle lumen is between 2.0-3.5 mm, such as 2.2, 2.5, 2.7, or 3 mm. In a further, the nozzle opening is diverging towards the distal end.

Figure 54:
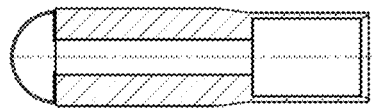
FIG. 54 shows embodiments of the grip section according to the present disclose comprising a nozzle or nozzle unit, as seen in longitudinal cross section (upper image) and side view (lower image) of (A-D), and seen from the distal end (E-F).
Figure 54:
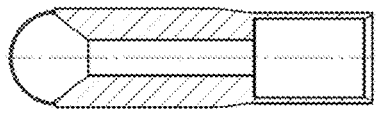
Figure 54:
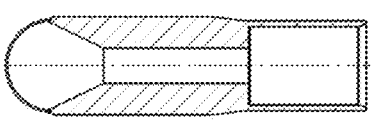
Figure 54:
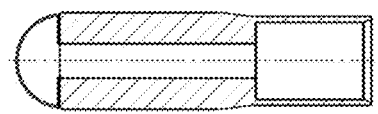
Figure 54:
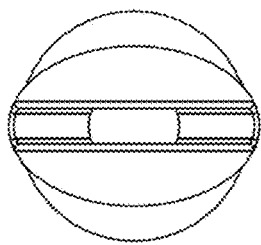
Figure 54:
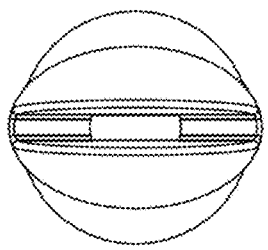

The applicator may be adapted to comprise different nozzle geometries, where the different nozzle geometries may be detached and attached. Hence, the applicator may include an interface, which facilitates switching between different nozzle units for the same delivery tube by release-and-attachment mechanisms such as snap fit or magnetic forces. For example, the nozzle 29.2 may be a detachably attached element, as indicated in FIG. 54, such that the same applicator may be applied to provide different profiles of the hemostatic agent 4 for different purposes and bleeding types, e.g. wide area coverage, spot coverage, line coverage. To facilitate switching between different nozzle units 29.2, the connection between the nozzle unit and the applicator tip 9 or grip section 29 may be abutting and abrupt (FIGS. 54A and D), or gradual (FIGS. 54B and C).

In an embodiment of the disclosure, the connection between a nozzle unit and the grip section is abrupt or gradual, and/or configured to be detachable.

Feedback Mechanisms

Advantageously, the applicator is configured to provide feedback e.g. on the applied pressure to the actuator/pressure-sensitive button, or feedback relating to the remaining volume of substance in the delivery tube. This feedback may be provided by integrating various sensors into the applicator. The applicator may comprise a first pressure sensor for sensing the pressure in the delivery tube. The pressure may be communicated wired or wirelessly to the user, e.g. the surgeon.

Figure 19:
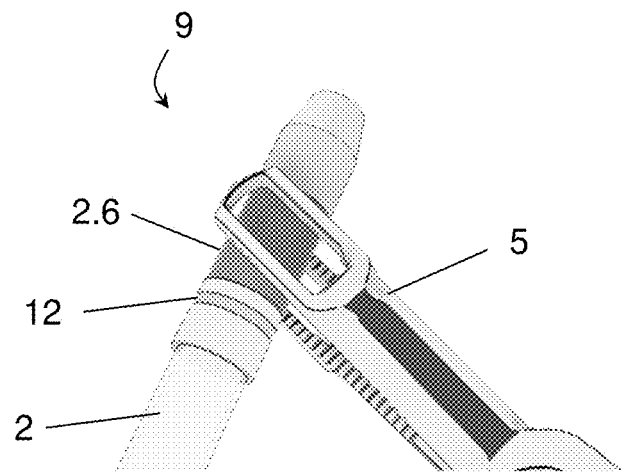
FIG. 19 shows an embodiment of an applicator tip according to the present disclosure, wherein the tip comprises an actuator and a pressure light indicator for indicating the applied pressure to the actuator.
Figure 20:
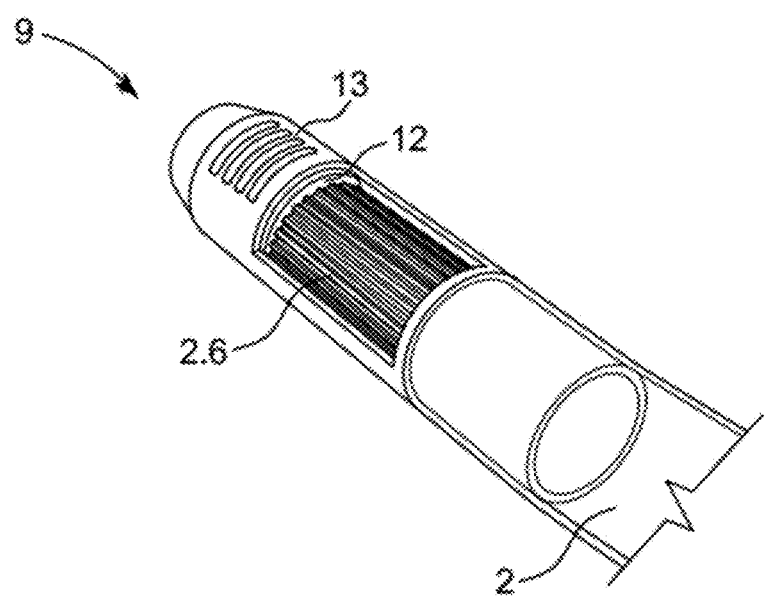
FIG. 20 shows an embodiment of an applicator tip according to the present disclosure, wherein the tip comprises an actuator, a pressure light indicator for indicating the applied pressure to the actuator, and a status indicator for indicating the remaining volume of substance in the delivery tube.
Figure 21:
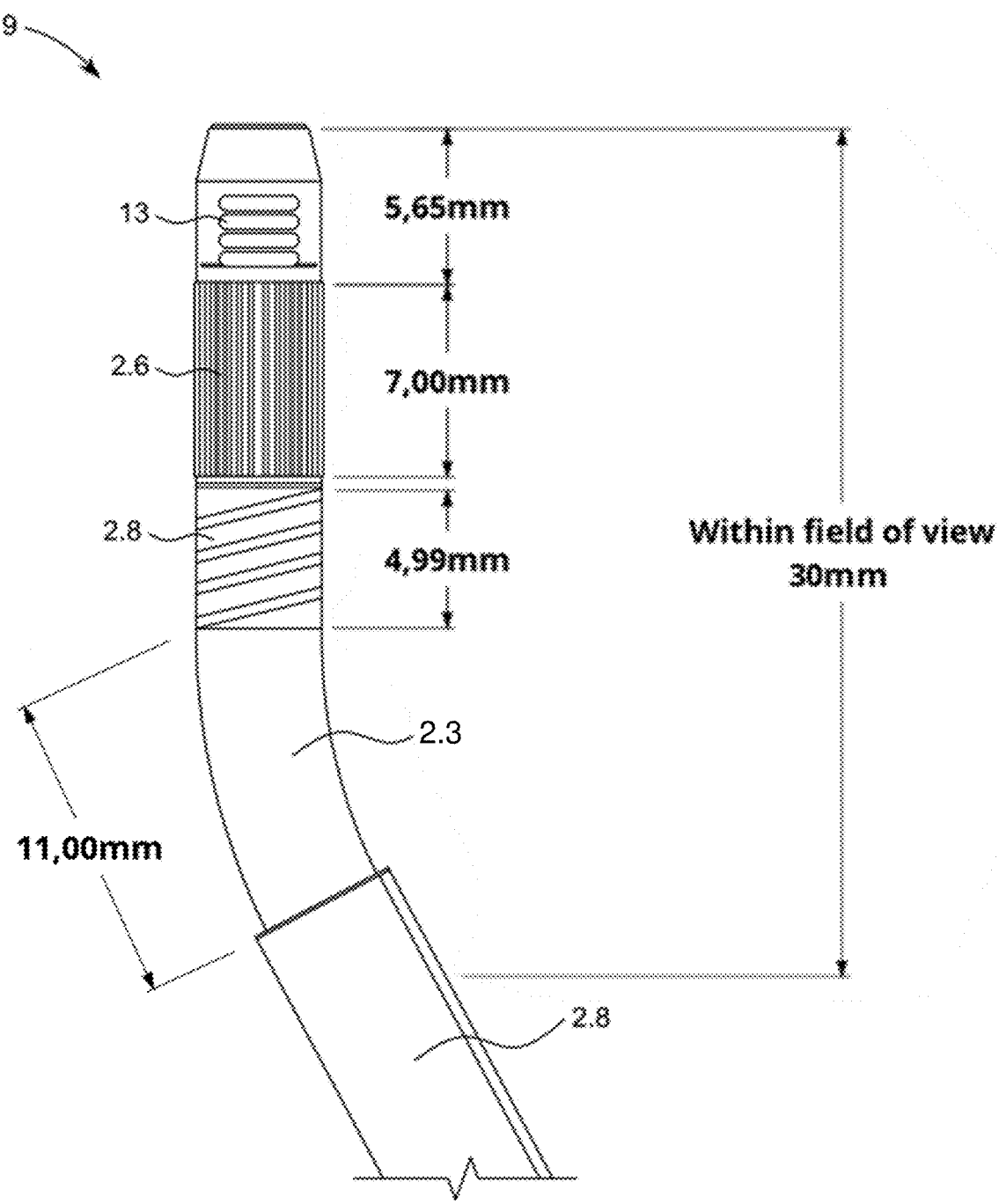
FIG. 21 shows an embodiment of an applicator tip according to the present disclosure, wherein the tip comprises a status indicator, an actuator, a rigid section, and a deformable section. The measurements are provided as an example only.

In an embodiment, the applicator comprises a second pressure sensor for sensing the pressure applied to the actuator/pressure-sensitive button. As an example, the second pressure sensor may be a resistive film pressure sensor and/or a force-sensitive resistor and/or a weight sensor, preferably provided under the actuator. Accordingly, the applicator may comprise at least one pressure-sensitive button covering a part of the applicator tip, wherein a second pressure sensor for sensing the pressure applied to the actuator is integrated in said button or placed under the button. The applicator may further comprise a pressure indicator light for indicating the pressure applied to the at least one actuator/pressure-sensitive button. The pressure indicator light may be located in the applicator tip or on the applicator tip as illustrated in FIGS. 19-20. In one embodiment, the pressure indicator light is provided as a circular band positioned along the circumference of the applicator tip as shown in FIG. 19. Advantageously, the pressure indicator light is configured to:
- display light of a first color, e.g. green, when the applied pressure is below a predefined first threshold; and
- display light of a second color, e.g. red, when the applied pressure is above a predefined second threshold.

The pressure indicator light may be further configured to display light of a third color, e.g. yellow, when the applied pressure is between the predefined first and second thresholds. Other alternative arrangements of light or sound for indicating the pressure by the pressure indicator light can easily be contemplated.

Figure 25:
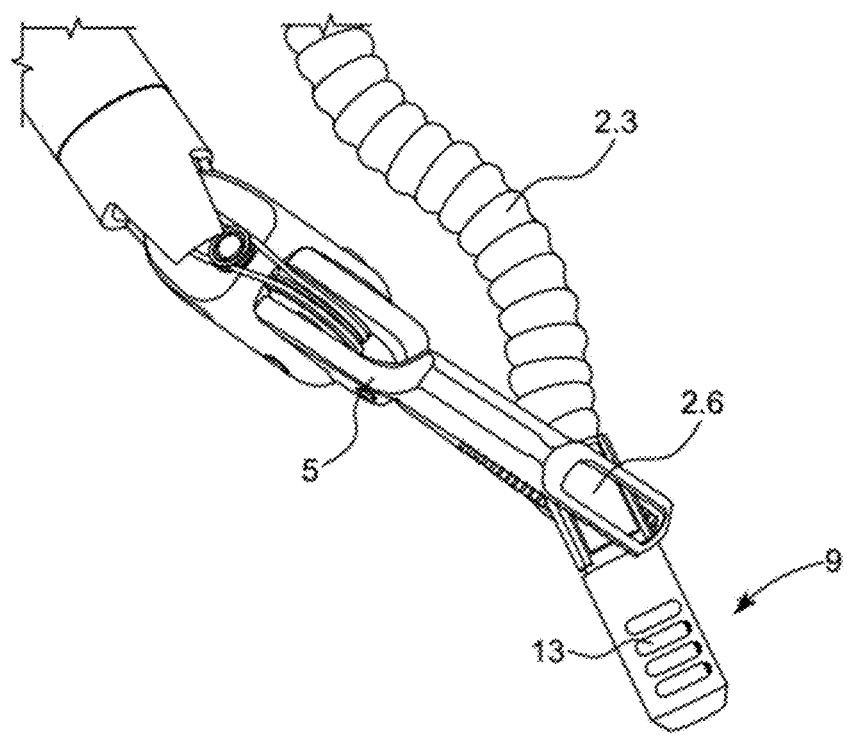
FIG. 25 shows an embodiment of the applicator according to the present disclosure, wherein the applicator tip comprises an actuator and a status indicator.

The applicator may further comprise a status indicator, e.g. in the form of light diodes, said status indicator configured to indicate the remaining volume of substance in the applicator. As an example, the status indicator may comprise four light diodes (e.g. LEDs), wherein e.g. two lit diodes indicates a remaining volume of 50% relative to the initial volume of the contained substance, whereas three lit diodes would indicate a remaining volume of 75%. This is illustrated in FIG. 25. The status indicator may be located on any part of the applicator, e.g. on the driver unit, the delivery tube, and/or the applicator tip. Hence, the applicator tip may comprise a status indicator, e.g. in the form of light diodes, said status indicator configured to indicate the remaining volume of substance in the delivery tube. The remaining volume of substance in the applicator (i.e. in the delivery tube and/or in the fluid source) may be estimated using a variety of methods depending on what type of substance is contained in the applicator. Some of these methods are explained in the following. Other alternative arrangements of light or sound for indicating the remaining volume of substance in the applicator can easily be contemplated. Alternatively, the status indicator may comprise only one light that is lit when e.g. only 25% of the substance remains in the applicator.

In some embodiments, the laparoscopic applicator comprises a fluid source in the form of a syringe, such as a medical syringe, wherein the syringe comprises a barrel for holding a fluid and a plunger for pushing the fluid out of the syringe. The syringe may be filled with a fluid, e.g. a saline solution or a gas, for pushing the substance out of the delivery tube, or alternatively it may be filled with the substance to be dispensed. In an embodiment, the applicator further comprises a second positional sensor configured for determining the position of the plunger of the syringe. This may be achieved by providing the plunger with a magnet, wherein the second positional sensor is a magnetic sensor configured to detect the presence of the magnet. The position of the plunger can be used to estimate the remaining volume of fluid/substance in the barrel of the syringe and/or the position may be used to estimate the remaining volume of substance in the delivery tube. Accordingly, the applicator may comprise at least one fluid source comprising a plunger in a barrel, wherein the position of the plunger is used to estimate the remaining volume of substance in the delivery tube, wherein the remaining volume is indicated by the status indicator, preferably positioned at the distal end/tip. The second positional sensor may alternatively be an optical sensor.

In other embodiments, the laparoscopic applicator comprises a haemostatic powder, e.g. contained in the delivery tube. In this case, the applicator may comprise a variable rate feeder, such as a screw conveyor, configured for transporting the haemostatic powder through the delivery tube to the outside of the delivery tube, whereby the haemostatic powder is dispensed from the applicator. In order to determine the remaining volume of powder, the applicator may comprise a first positional sensor configured to determine the position of the variable rate feeder, since the position may be correlated with the remaining volume of powder. The variable rate feeder may be provided with a magnet, wherein the first positional sensor is a magnetic sensor configured to detect the presence of the magnet. Alternatively, the first positional sensor may be an optical sensor.

In yet another embodiment, the applicator comprises a vibrating device, such as an ultrasonic vibrating device, configured for shaking the haemostatic powder out of the delivery tube. In this case, the applicator may further comprise a clock configured for measuring the elapsed time when the vibrating device is activated/vibrating. The elapsed time may be used to estimate the remaining volume of haemostatic powder in the delivery tube.

Accordingly, the remaining volume may be determined by the first positional sensor, the second positional sensor, the clock, and/or combinations thereof.

According to another embodiment, the delivery tube comprises one or more light sensitive sensors configured for sensing light of a pre-defined wavelength range passing through the delivery tube, wherein:
the delivery tube comprises a light source positioned opposite the one or more light sensitive sensors; and/or
the delivery tube is transparent to at least a portion of the wavelength range.

In one embodiment, the one or more light sensitive sensors are positioned at a distal part of the delivery tube. In another embodiment, the delivery tube comprises at least two light sensitive sensors, wherein the first sensor is positioned at a distal part of the tube and the second sensor is located at a different position than the first light sensitive sensor, such as further away from the distal part. The one or more light sensitive sensors may be used to provide an indication of whether there is any remaining substance in the tube, and/or they may be used to estimate the remaining volume of substance in the tube.

Pressure Source

The release of substance from the applicator implies that the substance held within the tube is being pushed through the delivery tube to the distal end and tip, where it is expelled and dispensed. In case the substance is a paste, a pressure source 8 is preferred to provide the driving force for dispensing the paste. The pressure source is preferably configured for pressurizing the delivery tube and/or for pressurizing the fluid source. The substance held within the delivery tube will preferably be pressurized at least immediately before the paste is discharged. In some embodiments, the applicator forms a pressurized system, wherein the substance in the delivery tube is pressurized. Upon activation of a valve (e.g. via an actuator or button), said pressure is released whereby the substance is dispensed. In other embodiments, the system (applicator) is not pressurized beforehand. Rather, the pressure is applied once an actuator is activated, e.g. by sending an electrical signal from said actuator to a pressure source. An advantage of the first type of embodiments (i.e. the pressurized applicators), is that there is less delay between the activation of the valve and the dispense of the substance.

In case the medical substance is a powder, such as a haemostatic powder, a pressure source is not necessarily needed, since the powder may be discharged from the applicator by other means. In this case the applicator may, as an alternative, or in addition, to the pressure source, comprise a variable rate feeder configured for transporting the haemostatic powder through the delivery tube to the outside of the delivery tube, whereby the haemostatic powder is dispensed from the applicator. Alternatively, the applicator may comprise a vibrating device for shaking the powder out of the applicator.

Figure 7:
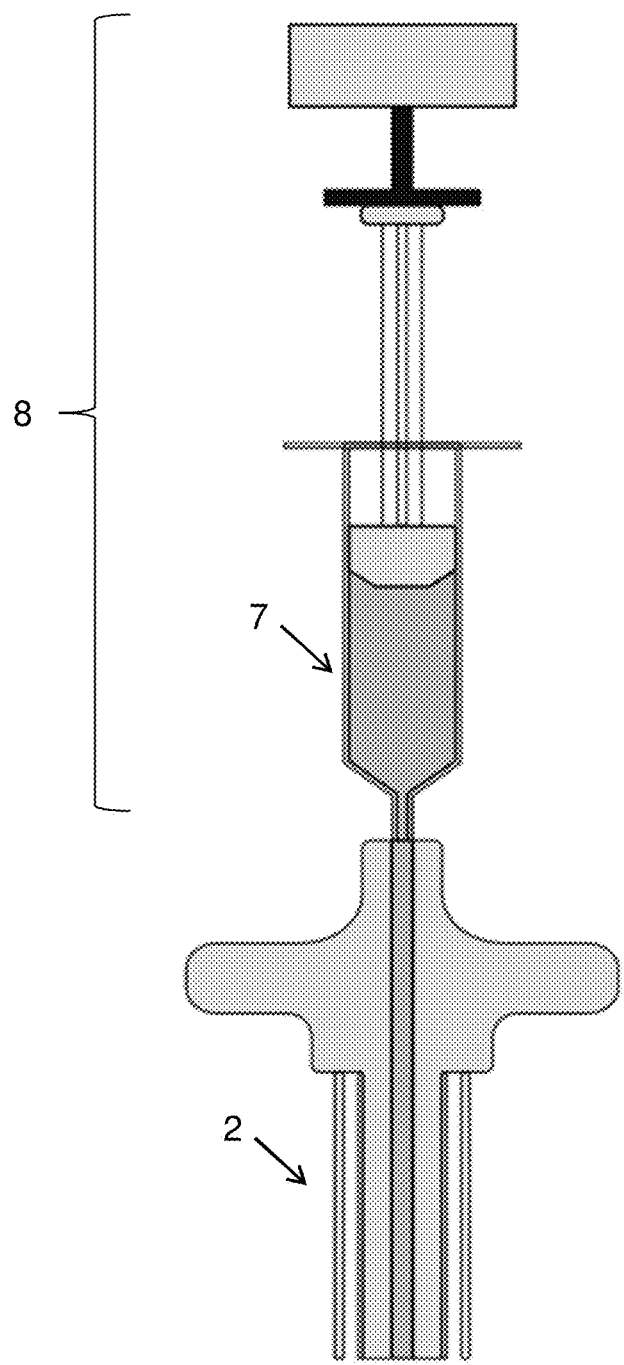
FIG. 7 shows an embodiment of the applicator according to the present disclosure comprising a pressure source.

As an example, the pressure source may be a solid stylus advancing through the delivery tube, e.g. by linear translation by use of a piston, spring force, and/or trigger, where the piston or trigger may be activated manually or electronically controlled. An example of an intermediate pressure source includes a fluid source 7, which contains a liquid (e.g. a saline liquid solution or the medical paste to be dispensed) or a gas (e.g. air, nitrous oxide or carbon dioxide), wherein the liquid or gas is forced to advance through the delivery tube when the pressure source exerts a force on the fluid source, as illustrated in FIG. 7. The pressure source may comprise a spring, a gas, and/or a piston, wherein the pressure source is configured to exert a pressure on the at least one fluid source. In this case, the piston, spring and/or trigger may be activated manually or electronically controlled. Advantageously, the fluid source comprises an incompressible liquid for a more efficient pressure transfer.

In an embodiment of the disclosure, the applicator further comprises one or more pressure sources. In a further embodiment, the pressure source is selected from the group of: a solid stylus configured to be translated through the delivery tube, a drive mechanism such as a motor with a piston, a pump, and/or a pressurized fluid source. In one embodiment, the pressure source is a drive mechanism, such as a motor, comprising at least one piston configured to exert a pressure on the at least one fluid source. The motor may be a mechanical motor or an electric motor. The applicator may comprise an actuator configured to, upon activation, send an electrical signal to the drive mechanism, whereby, upon receipt of said electrical signal, the drive mechanism exerts a pressure on the at least one fluid source such that the substance is dispensed from the applicator.

In a further embodiment, the drive mechanism comprises two pistons, wherein a first piston is configured to exert a first pressure on a first fluid source and a second piston is configured to exert a second pressure on a second fluid source. This embodiment is illustrated in FIG. 30. In this case, the drive mechanism may further comprise a switching mechanism, such as a gear mechanism, configured to switch between operating the first piston and/or the second piston. Alternatively, the drive mechanism may drive the two pistons for dispensing two substances, simultaneously. That is advantageous, if e.g. the two substances are both necessary for achieving the desired reaction. This may be the case e.g. for thrombin and fibrinogen. Preferably, the drive mechanism further comprises a direction control configured to control the direction (forward or reverse) of the selected piston. A reverse direction will enable suction of substance, e.g. blood from the surgery site to allow the surgeon to better decide what to do.

To ensure a reproducible and user friendly dispense of substance, the pressure source is preferably configured to deliver a predefined pressure and/or controllable pressure. For example, the pressure source may be a pressurized fluid source, e.g. a fluid container comprising a pre-established positive pressure, such that when an opening is formed into the fluid container, the fluid source is forced through the opening as defined by the established pressure.

Figure 8:
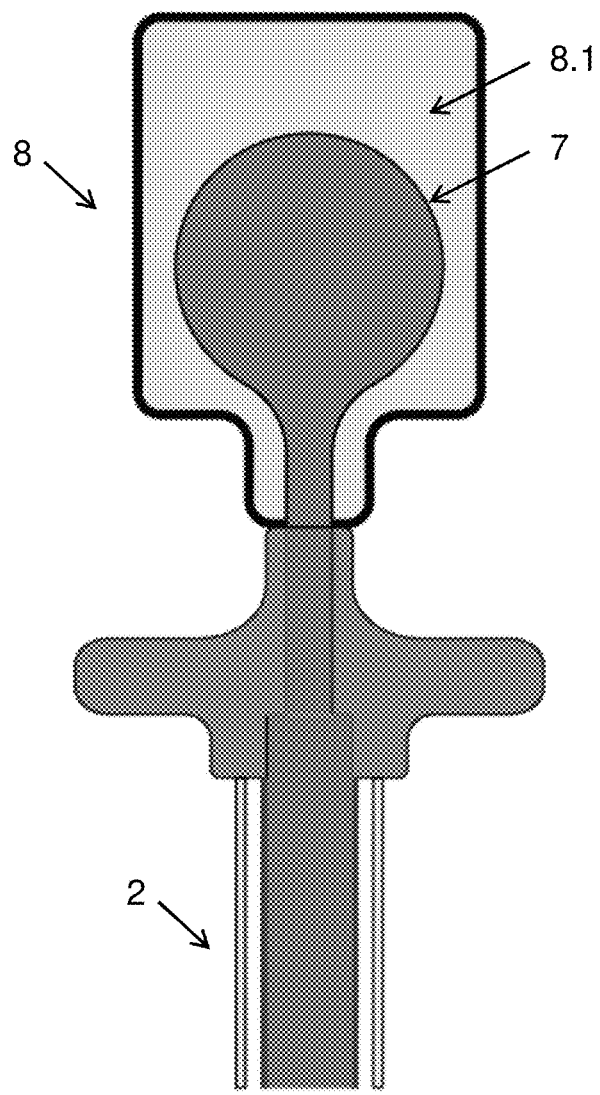
FIG. 8 shows an embodiment of the applicator according to the present disclosure comprising a pressure source.
Figure 10:
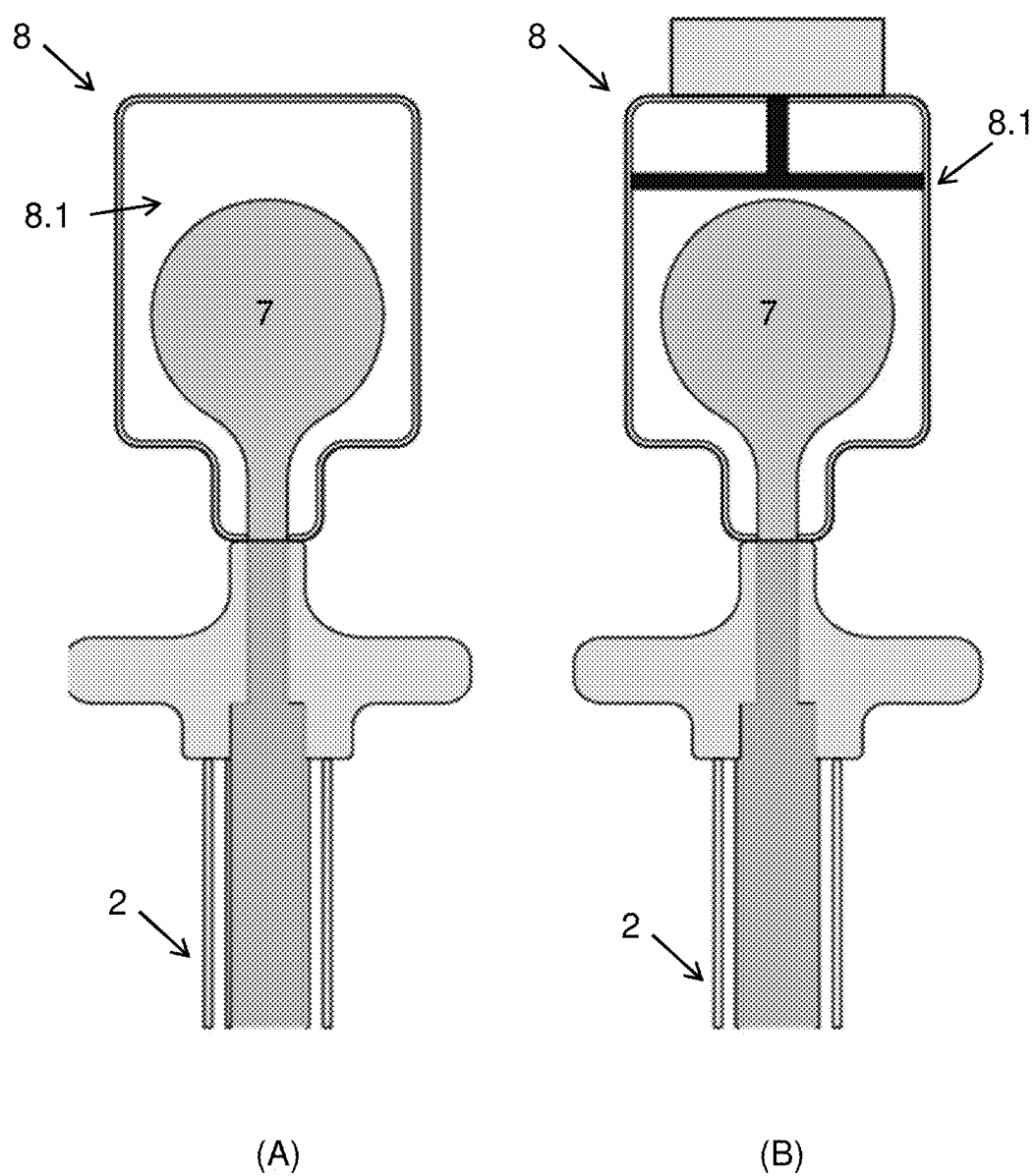
FIG. 10 shows an embodiment of the applicator according to the present disclosure comprising a pressure source.

The pre-established positive pressure may be obtained by a fluid source 7 being pressurized by a propellant 8.1, such as a gaseous propellant, as known from food spray dispensers, such as sprayed cream. FIGS. 8 and 10A show embodiments of a fluid source 7 that contained with a gaseous propellant 8.1. Upon forming fluid connection between the applicator 2 and the pressure source 8, the propellant pressure may be released, and the fluid source is forced to advance into the delivery tube.

Alternatively, the pressure source may include a spring loaded element contained in physical communication with the fluid source. Upon release of the spring loaded element, the element acts as a propellant 8.1 forcing the fluid source to advance into the delivery tube, as shown in FIG. 9A.

Figure 9:
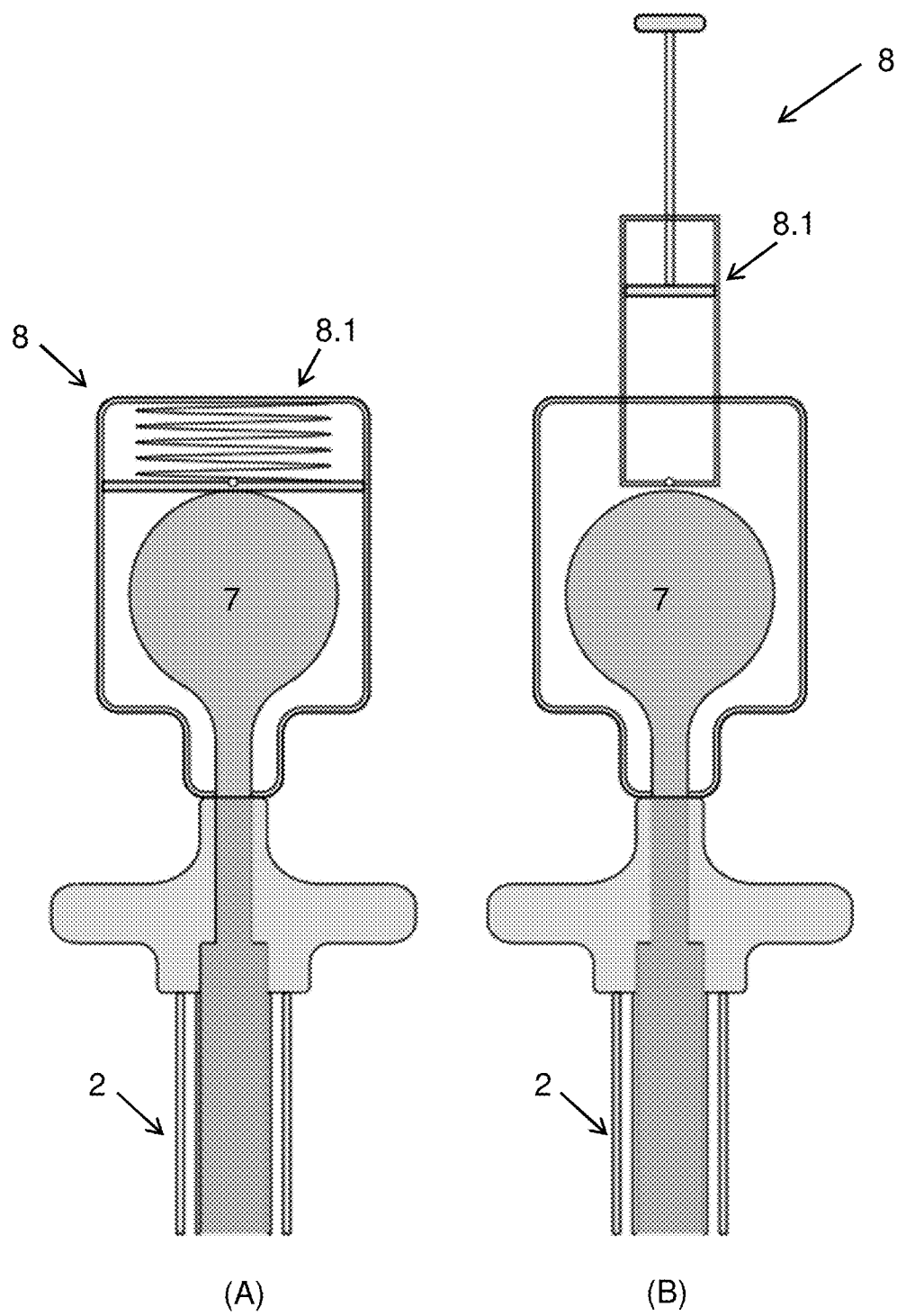
FIG. 9 shows an embodiment of the applicator according to the present disclosure comprising a pressure source.

Alternatively, the pressure source may include a moveable piston, such as a manually driven piston as shown in FIG. 9B, or a mechanically or electronically driven piston as shown in FIG. 10B. In both embodiments, the piston acts as the propellant 8.1, and a predefined pressure force may be generated based on the movement of the piston.

Figure 11:
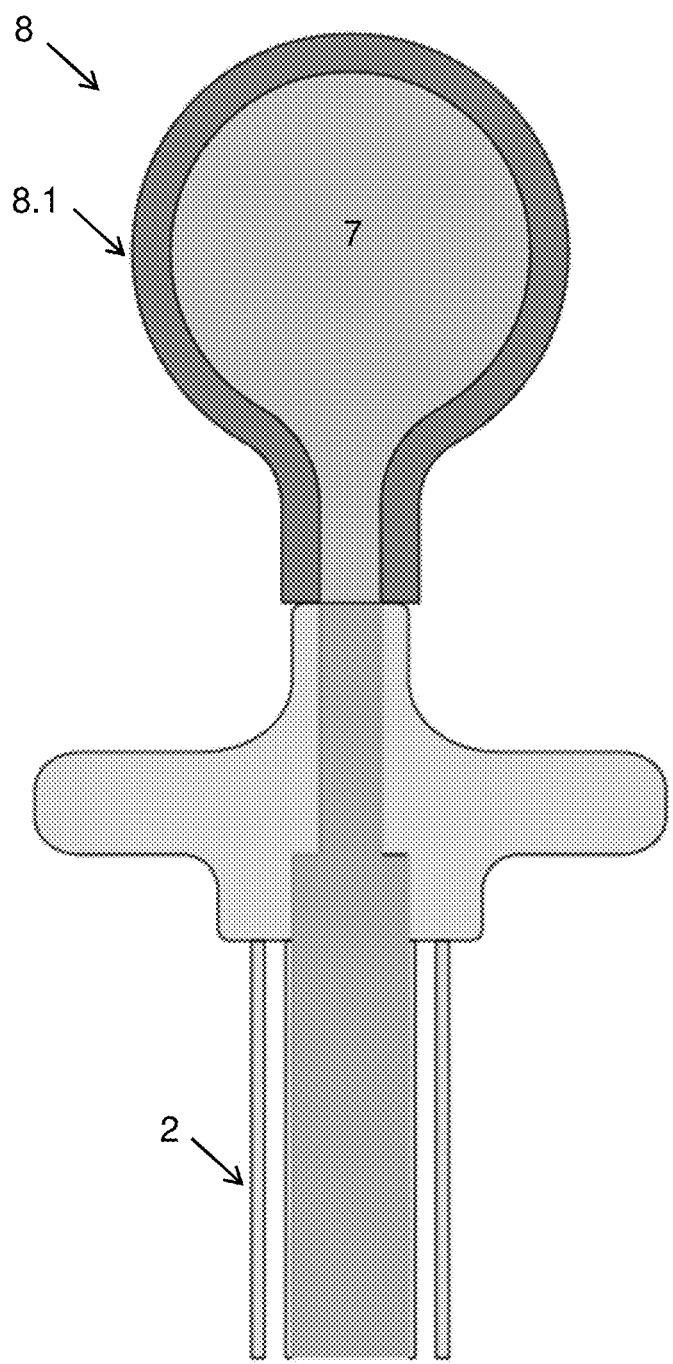
FIG. 11 shows an embodiment of the applicator according to the present disclosure comprising a pressure source.

Alternatively, the pressure source 8 may be a fluid source 7 contained in an inflatable balloon or bladder, as illustrated in FIG. 11. Upon forming fluid connection between the applicator 2 and the pressure source 8, the inflated balloon will elastically contract or collapse, thereby applying a pressure to a substance contained in the delivery tube, whereby the substance is pressurized.

In an embodiment of the disclosure, the pressure source is configured to deliver a predefined pressure force. In a further embodiment of the disclosure, the pressure source comprises a propellant, selected from the group of: spring loaded element, gaseous propellant, inflatable balloon or bladder, and/or moveable piston, such as an electrically driven piston or a manually driven piston.

Fluid Source

Figure 12:
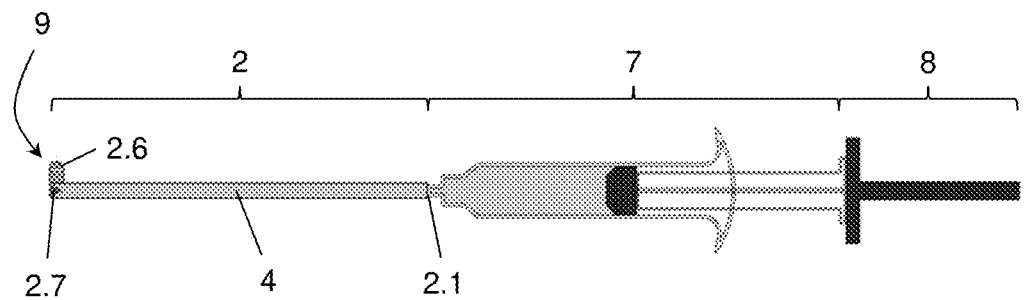
FIG. 12 shows an embodiment of the applicator according to the present disclosure, wherein the applicator comprises a delivery tube for holding a substance, a fluid source for holding a fluid, and a pressure source for exerting a pressure on the fluid source.
Figure 13:
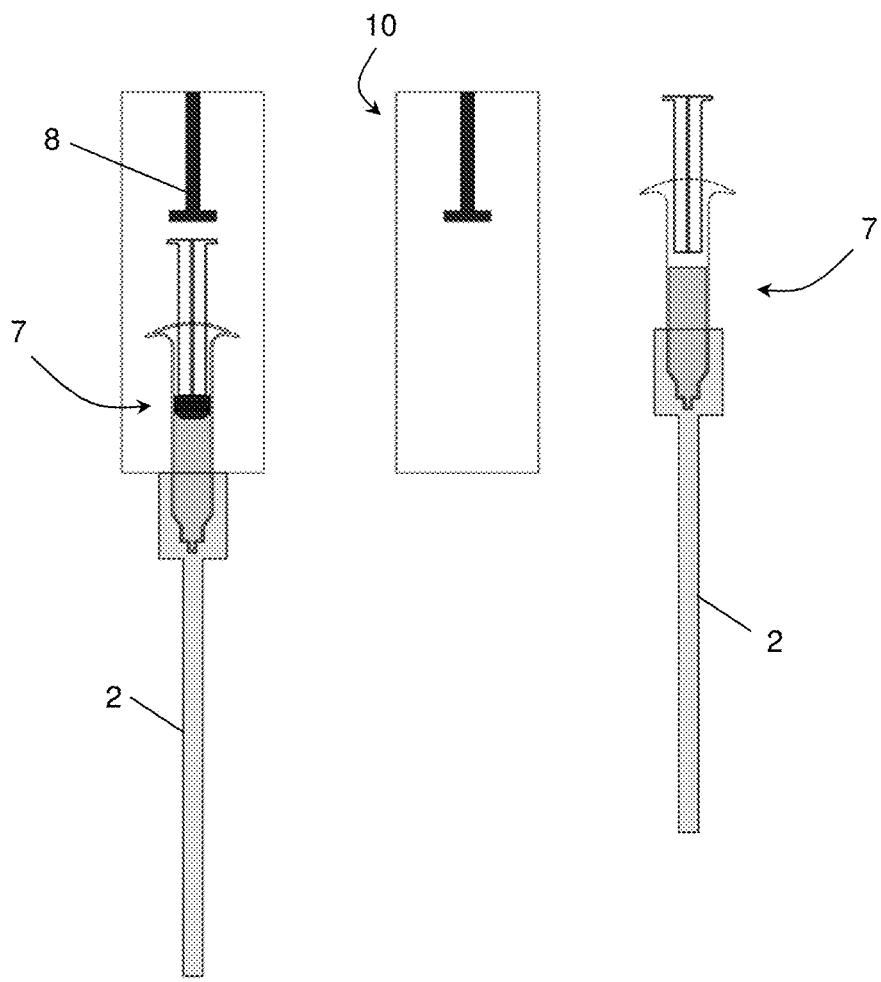
FIG. 13 shows an embodiment of the applicator according to the present disclosure, wherein the applicator comprises a driver unit for holding the fluid source and delivery tube.

Preferably, the applicator comprises at least one fluid source for holding a fluid, said fluid source being in fluid connection with the delivery tube (see e.g. FIG. 7 or FIGS. 12-13). The fluid source may act as an intermediate pressure source, i.e. a component that transfers the pressure from the pressure source to the substance inside the delivery tube. Therefore, the fluid source need not contain the substance to be dispensed, but can instead contain an inert fluid such as a saline solution or a gas.

In one embodiment, the fluid source comprises a liquid such as a saline solution. In another embodiment, the fluid source comprises a gas selected from the group of $CO_2$ (carbon dioxide), $N_2$ (dinitrogen), $N_2O$ (nitrous oxide), and air. However, the fluid source may alternatively contain the substance to be dispensed, e.g. a medical substance such as a medical paste, such that said substance is contained in the fluid source and/or in the delivery tube. In an embodiment, the delivery tube and the at least one fluid source comprises the same substance provided in the form of a liquid, a paste, or a powder. Hence, the fluid source constitutes a substance reservoir 24.

The applicator may also comprise at least two fluid sources as shown in FIG. 30. This has the advantage that each fluid source may contain a specific type of substance, whereby multiple different substances may be dispensed and/or withdrawn by the applicator.

Driver Unit

The applicator may further comprise a driver unit for holding:
- at least one fluid source for holding a fluid, said fluid source being in fluid connection with the delivery tube; and/or
- at least one pressure source configured for applying a pressure to the at least one fluid source and/or configured for applying a pressure to the inside of the delivery tube.

Figure 14:
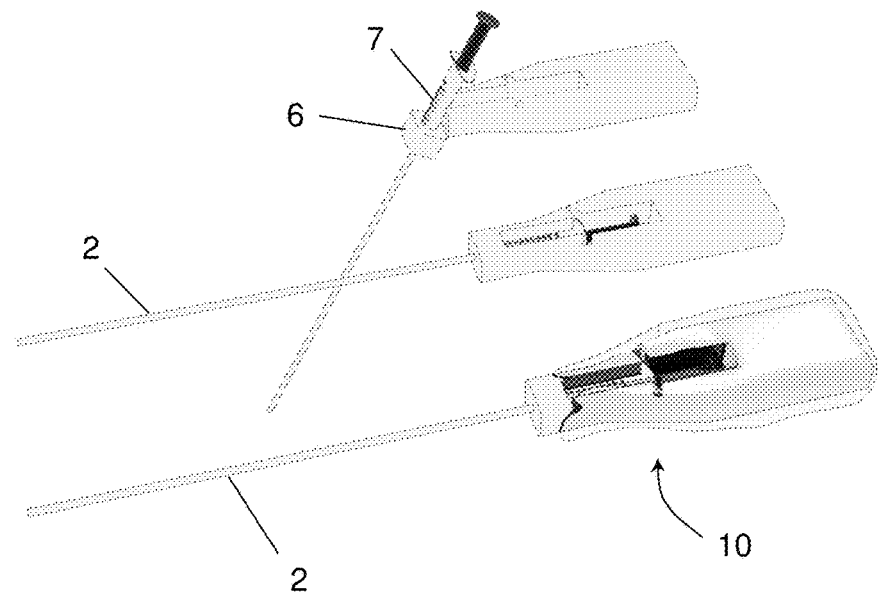
FIG. 14 shows an embodiment of the applicator according to the present disclosure, wherein the applicator comprises a driver unit for holding the fluid source and delivery tube.

In its simplest form, the driver unit may constitute a housing for holding the fluid source and/or for holding the pressure source. However, the driver unit may also comprise additional, more advanced features, which are explained in further detail in the present section. An advantage of providing the driver unit as a separate component from the remaining parts of the laparoscopic applicator, is that it provides a modular design, wherein the driver unit may be reused multiple times, whereas the delivery tube and fluid source may be disposed after each use. FIG. 14 shows how the delivery tube and the fluid source (here a syringe) may be inserted in the driver unit, optionally via a connector. FIG. 18 shows another perspective view of the driver unit, wherein the fluid source is inserted. The driver unit is preferably configured to exert a pressure on the fluid source, e.g. via a driving mechanism such as a motor and a piston, such that the driver unit is configured for providing the driving force for driving the substance out of the applicator. As an example, the fluid source may be as a medical syringe or another container comprising a plunger, where the driver unit comprises a piston configured to exert a force on the plunger. In this case, the driver unit may similarly be configured to withdraw the plunger in order to withdraw a substance into the applicator. The applicator may be provided with a safety mechanism configured for switching between two modes (on/off), wherein the 'off mode' means that no substance can be released from the applicator and the 'on mode' means that substance can be released. The safety mechanism may be located on the delivery tube, the applicator tip or the driver unit. The applicator may further comprise a flow controller configured for controlling the flow rate of the substance to be released from the applicator. The flow controller may be located in the driver unit, and the exterior of the driver unit may be provided with a button or potentiometer configured to adjust the flow rate, e.g. by turning the button.

Driver Unit—Control

As described above, the applicator may comprise a pressure source for applying the pressure to the delivery tube, and the pressure source may include a fluid source and a piston drive mechanism for expelling the fluid. Hence the drive mechanism for dispensing the substance may be a plunger piston from a syringe or a reservoir container chamber, comprising the fluid source, which is expelled such that it pushes the hemostatic agent within the delivery tube.

The drive mechanism of the pressure source may be a mechanically controlled drive mechanism or a motor controlled or electrically controlled drive mechanism. The drive mechanism controls the activation of dispensing, i.e. start, stop, halt or suspension. When dispensing is activated, the hemostatic agent travels through the delivery tube and into the dispensing nozzle for application onto the bleeding site surface.

When the drive mechanism is stopped, halted or suspended, there is a risk of continued dispense of substance due to a time delay, e.g. a delay between the activation of the valve and the dispense of the substance. Further, there is a risk of delay because the delivery tube including the pressure source and fluid source forms a hydraulic system based on viscous friction and fluid dynamic. Hence, hemostatic agent out flow may occur after the driver system has been stopped, halted or suspended. This is due to the pressure in the hydraulic system and continued expansion of the hemostatic agent after the plunger piston has stopped moving.

To minimize or eliminate the delay, the drive mechanism may comprise a retractable piston, e.g. an automatically retractable piston. By retraction of the piston, the drive mechanism creates a space for the hemostatic agent to expand into the syringe or the reservoir container instead of expanding out through the nozzle and creating an unwanted out flow through the tip. Specifically, a volume for expansion is created by the driver system pulling back the activation piston so the plunger (rubber stopper) inside the syringe or reservoir container chamber is allowed to retract. A retractable piston may for example be obtained by a mechanical trigger mechanism, or by an electrically driven driver unit.

In an embodiment of the disclosure, the applicator comprises a pressure source configured for applying a pressure to the inside of the delivery tube, comprising a piston drive mechanism, wherein the piston is configured to be retractable.

Kit of Parts

The applicator according to the present disclosure may be provided as a part in a kit of parts for laparoscopic procedures, and particularly as a kit of parts suitable for robotic-assisted surgery. Preferably, the kit of parts is a medical substance kit, such as a haemostatic matrix kit, for laparoscopic procedures. The kit preferably includes the applicator, one or more pressure sources, and optionally a syringe configured to be filled with a medical substance, e.g. a haemostatic substance such as a haemostatic paste. Preferably, the syringe is prefilled with the substance, such that it constitutes a substance reservoir 24. Optionally, the applicator may be provided as separate parts of the kit, e.g. as a delivery tube and an applicator tip, which upon assembly forms the applicator according to the first aspect, The kit may optionally further comprise one or more substance reservoirs 24 for loading or charging the delivery tube prior to use. For example, the substance reservoir may be a syringe configured to be filled with a substance and configured for forming a fluid connection to the delivery tube of the applicator, such as via a connector 6 to the proximal opening of the delivery tube, or via an auxiliary connector element 25 to the distal opening of the delivery tube.

To reduce the number of parts and to simplify the assembly, the kit of parts may comprise the applicator and a pressure source 8, which is easily assembled and which upon assembly is configured for delivering a substance under pressure. For example, the pressure source may be a gas cartridge 8.2 configured for forming a fluid connection to the delivery tube of the applicator, such as the proximal opening of the delivery tube, as illustrated in FIGS. 38 and 40.

To further simplify the assembly, the one or more pressure sources 8 may be integrated into the applicator. For example, the pressure source may be integrated into the delivery tube in the form of a spring 8.3 located at a proximal end, where the spring energy is pre-stored and/or stored upon loading the delivery tube with a substance, as illustrated in FIG. 38.

A third aspect of the disclosure relates to a kit of parts comprising the applicator according to the first aspect, or the applicator tip according to the second aspect, one or more pressure sources, and optionally one or more substance reservoirs. For example, the substance reservoirs may be one or more syringes configured to be filled with a substance and configured for forming a fluid connection to the delivery tube, such as the distal opening of the delivery tube.

The kit of parts has the advantage that all parts may be manually assembled and operated, and that all the parts are disposable after use and adapted for single-use.

Alternatively, the kit of parts may include parts adapted for multiple uses to obtain a more reproducible and sustainable applicator design. For example, the applicator may be assembled into a reusable unit or holder, which may include the pressure source 8 in the form of a reusable piston or motor.

To further increase the sustainable impact, the driver unit may be refilled with the substance 4 or the fluid source 7. Hence, the kit of parts optionally comprises one or more substance reservoirs 24 or fluid source reservoirs, where the fluid source reservoirs are configured to be detachably attached to the fluid source within the driver unit.

According to one embodiment, the kit of parts comprises the laparoscopic applicator according to the first aspect, and a driver unit for holding at least one fluid source for holding a fluid, said fluid source being in fluid connection with the delivery tube; and/or for holding at least one pressure source, such as a motor, configured for applying a pressure to the at least one fluid source and/or configured for applying a pressure to the inside of the delivery tube.

The kit of parts may further comprise at least one fluid source for holding a fluid, said fluid source being in fluid connection with the delivery tube. In one embodiment, the fluid source is a syringe having a plunger, wherein the driver unit further comprises a positional sensor configured for determining the position of the plunger.

The kit of parts may further comprise at least one pressure source configured for applying a pressure to the at least one fluid source and/or configured for applying a pressure to the inside of the delivery tube.

The driver unit in the kit of parts may be configured to hold at least two fluid sources, such as at least two syringes. An advantage hereof is that two different substances may be dispensed from the applicator. Alternatively, one of the at least two syringes may be used to withdraw a substance, such as blood, from a patient.

Substance

The applicator tube of the present disclosure is preferably configured for dispensing a substance. The substance may be in the form of a liquid, a paste, or a powder. As an example, the substance may be a medical paste. By the term "medical paste" is meant a paste comprising a bioactive agent. Examples of bioactive agents include thrombin or fibrinogen, which are also referred to as haemostatic agents. As another example, the substance may comprise a non-biological adhesive/glue such as a cyanoacrylate or a polyethylene glycol hydrogel (PEG). As yet another example, the substance may comprise a material selected from the group of: Oxidized regenerated cellulose (OCR), microporous polysaccharide spheres, and microfibrillar collagen. In case the substance is a powder, the powder is preferably a haemostatic powder comprising particles having a particle size greater than 180 micron. That the particle size is greater than 180 micron means that the particles have a good flowability so that the particles easily can be spread over an area. That will be extra advantageous if the powder is haemostatic powder, since it is important to cover the whole wound as soon as possible to stop the bleeding.

A "bioactive agent" is defined as any agent, drug, compound, composition of matter or mixture, which provides some pharmacologic, often beneficial, effect that can be demonstrated in vivo or in vitro. An agent is thus considered bioactive if it has interaction with or effect on a cell tissue in the human or animal body. As used herein, this term further includes any physiologically or pharmacologically active substance that produces a localized or systemic effect in an individual. Bioactive agents may be a protein, such as an enzyme. Further examples of bioactive agents include, but are not limited to, agents comprising or consisting of an oligosaccharide, a polysaccharide, an optionally glycosylated peptide, an optionally glycosylated polypeptide, an oligonucleotide, a polynucleotide, a lipid, a fatty acid, a fatty acid ester and secondary metabolites. It may be used either prophylactically, therapeutically, in connection with treatment of an individual, such as a human or any other animal. The term "bioactive agent" as used herein does not encompass cells, such as eukaryotic or prokaryotic cells.

A "paste" according to the present disclosure has a malleable, putty-like consistency, such as toothpaste. A paste is a thick fluid mixture of pulverized solid/solid in powder form with a liquid. A paste is a substance that behaves as a solid until a sufficiently large load or stress is applied, at which point it flows like a fluid, i.e. a paste is flowable. Flowables conform efficiently to irregular surfaces upon application. Pastes typically consist of a suspension of granular material in a background fluid. The individual grains are jammed together like sand on a beach, forming a disordered, glassy or amorphous structure, and giving pastes their solid-like character. It is this "jamming together" that gives pastes some of their most unusual properties; this causes a paste to demonstrate properties of fragile matter. A paste is not a gel/jelly. A "slurry" is a fluid mixture of a powdered/pulverized solid with a liquid, such as water. Slurries behave in some ways like thick fluids, flowing under gravity and being capable of being pumped if not too thick. A slurry may functionally be regarded as a thin, watery paste, but a slurry generally contains more water than a paste. Substantially water-insoluble powder particles, such as cross-linked gelatine particles, will form a paste upon mixing with an aqueous medium.

A "gel" is a solid, jelly-like material that can have properties ranging from soft and weak to hard and tough. Gels are defined as a substantially dilute cross-linked system, which exhibits no flow when in the steady-state. By weight, gels are mostly liquid, yet they behave like solids due to a three-dimensional cross-linked network within the liquid. It is the crosslinks within the fluid that give a gel its structure (hardness) and contribute to stickiness (tack). In this way gels are a dispersion of molecules of a liquid within a solid in which the solid is the continuous phase and the liquid is the discontinuous phase. A gel is not a paste or slurry. For example, non-crosslinked gelatine is soluble and forms a gel upon contact with an aqueous medium such as water.

For a medical paste to be discharged from a syringe and an applicator tube, it should be flowable, when subjected to a force applicable for a syringe. Thus, by the term "flowable paste" is meant a paste having a viscosity facilitating a steady flow, when subjected to a force applicable for a syringe. An example of a flowable paste is a paste having a viscosity between 500-3500 Pa-s, when measured at 30° C. and a relative humidity between 65-75%. In an embodiment of the disclosure, the paste is flowable.

Forming a medical paste, such as a flowable medical paste, requires mixing of the bioactive agent with a paste or a paste forming material. Typically, bioactive agents are stored in a solid and dried state, such as a powdered form, facilitating stable storage of the active agent, and flexible concentrations by mixing the bioactive agent with a diluent in an adjustable ratio. Thus, for the bioactive agent to be administered by a syringe injection, the solid bioactive agent must first be reconstituted. Forming a medical paste therefore typically requires the steps of mixing a solid bioactive agent with a liquid or diluent to reconstitute the bioactive agent, and subsequently mixing the reconstituted bioactive agent with a paste forming material, which may also be referred to as "paste precursor". The bioactive agent may be a haemostatic agent, such as thrombin or fibrinogen.

By the term "paste forming material" is meant a material for forming a paste from a liquid phase, such as a reconstituted bioactive agent. Thus, a paste forming material may also be referred to as a precursor material for forming a paste.

The reconstituted bioactive agent is obtained by mixing the bioactive agent with a liquid with low viscosity, such as sterile water or saline water, thereby ensuring uniform reconstitution. Thus, the reconstituted bioactive agent is a liquid with low viscosity. A paste may be obtained from the reconstituted bioactive agent by adding a paste forming material, which inherently increases the viscosity.

Substance Loading

As described earlier, the delivery tube of the applicator may be prefilled with the substance (e.g. a medical fluid, paste or powder) before use, e.g. before insertion of the applicator into the trocar port. Alternatively, the delivery tube may be configured to be filled with the substance after insertion into the trocar port, e.g. immediately before application or continuously during application of the substance.

Proximal Loading

In a first preferred embodiment, the filling of the delivery tube is performed via the proximal end 2.1 of the delivery tube, which is accessible to the surgeon or an assistant during surgery, as illustrated in FIG. 1. The filling of the delivery tube is advantageously done using a separate syringe comprising the substance 4 within a syringe barrel, where the syringe may be prefilled with the substance, or configured for aspirating the substance from a substance source such as a medical fluid source, as e.g. illustrated in FIGS. 12-14. Hence, the container or syringe comprising the substance 4 may be referred to as a substance reservoir 24. To facilitate safe and precise filling with a minimum of substance waste, the proximal end 2.1 advantageously comprises one or more connectors 6 for detachably attaching the fluid source, such as a syringe prefilled with the substance. An example of a connector is a Luer lock for attaching a syringe, or a compression joint or adhesive joint for attaching a substance reservoir or fluid container. Alternatively, the delivery tube and the fluid source, e.g. the syringe, may be attached without the use of a connector.

In an embodiment of the disclosure, the delivery tube and the at least one fluid source comprises the same substance, or is configured for comprising the same substance, such as a substance comprising a haemostatic agent, the substance provided in the form of a liquid, a paste, or a powder, such that the at least one fluid source constitutes a first substance reservoir.

Continuous Loading

In addition to being prefilled and configured for being filled or loaded with substance 4 from the proximal end, after being inserted into the trocar port, the applicator may advantageously further be configured for being loaded continuously while being inserted into the trocar. This may be obtained by the applicator being configured for being loaded from a multiple amount of substance reservoirs 24.

Figure 36:
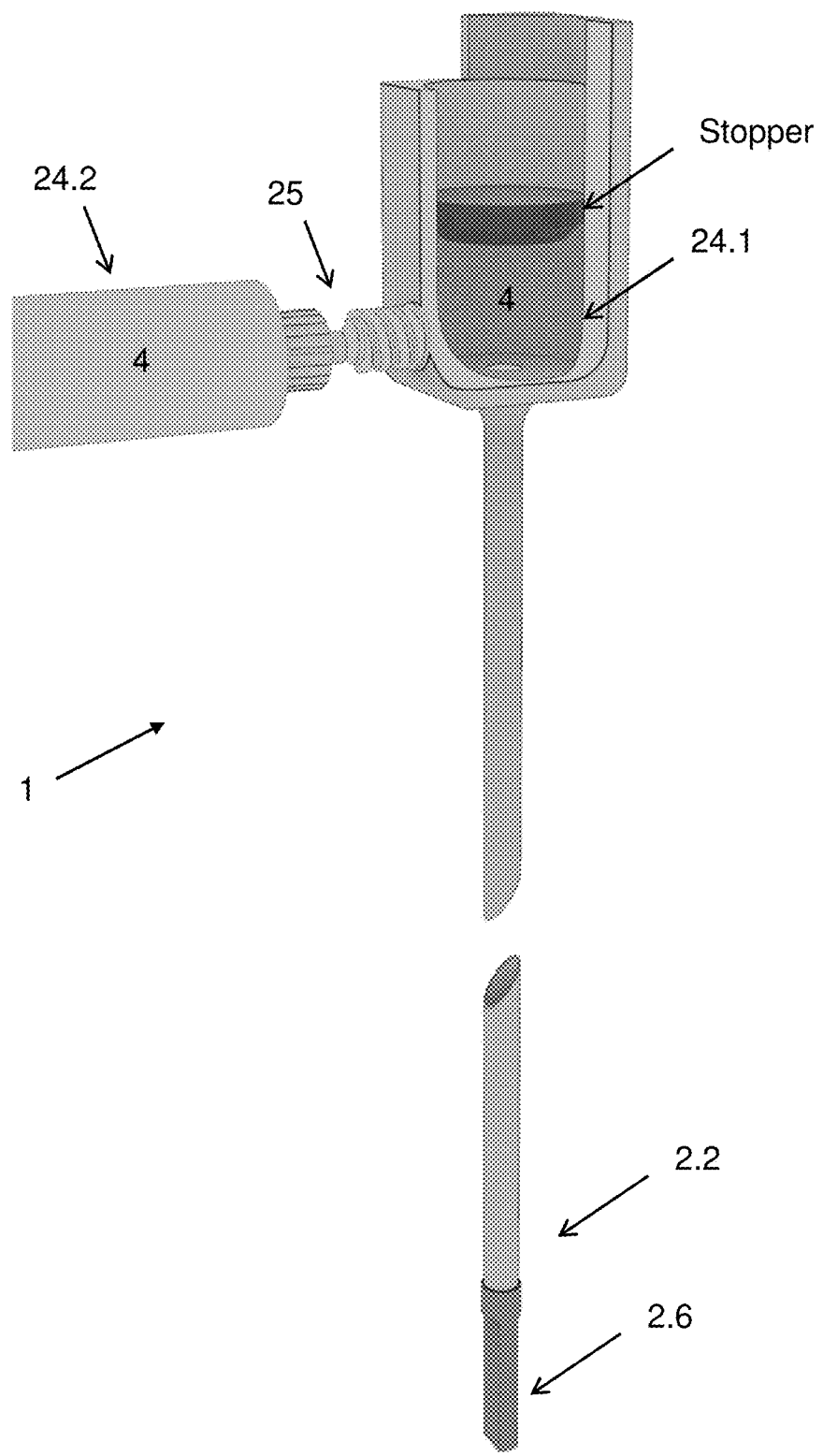
FIG. 36 shows an embodiment of the applicator according to the present disclosure, wherein the applicator comprises a first and second substance reservoirs.

FIG. 36 shows an embodiment of the applicator according to the present disclosure, where the applicator 1 comprises a first 24.1 and second substance reservoir 24.2. Hence, the syringe substance reservoir 24 shown in e.g. FIG. 14 is replaced with an integrated first substance reservoir 24.1, which is different from a separate syringe, thereby avoiding a separate syringe and plunger. The integrated first substance reservoir may comprise a barrel for holding the substance, a stopper defining the first substance reservoir, which may also act as a piston for pushing the substance out of the barrel. The integrated first substance reservoir is not restricted to having conventional syringe dimensions, and may advantageously have a relatively wider diameter and shorter length than a conventional syringe.

In an embodiment of the disclosure, the first substance reservoir comprises a barrel for holding the substance and a piston for pushing the substance out of the barrel. In a further embodiment, the barrel has a diameter between 10-30 mm, more preferably between 12-20 mm, and most preferably between 14-18 mm.

Figure 37:
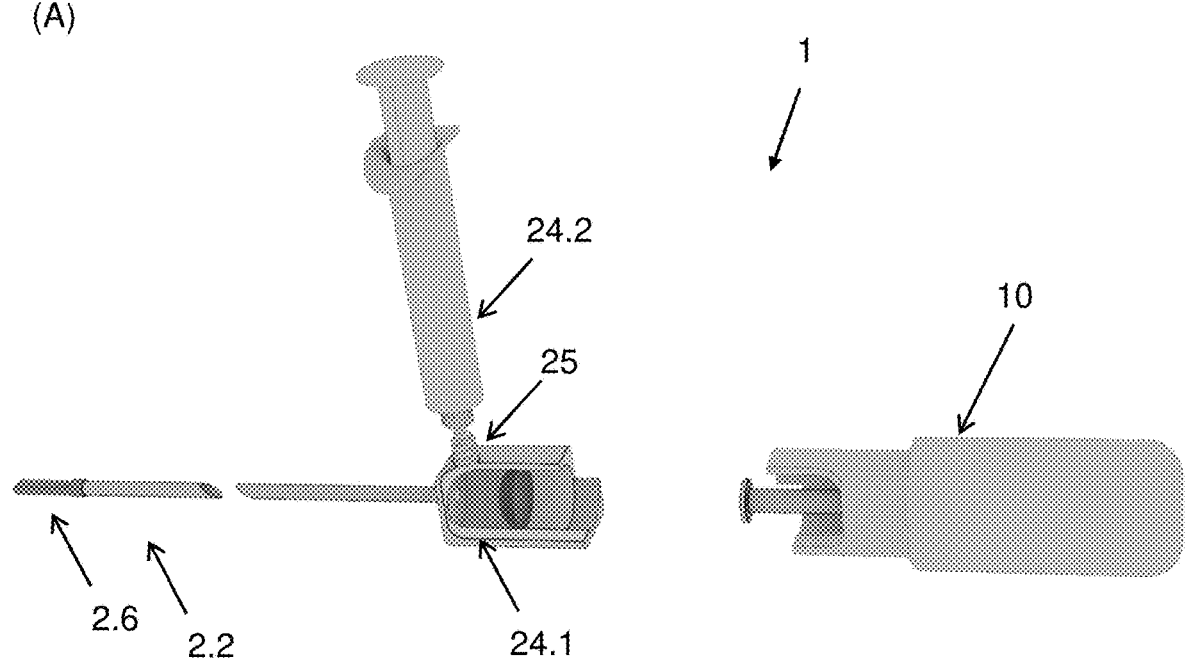
FIG. 37 shows an embodiment of the applicator according to the present disclosure, wherein the applicator comprises a first and second substance reservoir, where the second substance reservoir is detachably attached to the first substance reservoir via an auxiliary connector element. (A) shows the attached reservoirs, and (B) the detached reservoirs.
Figure 37:
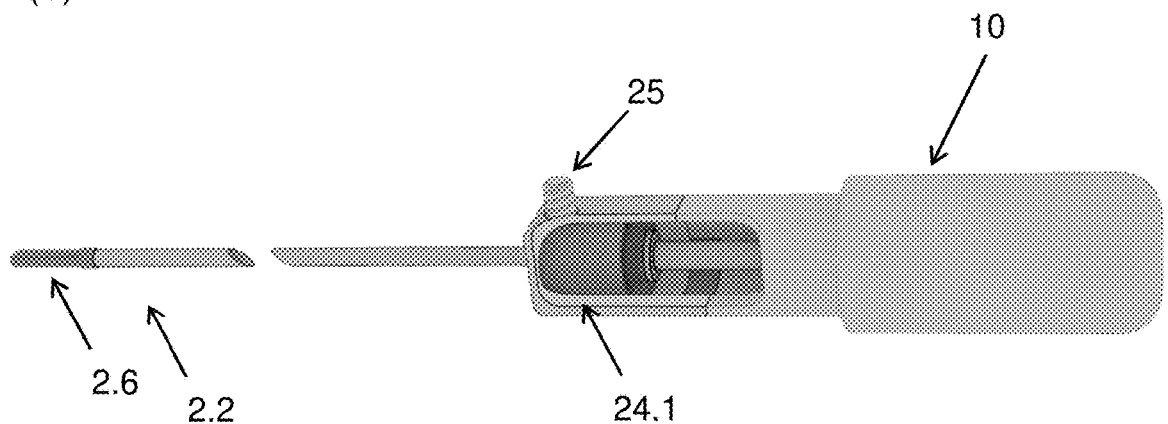

A second substance reservoir 24.2 is detachably attachable to the first substance reservoir 24.1 via an auxiliary connector element 25, as illustrated in FIGS. 36-37. FIG. 37A shows the second reservoir being attached, and 37B shows when the second reservoir is detached.

For dispensing substance from the applicator before or during operation, the assistant may attach a second substance reservoir 24.2, optionally while the applicator is inserted into the trocar port. The assembly may be configured for transferring the substance, e.g. haemostat, from the second substance reservoir into the first substance reservoir. For example, the second substance reservoir may be pressurized and the auxiliary connector element may include a one way valve Luer lock facilitating the transfer.

In an embodiment of the disclosure, the applicator comprises one or more second substance reservoir(s). In a further embodiment, the first and/or second substance reservoirs are disposable.

In an embodiment of the disclosure, the second substance reservoir(s) are detachably attached to the first substance reservoir via at least one auxiliary connector element. In a further embodiment, the connector element comprises a Luer lock, a compression joint, or an adhesive joint.

The substance may then be dispensed by activating a dispensing button or actuator 2.6 at the distal end 2.2 of the delivery tube. The actuator may activate the drive mechanism of the pressure source, e.g. a mechanically controlled drive mechanism or a motor controlled or electrically controlled drive mechanism. For example, the pressure source may correspond to the drive unit 10 shown in FIG. 14, where the pressure source is motor controlled advancing piston, which may exert a pressure on the first substance reservoir 24.1. Due to the wider diameter and shorter length of the first substance reservoir, a smaller force is required for dispensing the substance. Hence, the pressure force may also be a manually driven piston, since a relatively low force is needed to prime. Further, the dimensions of the first substance reservoir enables that any substances 4 irrespective of the viscosity may be easily dispensed.

The auxiliary connector element may be configured to avoid back filling of the second substance reservoir from the pressure source. This may be obtained by the auxiliary connector element being adapted for establishing a sequential fluid connection between 1) the first and second substance reservoirs, and 2) the first substance reservoir and the delivery tube. Thus, the auxiliary connector element may have two configurations, which may be obtained by a one-way valve.

In an embodiment of the disclosure, the auxiliary connector element is configured for establishing a sequential fluid connection between 1) the first and second substance reservoirs, and 2) the first substance reservoir and the delivery tube. In a further embodiment, the auxiliary connector element is adapted to have a first configuration proving a fluid passageway between the first and second substance reservoirs, and a second configuration providing a fluid passageway between the first substance reservoir and the delivery tube. In an embodiment of the disclosure, the auxiliary connector element comprises at least one one-way valve.

It follows that the first substance reservoir may be refilled at any point by the nurse detaching and attaching any multiple of further second reservoirs. Further, the reservoirs are advantageously disposable, for simple and flexible application. For example, all parts excluding the driver unit may be disposable.

It follows from the above that the applicator comprising the first and second substance reservoirs may have a particularly compact design and be particularly suitable for substances of both high and low viscosity, e.g. liquids, pastes, and powders, due to the form factor of the first substance reservoir.

Continuous loading may be applied to an applicator comprising any number of substance reservoirs, and to an applicator for substance mixtures. For example, this may apply to the embodiment shown in FIG. 30, where the delivery tube comprises a first lumen for holding a first type of substance and a second lumen for holding a second type of substance, and where the two types of substances are mixed once the substances are dispensed or before they are dispensed. For example, the applicator tip may include a nozzle comprising a mixing chamber. In this case, one substance may be in the form of a liquid and the other substance could be a powder to be mixed in the liquid. The two substances could also be two liquids or two pastes, or other combinations of liquid, paste, and powder. The drive mechanism of FIG. 30 comprises two pistons, wherein a first piston is configured to exert a first pressure on two different reservoirs simultaneously or with a time delay to ensure sufficient mixing.

Figure 41:
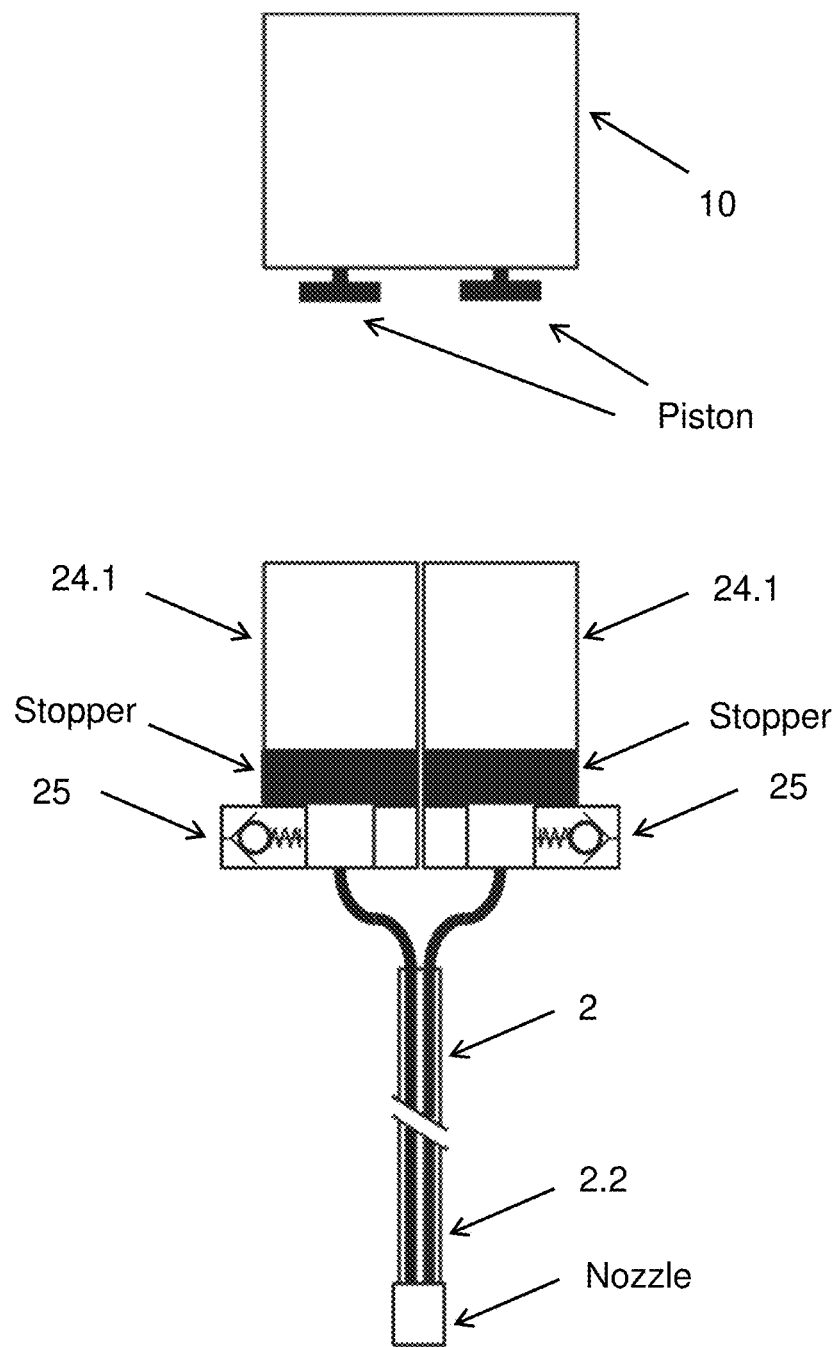
FIG. 41 shows an embodiment of the applicator according to the present disclosure, wherein the applicator comprises two first substance reservoirs, and a detached drive mechanism for pressurizing the two first substance reservoirs.

In analogy to FIG. 30, FIG. 41 shows an embodiment of the applicator according to the present disclosure, wherein the applicator 1 comprises two first substance reservoirs 24.1, and a detached drive mechanism 10 for pressurizing the two first substance reservoirs. The drive mechanism is exemplified as a motorized driver unit with two pistons.

Figure 42:
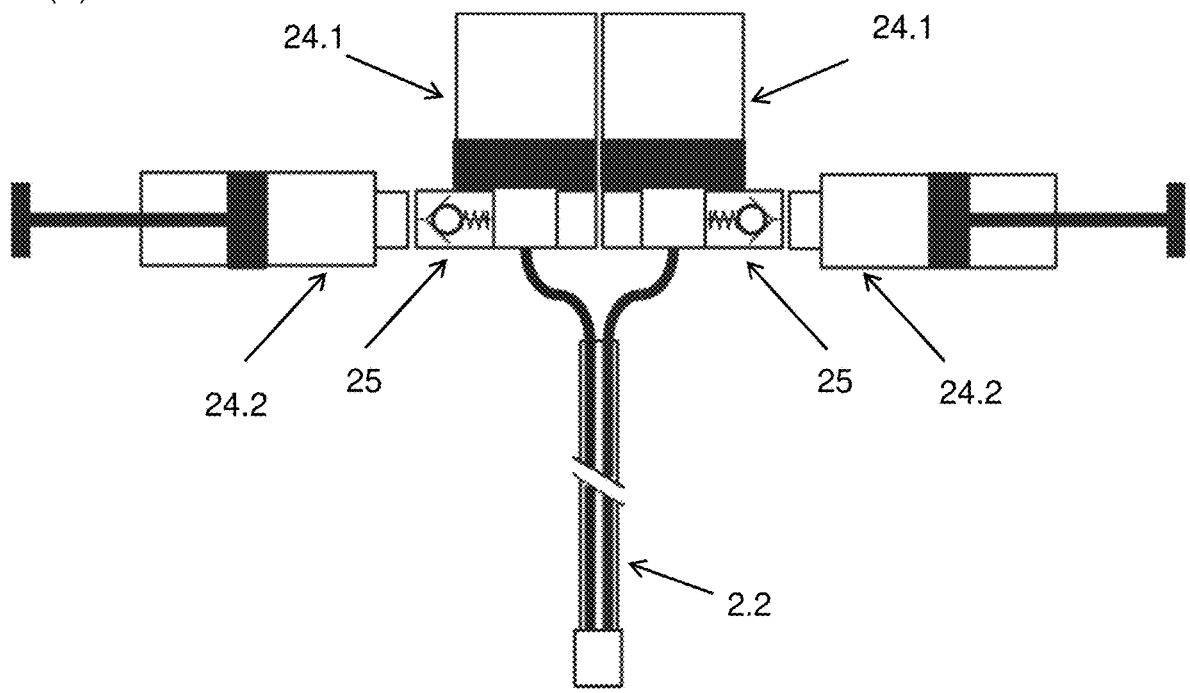
FIG. 42 shows the applicator of FIG. 41 comprising two first substance reservoirs, and further comprising two second substance reservoirs (here two syringes), where (A) shows loading of the first reservoirs by the syringes, and (B) shows the loaded applicator.
Figure 42:
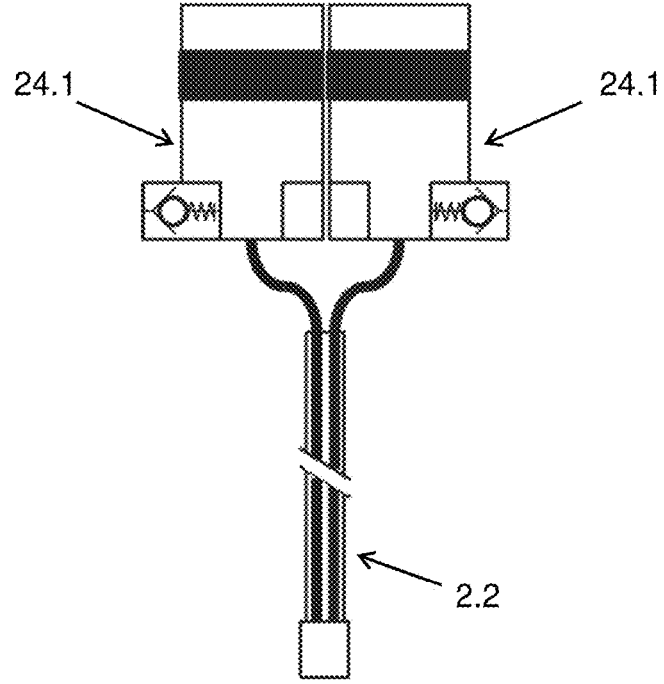

FIG. 42 shows the applicator of FIG. 41, where the two first substance reservoirs 24.1 are connected via check valves 25 to two second substance reservoirs 24.2 (shown as two syringes). (A) shows loading of the first reservoirs by the syringes, and (B) shows the loaded applicator, where the stopper is defining the first substance reservoir, and after the two syringes are detached.

Figure 43:
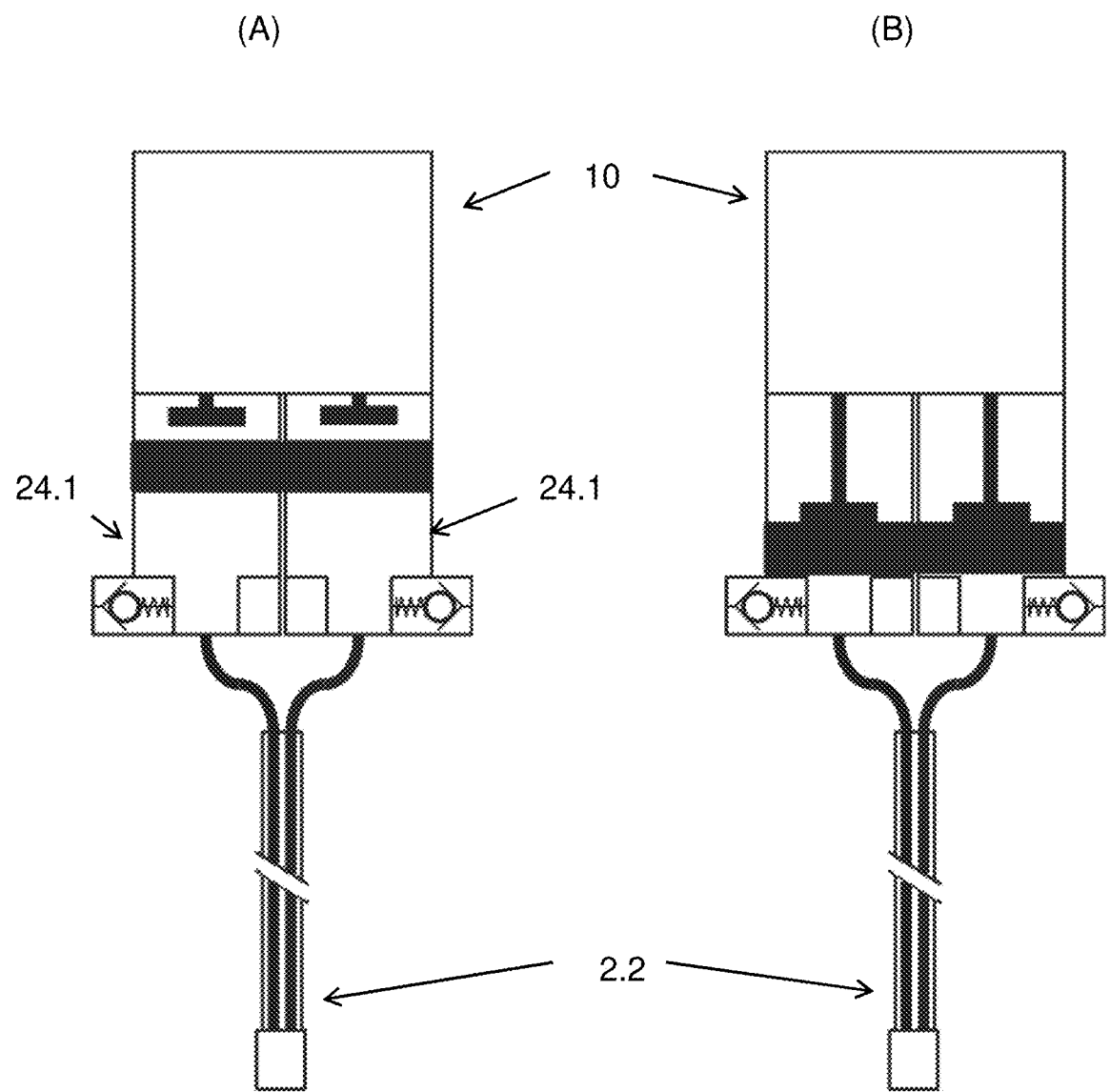
FIG. 43 shows the applicator of FIGS. 41-42, wherein the detachable drive mechanism for pressurizing the two first substance reservoirs is attached in (A), and in (B) the drive mechanism has emptied the two first reservoirs.

FIG. 43 shows the applicator of FIGS. 41-42, wherein the detachable drive mechanism for pressurizing the two first substance reservoirs 24.1 is attached in (A), and in (B) the pistons of the drive mechanism has translated the stopper, and thereby emptied the two first reservoirs.

Distal Loading

In addition to, or alternatively to, proximal loading, the applicator may also be configured for being loaded from the distal end. This may further improve the compact design, reduce the number of parts of the applicator, and provide a fully disposable applicator.

Figure 38:
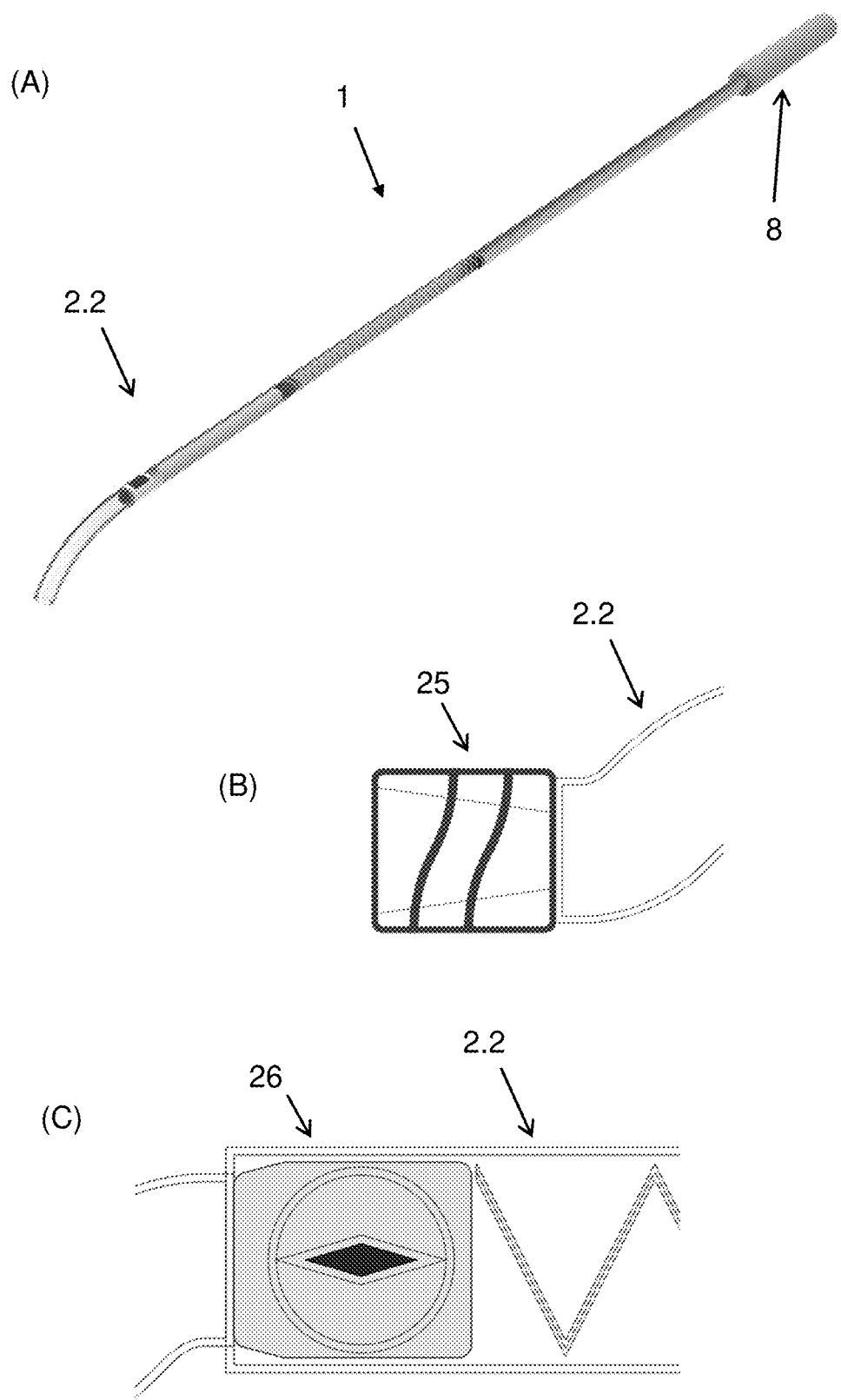
FIG. 38 (A) shows an embodiment of the applicator according to the present disclosure, wherein the applicator is configured for being loaded with substance from the distal end, where the distal end includes (B) a detachably attached auxiliary connector element to a substance reservoir, and (C) a flow controlling element.

FIG. 38A shows an embodiment of the applicator according to the present disclosure, where the applicator is configured for being loaded with substance 4 from the distal end 2.2, opposite to the pressure source 8 located at the proximal end 2.1. This may be obtained by the distal end or tip of the delivery tube comprising a detachably attached auxiliary connector element 25 for forming a fluid communication with a substance reservoir, as shown in FIG. 38B, and a flow controlling element 26, as shown in FIG. 38C. The flow controlling element may for example be a 3-way valve having three configurations: a first configuration providing a fluid passageway from the distally attached substance reservoir and into the delivery tube, a second configuration where no fluid passageway is provided such that the substance within the delivery tube may be pressurized, and a third configuration providing a fluid passageway from the delivery tube and out of the distal end of the delivery tube. Advantageously, the flow controlling element is configured for establishing a sequential fluid connection with opposite directions, first between 1) the substance reservoir and the delivery tube, and then between 2) the delivery tube and the detached substance reservoir.

In an embodiment of the disclosure, the delivery tube is configured for being loaded with substance from the distal end. In an embodiment of the disclosure, the delivery tube comprises one or more detachably attached connectors for a substance reservoir, and/or a flow controlling element.

Figure 39:
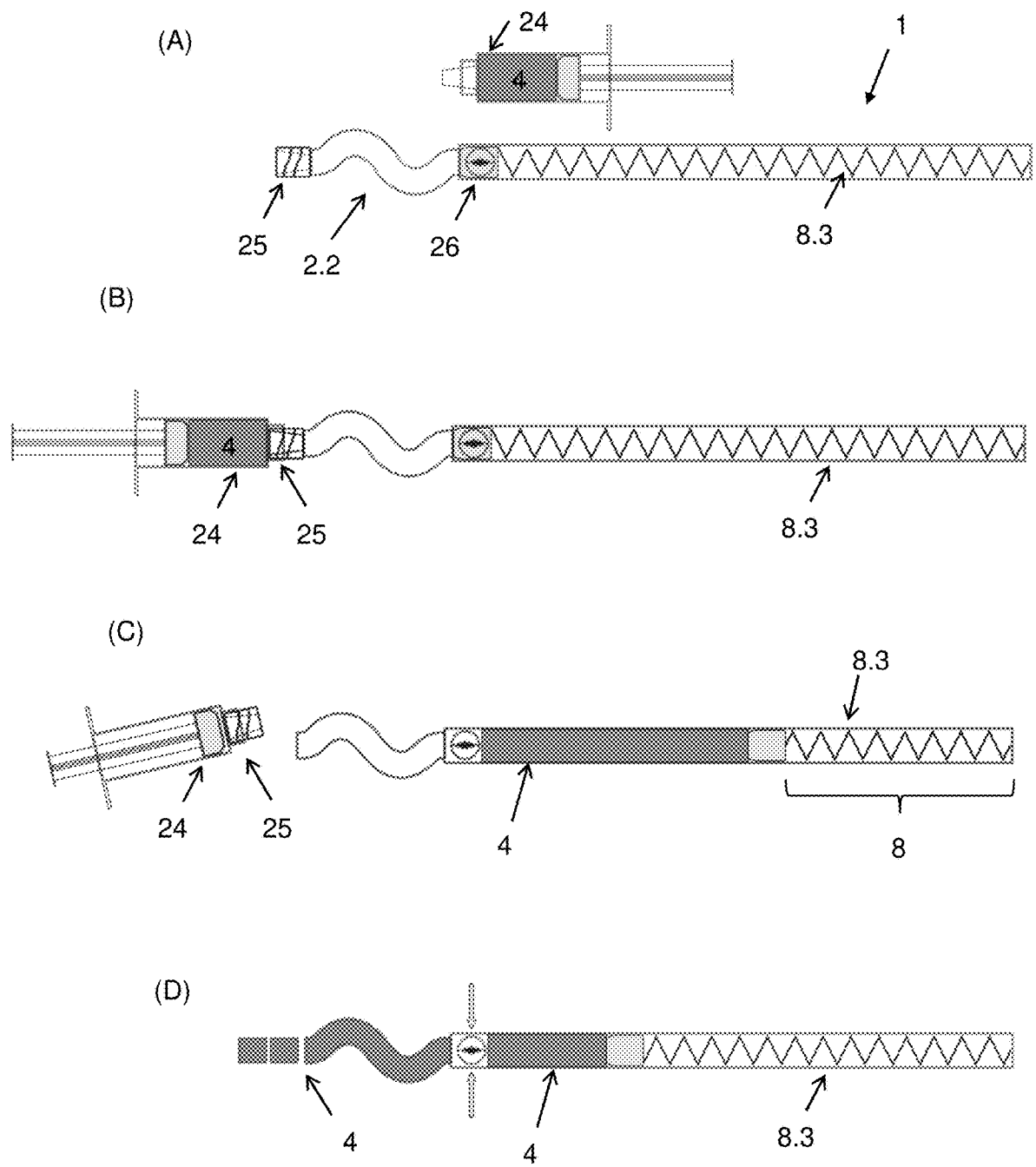
FIG. 39 shows an embodiment of the applicator according to the present disclosure, wherein the applicator is configured for being loaded with substance from the distal end as shown in (B), and where the pressure source for pressurizing and dispensing the substance as shown in (C-D) is a spring.

FIG. 39A shows an embodiment of the applicator according to the present disclosure, where the applicator is configured for being loaded with substance from the distal end 2.2 via a substance reservoir 24 in the form of a syringe comprising the substance 4. The applicator 1 comprises a pressure source 8, which advantageously is a spring 8.3 integrated within the delivery tube, as shown in FIG. 39A. The syringe 24 is attached to the distal end 2.2 of the delivery tube via the auxiliary connector element 25, which may be a Luer lock connector, as shown in FIG. 39B. The syringe content is transferred to the delivery tube, whereby the spring 8.3 is compressed, as shown in FIG. 39C. Hence, the pressure source in the form of spring energy is stored upon loading the delivery tube. Alternatively, the spring energy may be pre-stored by being pre-compressed, such that a predetermined spring energy amount is provided by the applicator. The syringe and the auxiliary connector element may then be detached, and the flow controlling element 26 facilitates that the substance within the delivery tube is pressured by the spring force. The applicator is ready for use, and the substance 4 may be dispensed as shown in FIG. 39D, e.g. via an actuator comprised within the flow controlling element, as indicated by arrows.

The present embodiment provides an applicator with a particularly compact design and small form factor. Further advantageously, the embodiment provides a non-motorized and fully disposable applicator for single use.

In an embodiment of the disclosure, the at least one pressure source is a spring configured to exert a pressure on the at least one fluid source and/or the substance within the delivery tube. In a further embodiment, the spring energy is pre-stored, and/or wherein the spring energy is stored upon loading the delivery tube.

Figure 40:
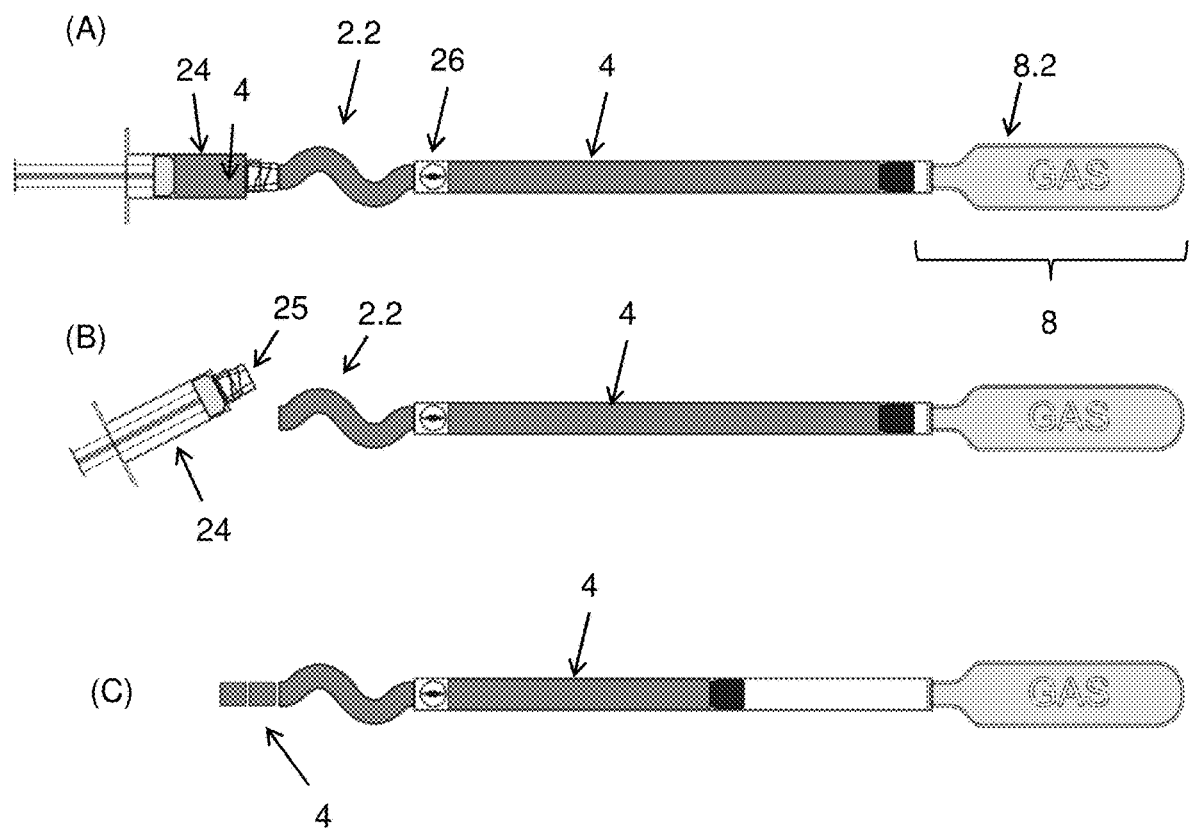
FIG. 40 shows an embodiment of the applicator according to the present disclosure, wherein the applicator is configured for being loaded with substance from the distal end as shown in (A), and where the pressure source for pressurizing and dispensing the substance as shown in (D) is a gas cartridge.

As alternative, or in addition, to a spring 8.3, the pressure source may include a gas pressure source such as a pressurized container, e.g. a gas cartridge 8.2. FIG. 40A shows an embodiment of the applicator according to the present disclosure, where the applicator 1 is configured for being loaded with substance from the distal end 2.2 via a substance reservoir 24 in the form of a syringe attachable to the distal end via an auxiliary connector element 25. The applicator further comprises a pressure source 8 for pressurizing and dispensing the substance in the form of a gas cartridge 8.2. After loading, the syringe 24 and the auxiliary connector element 25 is detached, as shown in FIG. 40B, and the substance 4 is dispensed by the gas pressure exerted, as shown in FIG. 40C. It follows that a gas pressure may be obtained by other means than a gas cartridge, e.g from motorized bellows, -propellers, -compressors, In an embodiment of the disclosure, the at least one pressure source is a gas configured to exert a pressure on the at least one fluid source and/or the substance within the delivery tube. In an embodiment of the disclosure, the gas pressure source is selected from the group of: gas cartridges, motorized bellows, -propellers, -compressors, and combinations thereof.

Haemostatic Powder Applications

According to one embodiment, the laparoscopic applicator is configured for dispensing a haemostatic powder at a selected site by means of a surgical robotic arm, wherein the laparoscopic applicator comprises:
a delivery tube for holding the haemostatic powder; and
a variable rate feeder, such as a screw conveyor, configured for transporting the haemostatic powder through the delivery tube to the outside of the delivery tube, whereby the haemostatic powder is dispensed from the applicator.

Figure 26:
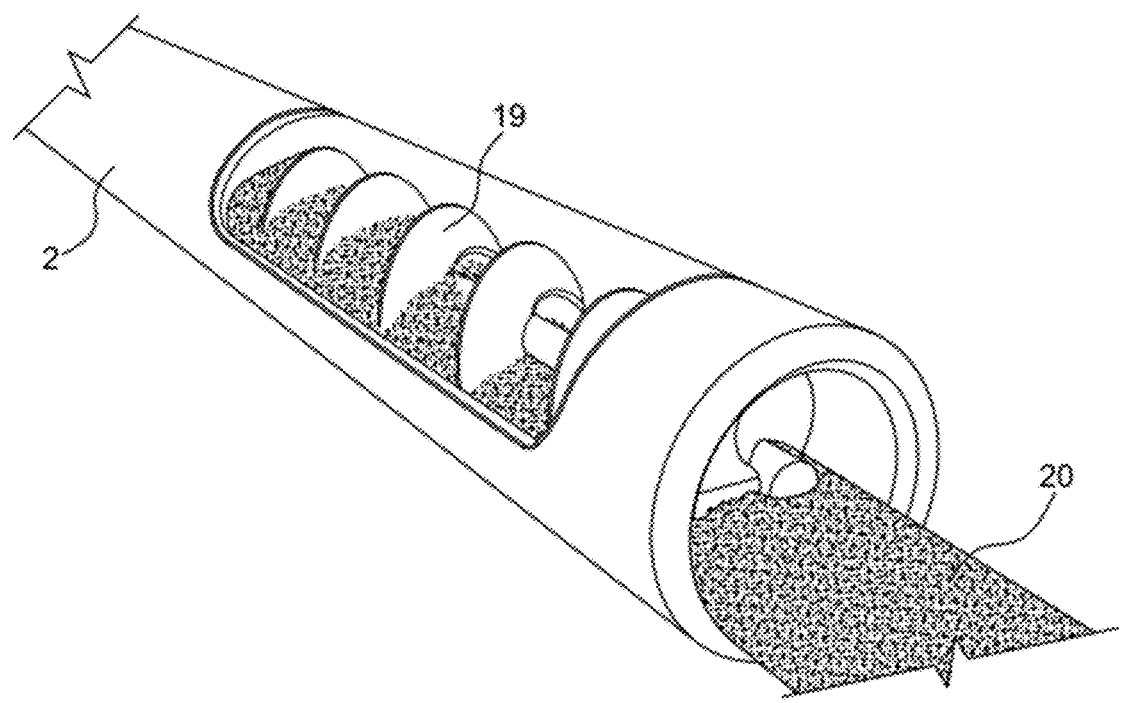
FIG. 26 shows an embodiment of the applicator according to the present disclosure, wherein the applicator comprises a screw conveyor for transporting a powder through the delivery tube.

The haemostatic powder preferably comprises a haemostatic agent. Advantageously, the haemostatic powder comprises particles having a particle size greater than 180 micron. In an embodiment, the haemostatic powder comprises particles having an average particle size of at least 275 micron, such as approximately 300 micron in average. Furthermore, the particles may have a tapped density of at least 0.3 g/cm$^3$, more preferably at least 0.4 g/cm$^3$, even more preferably at least 0.44 g/cm$^3$. As an example, the particles may have a tapped density in the range 0.3-1 g/cm$^3$. In one embodiment, the variable rate feeder is a screw conveyor. This is illustrated in FIG. 26. In another embodiment, the variable rate feeder is a paddle wheel. The applicator may comprise a first positional sensor, such as a magnetic sensor or an optical sensor, said sensor being configured for determining the position of the screw conveyor and/or the paddle wheel. The first positional sensor is preferably configured to register each turn of the screw conveyor and/or the paddle wheel and each turn is added or subtracted depending on the rotational direction so that position of the screw conveyor and/or the paddle wheel can be determined. If a processor is used to control the screw conveyor and/or the paddle wheel processor will know the direction of the rotation. Alternatively, the first positional sensor can sense the direction e.g. by having two sensors next to each other. The position (e.g. determined by the number of turns) of the screw conveyor may be used to determine the remaining amount of powder in the delivery tube.

In another embodiment, the laparoscopic applicator for dispensing the haemostatic powder at a selected site by means of a surgical robotic arm, comprises:
a delivery tube holding the haemostatic powder;
a valve located at a distal end of the delivery tube, wherein the valve is configured to open at a pre-defined opening pressure; and
a vibrating device, such as an ultrasonic vibrating device, configured for shaking the haemostatic powder out of the delivery tube when the valve is open.

A laparoscopic applicator comprising a vibrating device is shown in FIGS. 27-29. In case the applicator comprises a vibrating device, the applicator may further comprise a clock configured for measuring the elapsed time when the vibrating device is activated/vibrating. The elapsed time may be used to estimate the remaining volume of haemostatic powder in the delivery tube. Alternatively, the applicator may comprise one of the sensors described above for determining the amount of substance in the applicator.

The laparoscopic applicator is configured for dispensing or withdrawing a substance comprising a haemostatic agent, and said substance may be in the form of a liquid, a paste, or a powder. Due to the flow characteristics of powders, the pressure source or drive mechanism for transporting the haemostatic powder through the delivery tube to the outside of the delivery tube advantageously comprises a combination of a variable rate feeder, such as a screw conveyor, or a vibrating device, in combination with a pressure source, such as a gas pressure source.

In case the medical substance is a powder, such as a haemostatic powder, a pressure source is not necessarily needed, since the powder may be discharged from the applicator by other means. In this case the applicator may, as an alternative, or an addition, to the pressure source, comprise a variable rate feeder configured for transporting the haemostatic powder through the delivery tube to the outside of the delivery tube, whereby the haemostatic powder is dispensed from the applicator. Alternatively, the applicator may comprise a vibrating device for shaking the powder out of the applicator. However, advantageously for efficient and precise discharge of the powder, e.g. to obtain sufficient flow characteristics and spray angle, the variable rate feeder further comprises a pressure source, such as a gas pressure source.

Figure 31:
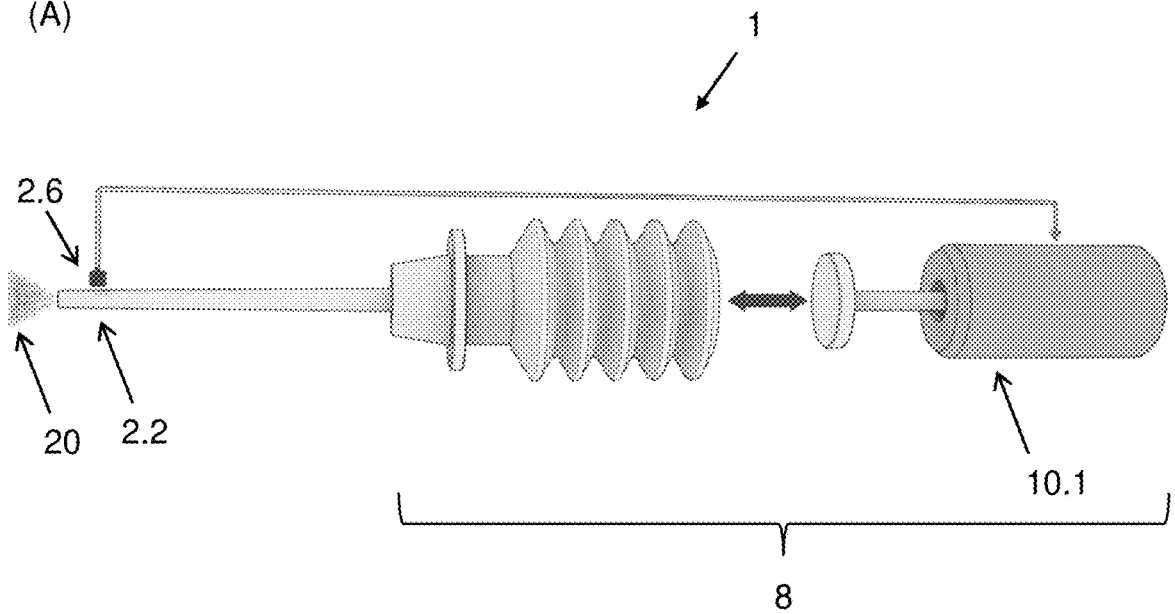
FIG. 31 shows an embodiment of the applicator according to the present disclosure, wherein the applicator comprises a gas pressure source for transporting a powder through the delivery tube, where the gas pressure source is bellows, which are activated by a motorized piston, e.g. a piston vibrating back and forth in the horizontal direction. (A) shows a perspective view, and (B) a cross-sectional view of the applicator.
Figure 31:
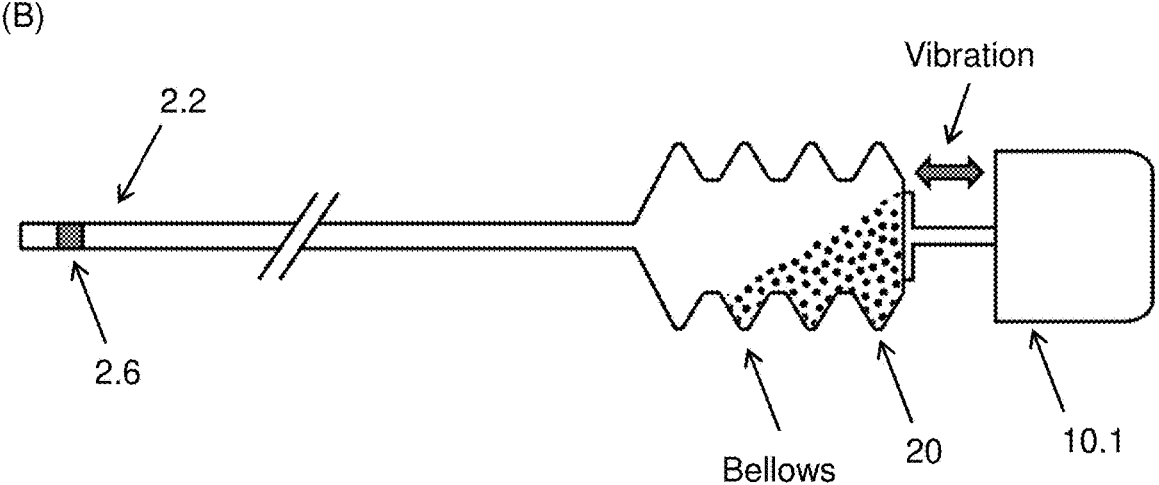

FIG. 31 shows an embodiment of the applicator according to the present disclosure, wherein the applicator 1 comprises a gas pressure source 8 for transporting a powder through the delivery tube. For example, the gas pressure source is bellows, which are activated by a motorized piston 10.1, e.g. a piston vibrating back and forth in the horizontal direction, as indicated by the larger double arrow. (A) shows a perspective view, and (B) a cross-sectional view of the applicator. The driving mechanism of the pressure source may be activated via an actuator 2.6, such as an electrical actuator sending an electrical signal to the motor 10.1, as indicated in FIG. 31A, whereby the powder 20 is dispensed from the distal end 2.2 of the delivery tube. The powder may be prefilled into the applicator or supplied from a second substance reservoir 24.2 via an auxiliary connector element 25, or the bellows may comprise a substance reservoir, such as a powder 20 reservoir, such that the powder is transported simultaneously with the gas pressure source. as shown in FIG. 31B.

Figure 32:
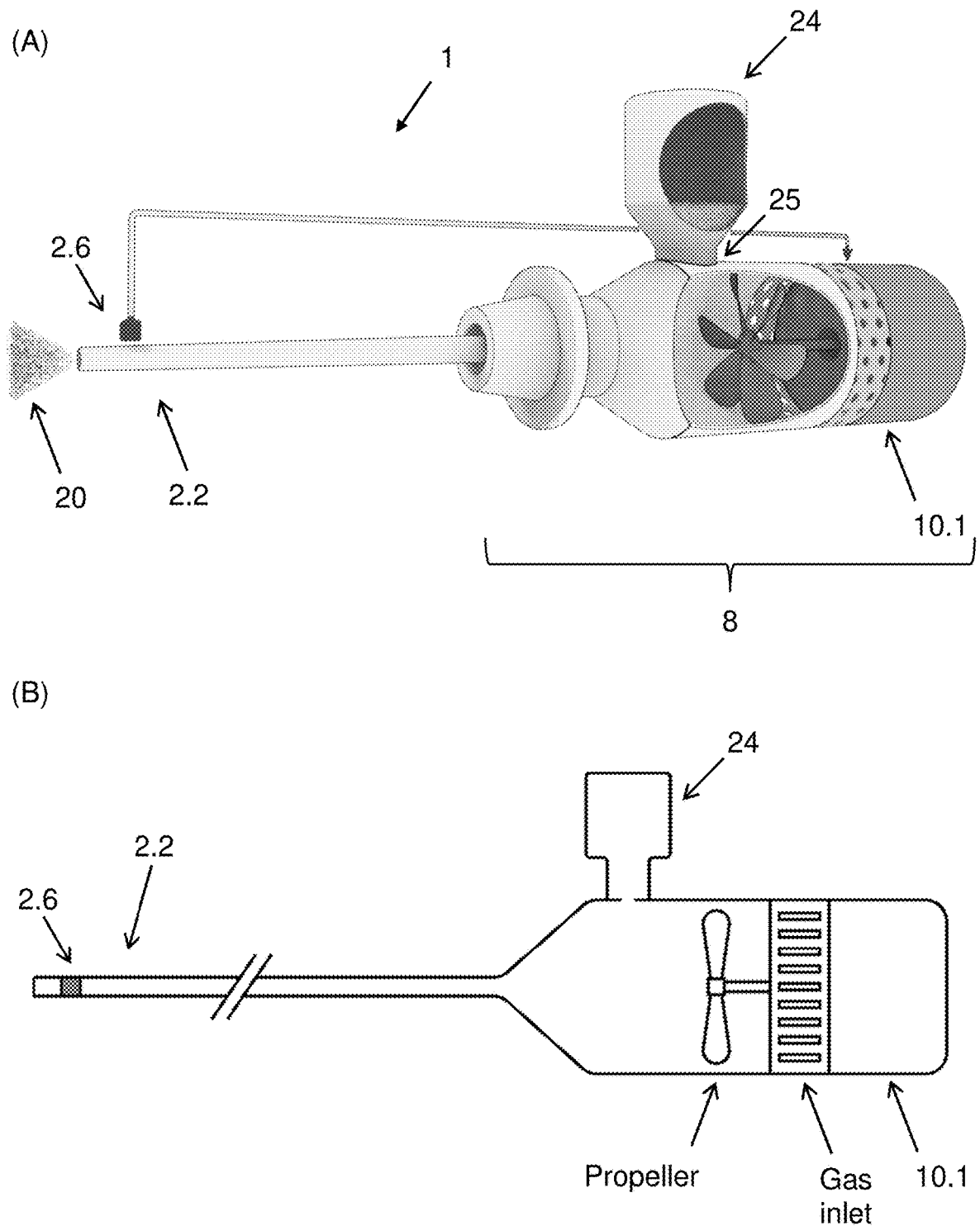
FIG. 32 shows an embodiment of the applicator according to the present disclosure, wherein the applicator comprises a gas pressure source for transporting a powder through the delivery tube, where the gas pressure source is obtained via a motorized propeller, and optionally a gas inlet. (A) shows a perspective view, and (B) a cross-sectional view of the applicator.
Figure 33:
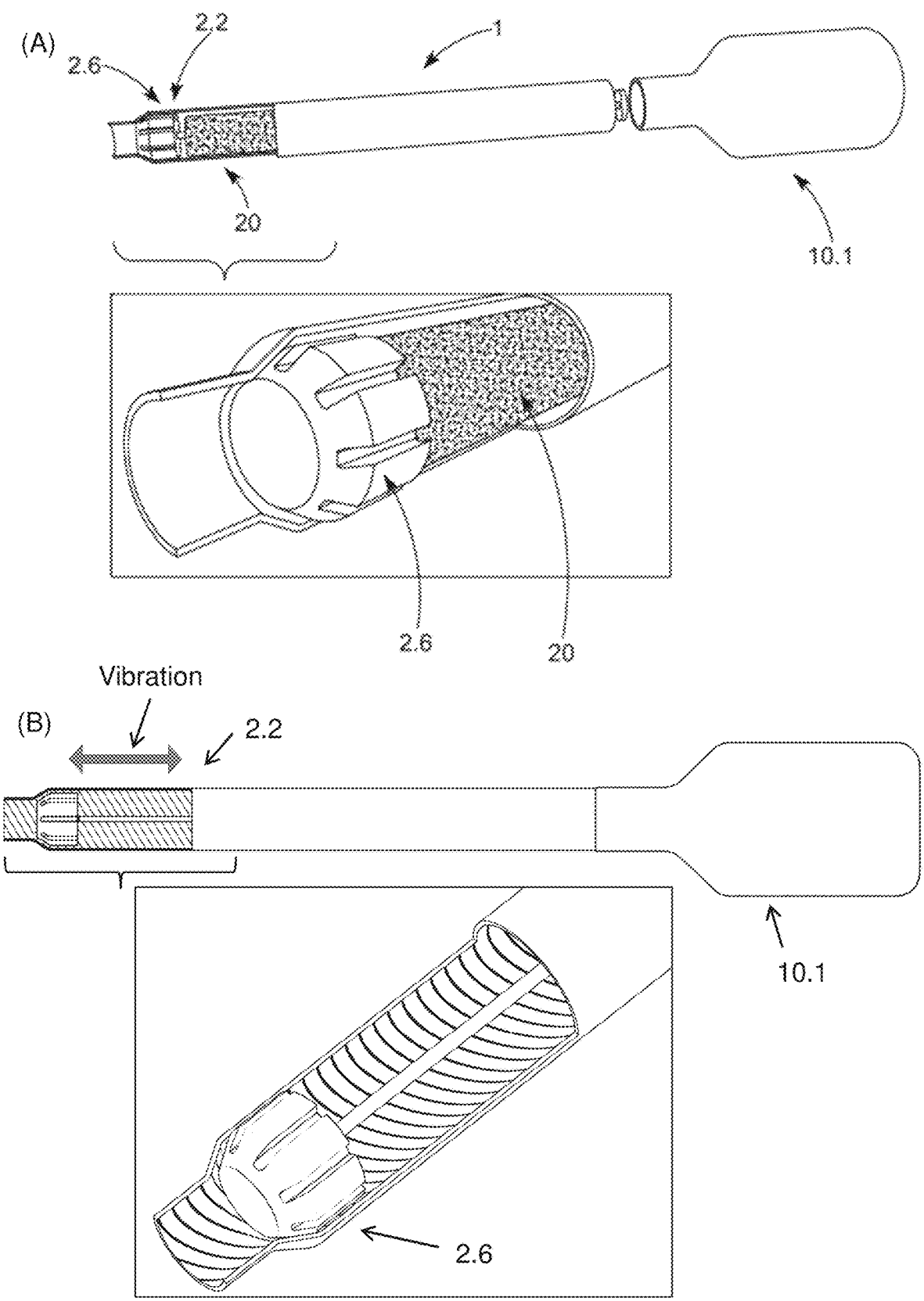
FIG. 33 shows an embodiment of the applicator according to the present disclosure, wherein the applicator comprises a pressure source for transporting a powder through the delivery tube, where the pressure source is a distally located piston with apertures, and where the distally located piston may be motorized to vibrate back and forth in the horizontal direction. (A) shows a partly perspective view, where the distal end is enlarged in the inserted frame, (B) shows a cross-sectional view, where the distal end is enlarged in the inserted frame in perspective view.

FIG. 32 shows an embodiment of the applicator according to the present disclosure, wherein the applicator comprises a gas pressure source 8 for transporting a powder 20 through the delivery tube, where the gas pressure source is obtained via a motorized propeller, and optionally a gas inlet. (A) shows a perspective view, and (B) a cross-sectional view of the applicator. The driving mechanism of the pressure source may be activated via an actuator 2.6, such as an electrical actuator sending an electrical signal to the motor 10.1, as indicated in FIG. 32A, whereby the powder 20 is dispensed from the distal end 2.2 of the delivery tube. The powder may be prefilled into the applicator or supplied from a second substance reservoir 24.2 via an auxiliary connector element 25, FIG. 33 shows an embodiment of the applicator according to the present disclosure, wherein the applicator comprises a pressure source for transporting a powder through the delivery tube, where the pressure source is a distally located piston or actuator 2.6 with apertures for establishing fluid communication to the distal end 2.2 of the delivery tube. The distally located piston may be motorized 10.1 to vibrate back and forth in the horizontal direction, as indicated by the large double arrow, whereby the powder 20 is dispensed from the distal end 2.2 of the delivery tube. (A) shows a partly perspective view, where the distal end is enlarged in the inserted frame, (B) shows a cross-sectional view, where the distal end is enlarged in the inserted frame in perspective view. The powder may be prefilled into the applicator or supplied from a second substance reservoir via an auxiliary connector element.

Figure 34:
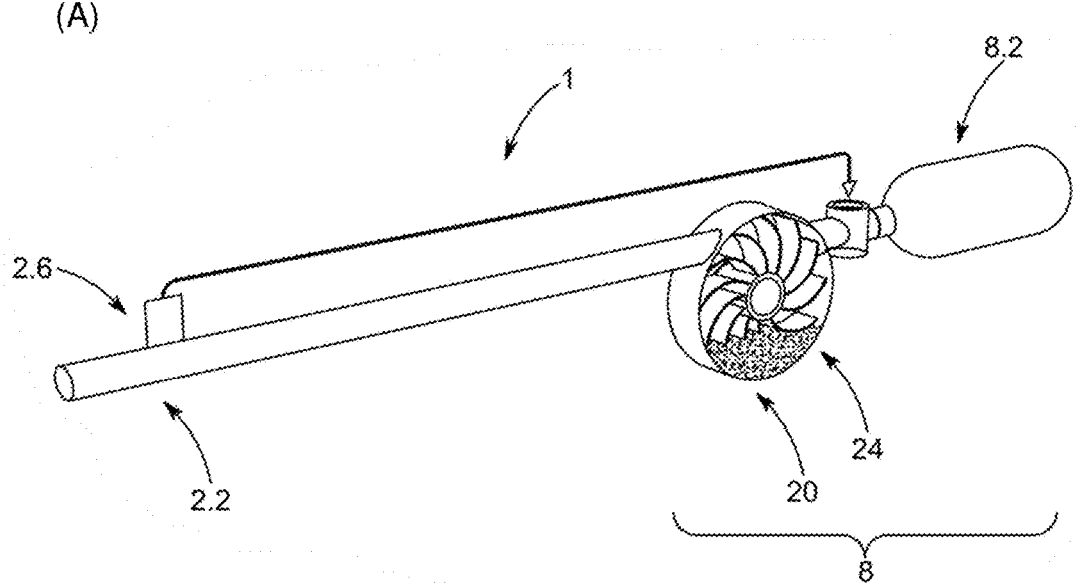
FIG. 34 shows an embodiment of the applicator according to the present disclosure, wherein the applicator comprises a gas pressure source for transporting a powder through the delivery tube, where the gas pressure source is obtained form a rotating paddle wheel or impeller. The impeller may further be controlled by a gas cartridge in combination with a gas flow control valve.
Figure 34:
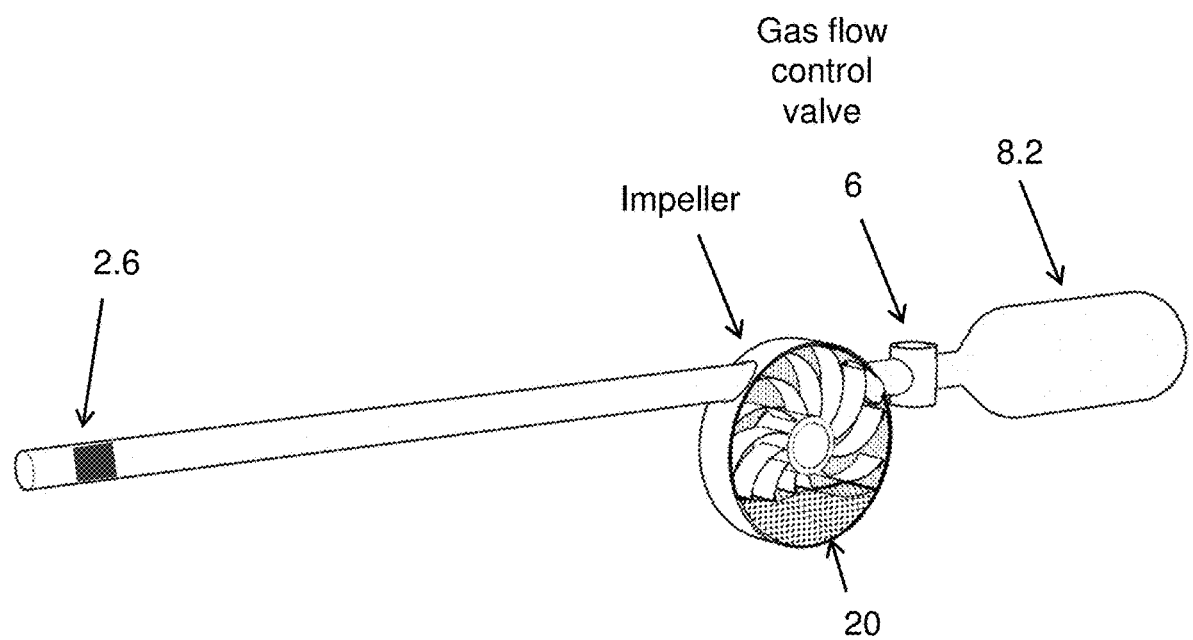

FIG. 34 shows an embodiment of the applicator according to the present disclosure, wherein the applicator comprises a gas pressure source for transporting a powder through the delivery tube, where the gas pressure source is obtained form a rotating paddle wheel or impeller. The impeller may further be controlled by a gas cartridge 8.2 in combination with a gas flow control valve, e.g. in combination with the connector 6. Thus, the powder feed may be controlled by the rotation rate of the impeller and the gas cartridge supply. The powder may be prefilled into the applicator or supplied from a first or second substance reservoir 24, such as comprised within the impeller as indicated most clearly in FIG. 34B.

In an embodiment of the disclosure, the variable rate feeder further comprises a pressure source, such as a gas pressure source, optionally selected from the group of: gas cartridges, motorized bellows, -propellers, -compressors, and combinations thereof. In an embodiment of the disclosure, the variable rate feeder comprises a powder reservoir, wherein the reservoir optionally comprises a reservoir feed controller, such as an adjustable reservoir opening.

For efficient and precise discharge of the powder, e.g. to obtain sufficient flow characteristics and spray angle, the gas pressure source advantageously provides the possibility of a reduced gas flow, e.g. a reduced air flow or reduced air volume, such that the powder discharge is more controlled and powder turbulence at the discharge is avoided. This may be obtained by the applicator comprising flow confining elements for reducing the gas flow at the powder delivery site.

Figure 35:
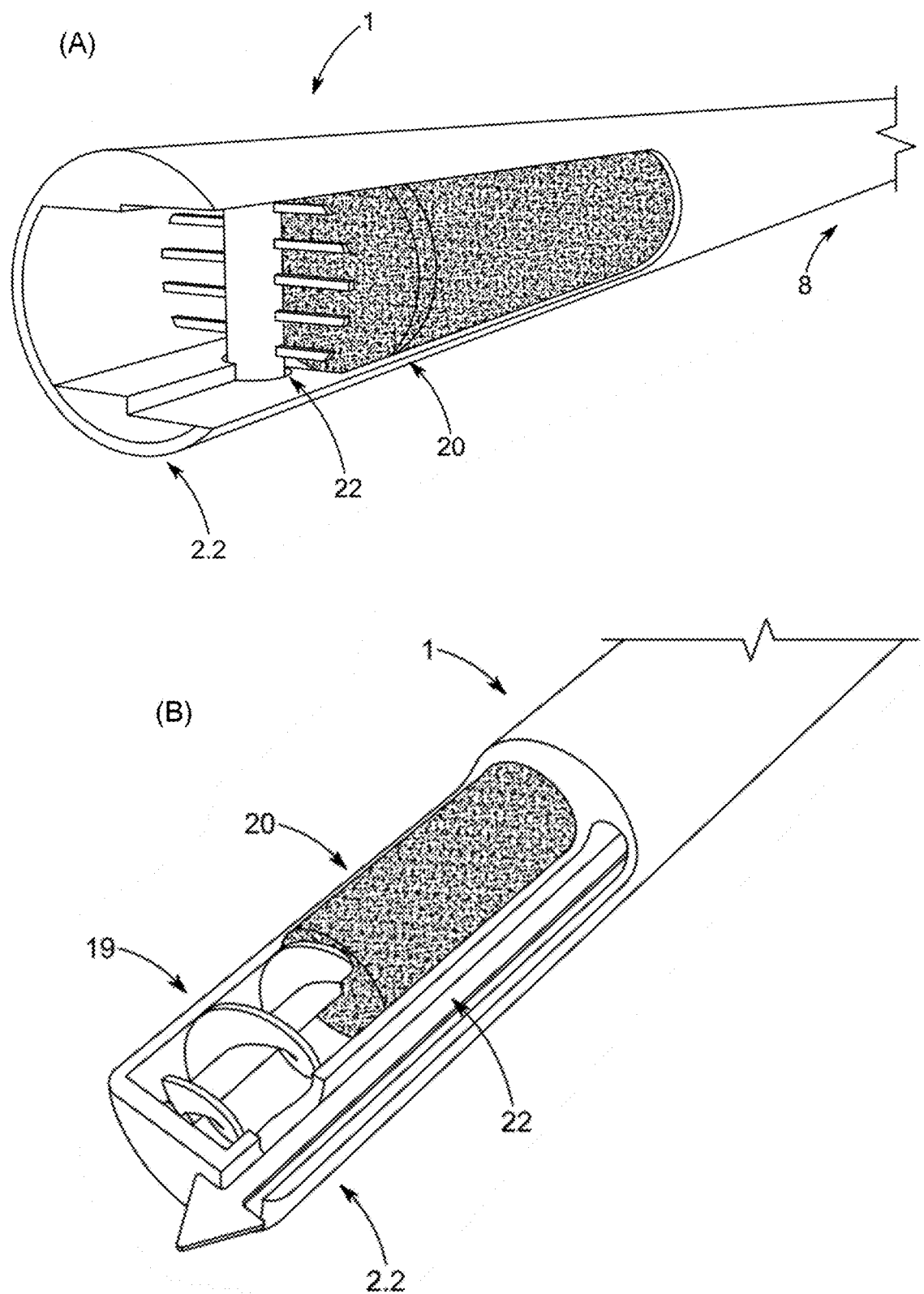
FIG. 35 shows an embodiment of the applicator according to the present disclosure, wherein the applicator comprises a pressure source for transporting a powder through the delivery tube, and further flow confining elements for reducing the gas flow at the powder delivery site, where the flow confining elements are (A) grid or slit elements within the delivery tube, and (B) a screw conveyor for transporting a powder through the delivery tube in combination with a separate gas flow channel.

FIG. 35 shows an embodiment of the applicator according to the present disclosure, wherein the applicator 1 comprises a gas pressure source 8 for transporting a powder through the delivery tube, and further flow confining elements for reducing the gas flow at the powder delivery site. For example the flow confining elements 22 may be a grid or slit elements within the delivery tube that the powder 20 and gas has to pass, as shown in FIG. 35A. Alternatively, the flow confining element 22 may be a separate gas flow channel as shown in FIG. 35B, which is running in parallel with a screw conveyor 19 transporting the powder 20.

In an embodiment of the disclosure, the variable rate feeder comprises one or more flow confining elements, such as grid elements or separate gas flow channels.

REFERENCE NUMERALS

1—Laparoscopic applicator
2—Delivery tube
2.1—Proximal end
2.2—Distal end
2.3—Deformable section
2.4—Rigid surface
2.5—Rigid surface opening
2.6—Actuator
2.7—Valve
2.8—Rigid section
2.9—Arrows showing direction of force applied on a duckbill valve
3—Rigid sheath
4—Substance 5—Surgical robotic arm
6—Connector
7—Fluid source
8—Pressure source
8.1—Propellant
8.2—Gas cartridge
8.3—Spring
9—Applicator tip
10—Driver unit
10.1—Motor
11—Flow controller
12—Pressure indicator light
13—Status indicator
14—First lumen
15—Second lumen
16—Third lumen
17—Fourth lumen
18—Malleable wire/rod
19—Screw conveyor
20—Haemostatic powder
21—Vibrating device
22—Flow confining elements
24—Substance reservoir
24.1—First substance reservoir
24.2—Second substance reservoir
25—Auxiliary connector element
26—Flow controlling element
27—Transmitting unit
27.1—Transmitting unit cover
28—Signal carrier
29—Grip section
29.1—Connection section
29.2—Nozzle
29.3—Activation section
30—Shrink tube
31—Trocar
32—Insertion guide
32.1—Insertion guide handle Further Details of the Invention 1. A laparoscopic applicator for dispensing or withdrawing a substance, e.g. a substance comprising a haemostatic agent, at a selected site by means of a surgical robotic arm, the laparoscopic applicator comprising:
   a delivery tube for holding the substance; and
   an applicator tip connected to a distal end of the delivery tube, the applicator tip configured for:
   being spatially manipulated by the robotic arm, and/or
   controllably releasing the substance from the delivery tube by the robotic arm, and/or
   controllably withdrawing the substance from the selected site into the delivery tube.
2. The laparoscopic applicator according to item 1, for dispensing a substance, e.g. a substance comprising a haemostatic agent, at a selected site by means of a surgical robotic arm, the laparoscopic applicator comprising:
   a delivery tube; and
   an applicator tip connected to a distal end of the delivery tube, the applicator tip configured for being controllable operated by the robotic arm by a grip section in axial extension of the delivery tube, the grip section having a perimeter transverse to the axis comprising an apex shaped section, such that the grip section is configured for being clamped and spatially manipulated by the robotic arm.
3. The laparoscopic applicator according to any of items 1-2, wherein the delivery tube comprises at least one rigid section, such as a rigid tubular section or a rigid surface area.
4. The laparoscopic applicator according to item 3, wherein the at least one rigid section is dimensioned such that it is tangible by the robotic arm, such as tangible by gripping, pushing, or attachment.
5. The laparoscopic applicator according to any of the preceding items, wherein the delivery tube comprises a deformable section.
6. The laparoscopic applicator according to item 5, wherein the deformable section is compressible, e.g. in the form of a corrugated tube, such that the length of the tube may be varied.
7. The laparoscopic applicator according to any of the items 5-6, wherein the deformable section comprises a corrugated surface profile, preferably wherein the corrugated surface profile comprises a plurality of circumferential folds.
8. The laparoscopic applicator according to any of the items 5-7, wherein the deformable section is located at a distal end of the delivery tube.
9. The laparoscopic applicator according to any of items 5-8, wherein the deformable section is located at a distance from the distal end of the delivery tube.
10. The laparoscopic applicator according to any of the preceding items, wherein the delivery tube and/or applicator tip is dimensionally configured for holding the substance under a pressure, and/or configured to include one or more flow controlling elements.
11. The laparoscopic applicator according to any of the preceding items, wherein the delivery tube and/or applicator tip has an inner diameter of less than 5 mm, preferably less than 3 mm, even more preferably less than 2 mm.
12. The applicator according to any of the preceding items, wherein the delivery tube has a length between 350-500 mm.
13. The applicator according to any of the preceding items, wherein the delivery tube has an outer diameter of between 2.5-4.5 mm, and/or an inner lumen with a diameter between 1.5-2.0 mm.
14. The applicator according to any of the preceding items, wherein the delivery tube comprises a lumen with a cross sectional area corresponding to a diameter of between 1.2-1.5 mm.
15. The applicator according to any of the preceding items, wherein at least a part of the delivery tube is configured to be tension free flexible, and/or wherein the applicator further comprises an insertion guide for supporting the delivery tube, wherein the insertion guide optionally is configured to be slidably along the axial direction of the delivery tube.
16. The applicator according to any of the preceding items, wherein the delivery tube comprises a flexible material having a Young's modulus of between 0.0001-0.035 GPa.
17. The applicator according to any of the preceding items, wherein the delivery tube comprises a material having a damping coefficient of between 0.2-2.0.
18. The applicator according to any of the preceding items, wherein the delivery tube comprises or consists of a vibrational energy dissipating material selected from the group of: silicone elastomers, butyl rubber, polyurethane, and combinations thereof.

19. The applicator according to any of the preceding items, wherein the apex shaped section is selected from the group of: rounded apex, obtuse apex, acute apex, acuminate apex, and combinations thereof.

20. The applicator according to any of the preceding items, wherein the perimeter has a shape selected from the group of: ellipse, oval with one axis of symmetry, oval with two axes of symmetry, equilateral triangle, isosceles triangle, scalene triangle, parallelogram, and rhombus.

21. The applicator according to any of the preceding items, wherein the perimeter shape is defined by a major axis defining the longest dimension, and a minor axis defining the shortest dimension.

22. The applicator according to item 21, wherein the major axis is between 2.5-5.2 mm, and/or wherein the minor axis is between 2.5-3.5 mm.

23. The applicator according to any of the preceding items, wherein the grip section has a length of between 20-25 mm or between 30-35 mm.

24. The applicator according to any of the preceding items, wherein the grip section comprises a connection section in fluid communication with the delivery tube.

25. The applicator according to item 24, wherein the connection section comprises a joint selected from the group of: perpendicular cut connection, step-cut connection, glue joint, shrinking tube connection, and combinations thereof.

26. The applicator according to any of the preceding items, wherein the grip section comprises an occlusion robust material selected from the group of: steel, stainless steel, polymers, such as ABS, polycarbonate, polyamide, PEEK, and combinations thereof.

27. The applicator according to any of the preceding items, wherein the grip section comprises a coating comprising a soft polymer selected from the group of: polyolefin, ABS, and combinations thereof.

28. The applicator according to item 27, wherein the coating is obtained by shrink tubing.

29. The applicator according to any of the preceding items, wherein the applicator tip and/or grip section comprises a magnetic element configured for magnetically attaching the tip to a surgical instrument.

30. The applicator according to item 29, wherein the magnetic element is a neodymium magnet, preferably with a holding force of at least 400 g/cm$^2$.

31. The laparoscopic applicator according to any of the preceding items, wherein the delivery tube contains a substance, e.g. a substance comprising a haemostatic agent, said substance being in the form of a liquid, a paste, or a powder.

32. The laparoscopic applicator according to item 31, wherein the substance comprises a bioactive agent and/or a haemostatic agent.

33. The laparoscopic applicator according to item 31, wherein the substance comprises a material selected from the group of: Polyethylene glycol (PEG), cyanoacrylate, oxidized regenerated cellulose, microporous polysaccharide spheres, and microfibrillar collagen.

34. The laparoscopic applicator according to item 31, wherein the substance is a haemostatic paste comprising a haemostatic agent.

35. The laparoscopic applicator according to item 34, wherein the haemostatic agent is selected from the group of: thrombin and fibrinogen.

36. The laparoscopic applicator according to item 31, wherein the substance is a haemostatic powder.

37. The laparoscopic applicator according to item 36, wherein the haemostatic powder comprises particles having a particle size greater than 180 micron.

38. The laparoscopic applicator according to any of the items 36-37, wherein the haemostatic powder comprises particles having an average particle size of at least 275 micron.

39. The laparoscopic applicator according to any of the items 36-38, wherein the haemostatic powder comprises particles having a tapped density of at least 0.4 g/mL.

40. The laparoscopic applicator according to any of the items 36-39, wherein the applicator further comprises a variable rate feeder, such as a screw conveyor, configured for transporting the haemostatic powder through the delivery tube to the outside of the delivery tube, whereby the haemostatic powder is dispensed from the applicator.

41. The laparoscopic applicator according to item 40, wherein the variable rate feeder is configured for being driven/rotated by an external motor.

42. The laparoscopic applicator according to item 40, wherein the applicator further comprises a motor for driving/rotating the variable rate feeder.

43. The laparoscopic applicator according to any of the items 40-41, wherein the variable rate feeder is a screw conveyor.

44. The laparoscopic applicator according to any of the items 40-41, wherein the variable rate feeder is a paddle wheel.

45. The laparoscopic applicator according to any of items 40-44, wherein the variable rate feeder further comprises a gas pressure source, optionally selected from the group of: gas cartridges, motorized bellows, -propellers, -compressors, and combinations thereof.

46. The laparoscopic applicator according to any of items 40-45, wherein the variable rate feeder comprises a powder reservoir, wherein the reservoir optionally comprises a reservoir feed controller, such as an adjustable reservoir opening and/or paddle wheel.

47. The laparoscopic applicator according to any of items 40-46, wherein the variable rate feeder comprises one or more flow confining elements, such as grid elements or separate gas flow channels.

48. The laparoscopic applicator according to any of the items 40-47, wherein the applicator further comprises a first positional sensor configured to determine the position of the variable rate feeder.

49. The laparoscopic applicator according to item 48, wherein the first positional sensor is an optical sensor.

50. The laparoscopic applicator according to item 48, wherein the variable rate feeder is provided with a magnet, and wherein the first positional sensor is a magnetic sensor configured to detect the presence of the magnet.

51. The laparoscopic applicator according to any of the items 36-50, wherein the applicator further comprises a vibrating device, such as an ultrasonic vibrating device, configured for shaking the haemostatic powder out of the delivery tube.

52. The laparoscopic applicator according to item 51, wherein the applicator further comprises a clock configured for measuring the elapsed time when the vibrating device is activated/vibrating.

53. The laparoscopic applicator according to item 52, wherein the elapsed time is used to estimate the remaining volume of haemostatic powder in the delivery tube.
54. The laparoscopic applicator according to any of the preceding items, wherein the delivery tube comprises a plurality of lumens, such as at least two lumens, or at least three lumens, or at least four lumens.
55. The laparoscopic applicator according to item 54, wherein the plurality of lumens comprises a first lumen and a second lumen, wherein the first lumen is configured to contain a substance, e.g. a substance comprising a haemostatic agent, and the second lumen is configured to contain electrical wiring or an optical fibre.
56. The laparoscopic applicator according to item 55, wherein the inner diameter of the first lumen is less than 4 mm, preferably less than 3 mm, even more preferably less than 2 mm.
57. The laparoscopic applicator according to any of the items 54-56, wherein at least one of the plurality of lumens is configured to contain a malleable wire or rod.
58. The laparoscopic applicator according to any of the items 5-57, wherein the applicator further comprises a malleable wire or rod, configured such that the deformable section of the delivery tube may be bent into a desired shape, said shape being approximately maintained upon release of the delivery tube.
59. The laparoscopic applicator according to any of the items 5-58, wherein the deformable section of the delivery tube may be bent along two planes at two pre-determined angles, such as at least 30° or at least 45°.
60. The applicator according to any of the preceding items, the applicator tip and/or grip section comprising one or more light sources, detection sensors, and/or cameras.
61. The applicator according to any of the preceding claims, comprising one or more lumens configured for receiving one or more signal carriers or signal transmitters, such as electrical or optical signals.
62. The laparoscopic applicator according to any of the preceding items, wherein the applicator tip is detachably attached to the distal end of the delivery tube.
63. The laparoscopic applicator according to any of the preceding items, wherein the applicator tip is integrated in the delivery tube, such that the delivery tube and the applicator tip is a single unit.
64. The laparoscopic applicator according to any of the preceding items, wherein the delivery tube and/or the applicator tip are disposable.
65. The applicator according to any of the preceding items, the applicator tip configured to controllably releasing a substance from the delivery tube by the robotic arm, by an activation section configured to be subjected to a predefined force by the robotic arm.
66. The applicator according to item 65, wherein the activation section is located in axial extension of the grip section.
67. The applicator according to item 65, wherein the activation section is coinciding with the grip section.
68. The applicator according to any of items 65-67, wherein the activation section is configured to activate a substance release mechanism, when the predefined force is exceeded.
69. The laparoscopic applicator according to any of the preceding items, wherein the applicator or applicator tip further comprises at least one valve configured for releasing the substance from the delivery tube upon opening of said valve.
70. The laparoscopic applicator according to item 69, wherein the at least one valve is a pressure activated valve having a pre-defined opening pressure threshold.
71. The laparoscopic applicator according to item 69, wherein the substance is dispensed from the delivery tube when the pre-defined opening pressure threshold is exceeded.
72. The laparoscopic applicator according to any of the items 69-71, wherein the at least one valve is controllable by an actuator located on the applicator.
73. The laparoscopic applicator according to any of the items 69-72, wherein the at least one valve is controllable by an external actuator, such as a foot pedal.
74. The laparoscopic applicator according to any of the items 69-73, wherein the at least one valve is selected from the group of: one-way valve, elastomeric one-way valve, duckbill valve, cross slit valve, and spring-loaded check valve.
75. The laparoscopic applicator according to any of the items 69-74, wherein the at least one valve is located in the delivery tube.
76. The laparoscopic applicator according to any of the items 69-75, wherein the at least one valve is located in the applicator tip.
77. The laparoscopic applicator according to any of the preceding items, wherein the applicator or applicator tip further comprises at least one actuator configured to open and/or close the at least one valve.
78. The laparoscopic applicator according to item 77, wherein the at least one actuator is configured to activate by a pressure force, e.g. applied by the robotic arm, or by an electrical current, e.g. applied by an energy tool.
79. The laparoscopic applicator according to any of the items 77-78, wherein the at least one actuator is activated by pulling the actuator along a longitudinal axis of the tube/applicator tip and/or by rotating the actuator around the longitudinal axis.
80. The laparoscopic applicator according to any of the items 77-79, wherein the at least one actuator is located at a distal end of the delivery tube.
81. The laparoscopic applicator according to any of the items 77-80, wherein the at least one actuator is located on the rigid section of the delivery tube.
82. The laparoscopic applicator according to any of the items 77-81, wherein the at least one actuator is located on the applicator tip.
83. The laparoscopic applicator according to any of the items 77-82, wherein the at least one actuator is located on an external device.
84. The laparoscopic applicator according to any of the items 77-83, wherein the at least one actuator is a pressure-sensitive button.
85. The laparoscopic applicator according to any of the items 77-84, wherein the at least one actuator covers a predefined circumferential section of the tube and/or applicator tip.
86. The laparoscopic applicator according to item 85, wherein the at least one actuator covers less than 180° of the circumference of the tube and/or applicator tip, preferably less than 140°.
87. The laparoscopic applicator according to any of the items 85-86, wherein two actuators are provided on opposite parts of the applicator tip and/or tube, each of said actuators covering less than 120° of the circumference of the tube and/or applicator tip, preferably less than 90° each.
88. The laparoscopic applicator according to any of the items 85-87, wherein the at least one actuator covers at least 180° of the circumference of the tube and/or applicator tip.
89. The laparoscopic applicator according to any of the items 85-88, wherein the at least one actuator covers 360° of the circumference of the tube and/or applicator tip, such that the at least one actuator surrounds a part of the tube and/or applicator tip.
90. The laparoscopic applicator according to any of the items 77-89, wherein the at least one actuator is configured to, upon activation, send an electrical signal to a pressure source, such as a drive mechanism, configured to exert a pressure sufficient to dispense the substance from the laparoscopic applicator.
91. The laparoscopic applicator according to any of the preceding items, wherein the applicator further comprises a first pressure sensor for sensing the pressure in the delivery tube.
92. The laparoscopic applicator according to any of the items 77-91, wherein the applicator further comprises a second pressure sensor for sensing the pressure applied to the actuator.
93. The laparoscopic applicator according to item 92, wherein the second pressure sensor is a resistive film pressure sensor and/or a force-sensitive resistor.
94. The laparoscopic applicator according to any of the items 77-93, wherein the at least one actuator is a pressure-sensitive button, wherein a pressure sensor for sensing the pressure applied to the actuator is integrated in said button or placed under the button.
95. The laparoscopic applicator according to any of the items 77-94, wherein the at least one actuator is a pressure-sensitive button covering a part of the applicator tip, said part surrounding the entire circumference of the applicator tip, wherein a second pressure sensor for sensing the pressure applied to the actuator is integrated in said button or placed under the button.
96. The laparoscopic applicator according to any of the items 77-95, wherein the applicator further comprises a pressure indicator light for indicating the pressure applied to the at least one actuator.
97. The laparoscopic applicator according to item 96, wherein the pressure indicator light is located in the applicator tip or on the applicator tip.
98. The laparoscopic applicator according to any of the items 96-97, wherein the pressure indicator light is provided as a circular band positioned along the circumference of the applicator tip.
99. The laparoscopic applicator according to any of the items 96-98, wherein the pressure indicator light is configured to:
display light of a first color, e.g. green, when the applied pressure is below a predefined first threshold; and
display light of a second color, e.g. red, when the applied pressure is above a predefined second threshold.
100. The laparoscopic applicator according to item 99, wherein the pressure indicator light is further configured to:
display light of a third color, e.g. yellow, when the applied pressure is between the predefined first and second thresholds.
101. The laparoscopic applicator according to any of the preceding items, wherein the applicator or applicator tip further comprises a status indicator, e.g. in the form of light diodes, said status indicator configured to indicate the remaining volume of substance in the applicator.
102. The laparoscopic applicator according to item 101, wherein the remaining volume is determined by the first positional sensor, the second positional sensor, the clock, and/or combinations thereof.
103. The laparoscopic applicator according to any of the items 101-102, wherein the applicator further comprises at least one fluid source comprising a plunger in a barrel, wherein the position of the plunger is used to estimate the remaining volume of substance in the delivery tube, wherein the remaining volume is indicated by the status indicator.
104. The laparoscopic applicator according to any of the items 101-103, wherein the status indicator is located in the applicator tip or on the applicator tip.
105. The laparoscopic applicator according to any of the preceding items, wherein the delivery tube comprises a first light sensitive sensor configured for sensing light of a pre-defined wavelength range passing through the delivery tube, and wherein:
the delivery tube comprises a light source positioned opposite the first light sensitive sensor; and/or
the delivery tube is transparent to at least a portion of the wavelength range.
106. The applicator according to item 105, wherein the first light sensitive sensor is positioned at a distal part of the delivery tube.
107. The applicator according to any of the items 105-106, wherein the delivery tube comprises a second light sensitive sensor located further away from the distal end than the first light sensitive sensor.
108. The laparoscopic applicator according to any of the preceding items, wherein the applicator tip further comprises a rigid section configured to be gripped by the robotic arm.
109. The laparoscopic applicator according to any of the preceding items, wherein the applicator tip further comprises an adjustable nozzle for adjusting the dispensing rate and or dispensing angle of the substance.
110. The applicator according to any of the preceding items, wherein the applicator tip and/or grip section comprises a nozzle at the distal end of the tip, wherein the nozzle is configured to discharge substance in a predefined geometry.
111. The applicator according to item 110, wherein the nozzle is configured to discharge substance in a predefined geometry selected from the group of: cylinder, planar, and corrugated planer.
112. The applicator according to any of items 110-111, wherein the cross sectional shape of the nozzle opening is selected from the group of: circular, rhombic, rectangular, curved rectangular, and concave rectangular.
113. The applicator according to any of items 110-112, wherein the height of the nozzle opening is between 0.5-1.0 mm.
114. The applicator according to any of items 110-113, wherein the nozzle lumen is diverging towards the distal end.
115. The applicator according to any of items 110-114, wherein the shape of the nozzle is selected from the group of: conic, spherically blunted conic, bi-conic, tangent ogive, elliptical, parabolic.

116. The applicator according to any of items 110-115, wherein the length of the nozzle lumen is between 2.0-3.5 mm.
117. The applicator according to any of the preceding items, wherein the connection between a nozzle unit and the grip section is abrupt or gradual, and/or configured to be detachable.
118. The laparoscopic applicator according to any of the preceding items, wherein the applicator further comprises at least one fluid source for holding a fluid, said fluid source being in fluid connection with the delivery tube.
119. The laparoscopic applicator according to item 118, wherein the at least one fluid source is a syringe such as a medical syringe, e.g. a single-use medical syringe.
120. The laparoscopic applicator according to item 119, wherein the syringe comprises a barrel for holding a fluid and a plunger for pushing the fluid out of the syringe.
121. The laparoscopic applicator according to item 120, wherein the applicator further comprises a second positional sensor configured for determining the position of the plunger.
122. The laparoscopic applicator according to item 121, wherein the second positional sensor is an optical sensor.
123. The laparoscopic applicator according to item 121, wherein the plunger is provided with a magnet, and wherein the second positional sensor is a magnetic sensor configured to detect the presence of the magnet.
124. The laparoscopic applicator according to any of the items 121-123, wherein the position of the plunger is used to estimate the remaining volume of substance in the barrel and/or in the delivery tube.
125. The laparoscopic applicator according to item 118, wherein the at least one fluid source is a container such as a container configured to be pressurized.
126. The laparoscopic applicator according to item 118, wherein the at least one fluid source is a flexible balloon.
127. The laparoscopic applicator according to any of the items 114-126, wherein the applicator comprises at least one connector, such as a Luer lock, a compression joint, and/or an adhesive joint, for detachably attaching the at least one fluid source.
128. The laparoscopic applicator according to item 127, wherein the at least one connector comprises a hollow piercing element for piercing the at least one fluid source, whereby a fluid connection between the fluid source and the delivery tube is established.
129. The laparoscopic applicator according to any of the items 114-126, wherein the at least one fluid source comprises a liquid such as a saline solution.
130. The laparoscopic applicator according to any of the items 114-129, wherein the at least one fluid source comprises a paste such as a haemostatic paste comprising a haemostatic agent.
131. The laparoscopic applicator according to any of the items 114-130, wherein the at least one fluid source comprises a gas.
132. The laparoscopic applicator according to item 131, wherein the gas is selected from the group of $CO_2$ (carbon dioxide), $N_2$ (dinitrogen), $N_2O$ (nitrous oxide), and air.
133. The laparoscopic applicator according to any of the items 114-131, wherein the delivery tube and the at least one fluid source comprises the same substance, such as a substance comprising a haemostatic agent, the substance provided in the form of a liquid, a paste, or a powder, such that the at least one fluid source constitutes a first substance reservoir.
134. The laparoscopic applicator according to item 133, wherein the first substance reservoir comprises a barrel for holding the substance and a piston for pushing the substance out of the barrel.
135. The laparoscopic applicator according to item 134, wherein the barrel has a diameter between 10-30 mm, more preferably between 12-20 mm, and most preferably between 14-18 mm.
136. The laparoscopic applicator according to any of items 133-135, comprising one or more second substance reservoir(s).
137. The laparoscopic applicator according to any of items 133-136, wherein the second substance reservoir(s) are detachably attached to the first substance reservoir via at least one auxiliary connector element.
138. The laparoscopic applicator according to item 137, wherein the auxiliary connector element comprises a Luer lock, a compression joint, or an adhesive joint.
139. The laparoscopic applicator according to any of items 137-138, wherein the auxiliary connector element is configured for establishing a sequential fluid connection between 1) the first and second substance reservoirs, and 2) the first substance reservoir and the delivery tube.
140. The laparoscopic applicator according to any of items 137-139, wherein the auxiliary connector element is adapted to have a first configuration proving a fluid passageway between the first and second substance reservoirs, and a second configuration providing a fluid passageway between the first substance reservoir and the delivery tube.
141. The laparoscopic applicator according to any of items 137-140, wherein the auxiliary connector element comprises at least one one-way valve.
142. The laparoscopic applicator according to any of items 133-141, wherein the first and/or second substance reservoirs are disposable.
143. The laparoscopic applicator according to any of the items 114-142, wherein the at least one fluid source is configured to be pressurized, e.g. by use of a pressure source.
144. The laparoscopic applicator according to any of the items 114-143, wherein the applicator comprises at least two fluid sources.
145. The laparoscopic applicator according to any of the preceding items, wherein the delivery tube is configured for holding the substance under a pressure or holding a pressurized substance.
146. The laparoscopic applicator according to any of the preceding items, wherein the applicator further comprises at least one pressure source configured for applying a pressure to the at least one fluid source and/or configured for applying a pressure to the inside of the delivery tube, such as the substance within the delivery tube.
147. The laparoscopic applicator according to item 146, wherein the delivery tube is configured for being loaded with substance from the distal end.
148. The laparoscopic applicator according to item 147, wherein the delivery tube comprises one or more detachably attached connectors for a substance reservoir, and/or a flow controlling element.

149. The laparoscopic applicator according to any of items 146-148, wherein the at least one pressure source is a spring configured to exert a pressure on the at least one fluid source, and/or the substance within the delivery tube.
150. The laparoscopic applicator according to item 149, wherein the spring energy is pre-stored, and/or wherein the spring energy is stored upon loading the delivery tube.
151. The laparoscopic applicator according to any of items 146-148, wherein the at least one pressure source is a gas configured to exert a pressure on the at least one fluid source, and/or the substance within the delivery tube.
152. The laparoscopic applicator according to item 150, wherein the gas pressure source is selected from the group of: gas cartridges, motorized bellows, -propellers, -compressors, and combinations thereof.
153. The laparoscopic applicator according to item 146-152, wherein the at least one pressure source comprises a propellant, selected from the group of: spring loaded element, gaseous propellant, inflatable balloon or bladder, and/or moveable piston, such as an electrically driven piston or a manually driven piston.
154. The laparoscopic applicator according to item 146-153, wherein the at least one pressure source is a drive mechanism, selected from the group of: manual piston, motorized piston, spring force, and gas pressure, such as a motor, comprising at least one piston configured to exert a pressure on the at least one fluid source.
155. The laparoscopic applicator according to item 154, wherein the drive mechanism is an electric motor.
156. The laparoscopic applicator according to any of the items 154-155, wherein the at least one actuator is configured to, upon activation, send an electrical signal to the drive mechanism, whereby, upon receipt of said electrical signal, the drive mechanism is configured to exert a pressure on the at least one fluid source such that the substance is dispensed from the laparoscopic applicator.
157. The laparoscopic applicator according to any of the items 154-156, wherein the drive mechanism comprises two pistons, wherein a first piston is configured to exert a first pressure on a first fluid source and a second piston is configured to exert a second pressure on a second fluid source.
158. The laparoscopic applicator according to item 157, wherein the drive mechanism comprises a switching mechanism, such as a gear mechanism, configured to switch between operating the first piston and/or the second piston.
159. The laparoscopic applicator according to any of the items 154-158, wherein the drive mechanism further comprises a direction control configured to control the direction (forward or reverse) of the at least one piston.
160. The applicator according to any of the preceding claims, comprising a pressure source configured for applying a pressure to the inside of the delivery tube, comprising a piston drive mechanism, wherein the piston is configured to be retractable.
161. The laparoscopic applicator according to any of the preceding items, wherein the applicator further comprises a rigid sheath surrounding at least a part of the delivery tube, wherein the sheath is configured such that the delivery tube may be inserted into a trocar.
162. The laparoscopic applicator according to any of the preceding items, wherein the applicator further comprises a driver unit for holding:
    at least one fluid source for holding a fluid, said fluid source being in fluid connection with the delivery tube; and/or
    at least one pressure source configured for applying a pressure to the at least one fluid source and/or configured for applying a pressure to the inside of the delivery tube.
163. The laparoscopic applicator according to item 162, wherein the laparoscopic applicator comprises a syringe having a barrel for holding substance fluid and a plunger for pushing the fluid out of the syringe and/or for withdrawing a substance into the syringe, wherein the driver unit is configured for receiving and holding the syringe.
164. The laparoscopic applicator according to item 163, wherein the driver unit is further configured for withdrawing the plunger, such that a substance is withdrawn into the applicator.
165. The laparoscopic applicator according to any of the preceding items, wherein the delivery tube and/or the at least one fluid source are disposable.
166. The laparoscopic applicator according to any of the preceding items, wherein the applicator further comprises a safety mechanism configured for switching between two modes (on/off), wherein the 'off mode' means that no substance can be released from the applicator and the 'on mode' means that substance can be released.
167. The laparoscopic applicator according to item 166, wherein the safety mechanism is located on the delivery tube or the applicator tip or the driver unit.
168. The laparoscopic applicator according to any of the preceding items, wherein the applicator further comprises a flow controller configured for controlling the flow rate of the substance to be released from the applicator.
169. The laparoscopic applicator according to item 168, wherein the flow controller is located in the driver unit.
170. A laparoscopic applicator tip for connecting to a laparoscopic delivery tube for holding a substance such as a substance comprising a haemostatic agent, the applicator tip comprising:
    at least one valve configured for releasing the substance from the delivery tube upon opening of said valve; and
    at least one actuator configured to open/close the at least one valve.
171. The laparoscopic applicator tip according to item 170, wherein the at least one valve is configured for holding and releasing the substance under a pressure.
172. The laparoscopic applicator tip according to any of items 170-171, wherein the applicator tip further comprises a pressure sensor, such as a resistive film pressure sensor, for sensing the pressure applied to the actuator.
173. The laparoscopic applicator tip according to any of the items 170-172, wherein the applicator tip further comprises a pressure indicator light for indicating the pressure applied to the at least one actuator.
174. The laparoscopic applicator tip according to any of the items 170-173, wherein the applicator tip further comprises a status indicator, e.g. in the form of light diodes, said status indicator configured to indicate the remaining volume of substance in the delivery tube.

175. The laparoscopic applicator tip according to any of the items 170-174, wherein the applicator tip or grip section further comprises a rigid section configured to be gripped by the robotic arm.

176. The laparoscopic applicator tip according to any of the items 170-175, wherein the applicator tip further comprises an adjustable nozzle for adjusting the dispensing rate and or dispensing angle of the substance.

177. A laparoscopic applicator for dispensing or withdrawing a substance, such as a substance comprising a haemostatic agent, at a selected site by means of a surgical robotic arm, the applicator comprising:
a delivery tube for holding the substance; and
an applicator tip according to any of the items 170-176, the applicator tip being connected to a distal end of the delivery tube, wherein the applicator tip is configured for:
being spatially manipulated by the robotic arm, and/or
controllably releasing the substance from the delivery tube by the robotic arm, or controllably withdrawing the substance from the selected site into the delivery tube.

178. A kit of parts comprising: a laparoscopic applicator according to any of items 1-169, one or more pressure sources, and optionally one or more fluid sources, such as one or more substance reservoirs.

179. The kit of parts according to item 178, wherein the substance reservoirs are one or more syringes configured to be filled with a substance and configured for forming a fluid connection to the delivery tube, preferably the distal opening of the delivery tube.

180. The kit of parts according to any of items 178-179, wherein the pressure source is one or more gas cartridges configured for forming a fluid connection to the delivery tube, preferably the proximal opening of the delivery tube.

181. The kit of parts according to any of items 178-180, wherein the pressure source is integrated into the applicator, optionally the pressure source is a spring at a proximal end of the delivery tube.

182. A kit of parts comprising:
a laparoscopic applicator according to any of the items 1-169; and
a driver unit for holding:
at least one fluid source for holding a fluid, said fluid source being in fluid connection with the delivery tube; and/or
at least one pressure source, such as a motor, configured for applying a pressure to the at least one fluid source and/or configured for applying a pressure to the inside of the delivery tube.

183. The kit of parts according to item 182, wherein the kit of parts further comprises at least one fluid source for holding a fluid, said fluid source being in fluid connection with the delivery tube.

184. The kit of parts according to any of the items 182-183, wherein the kit of parts further comprises at least one pressure source configured for applying a pressure to the at least one fluid source and/or configured for applying a pressure to the inside of the delivery tube.

185. The kit of parts according to any of the items 182-184, the kit of parts further comprising at least one fluid source, said fluid source being a syringe having a plunger, wherein the driver unit further comprises a positional sensor configured for determining the position of the plunger.

186. The kit of parts according to any of the items 182-185, wherein the driver unit is configured to hold at least two fluid sources, such as at least two syringes.

187. Use of the laparoscopic applicator according to any of the items 1-169 to dispense a substance, such as a substance comprising a haemostatic agent, from the applicator.

The invention claimed is:

1. A laparoscopic applicator for dispensing a substance comprising a haemostatic agent, at a selected site by means of a surgical robotic arm, the laparoscopic applicator comprising:
a delivery tube; and
an applicator tip connected to a distal end of the delivery tube, the applicator tip controllably operated by the robotic arm by a grip section in axial extension of the delivery tube, the grip section having a perimeter transverse to the axis comprising an apex shaped section, such that the grip section is configured for being clamped and spatially manipulated by the robotic arm,
wherein the applicator tip controllably releases a substance from the delivery tube by the robotic arm, by an activation section configured to be subjected to a predefined force by the robotic arm.

2. The applicator according to claim 1, wherein at least a part of the delivery tube is configured to be tension free flexible.

3. The applicator according to claim 1, further comprising an insertion guide for supporting the delivery tube, wherein the insertion guide is slidable along the axial direction of the delivery tube.

4. The applicator according to claim 1, wherein the apex shaped section is selected from the group of: rounded apex, obtuse apex, acute apex, acuminate apex, and combinations thereof.

5. The applicator according to claim 1, wherein the perimeter has a shape selected from the group of: ellipse, oval with one axis of symmetry, oval with two axes of symmetry, equilateral triangle, isosceles triangle, scalene triangle, parallelogram, and rhombus.

6. The applicator according to claim 1, wherein the perimeter shape is defined by a major axis defining the longest dimension, and a minor axis defining the shortest dimension.

7. The applicator according to claim 6, wherein the major axis is between 2.5 mm-5.2 mm, and/or wherein the minor axis is between 2.5 mm-3.5 mm.

8. The applicator according to claim 1, wherein the grip section has a length of between 20 mm-25 mm or between 30 mm-35 mm.

9. The applicator according to claim 1, wherein the grip section comprises a connection section in fluid communication with the delivery tube.

10. The applicator according to claim 1, wherein the applicator tip and/or grip section comprises a magnetic element configured for magnetically attaching the tip to a surgical instrument.

11. The applicator according to claim 1, wherein the activation section is located in axial extension of the grip section.

12. The applicator according to claim 1, wherein the activation section is coinciding with the grip section.

13. The applicator according to claim 1, wherein the applicator tip and/or grip section comprises a nozzle at the distal end of the tip, wherein the nozzle is configured to discharge substance in a predefined geometry.

14. The applicator according to claim 13, wherein a lumen of the nozzle is diverging towards the distal end.

15. The applicator according to claim 13, wherein a shape of the nozzle is selected from the group of: conic, spherically blunted conic, bi-conic, tangent ogive, elliptical, parabolic.

16. The applicator according to claim 1, further comprising a nozzle unit, wherein a connection between the nozzle unit and the grip section is abrupt or gradual.

17. The applicator according to claim 1, the applicator tip and/or grip section comprising one or more light sources, detection sensors, and/or cameras.

18. The applicator according to claim 1, comprising one or more lumens configured for receiving one or more signal carriers.

19. The applicator according to claim 1, comprising a pressure source applying a pressure to an inside of the delivery tube, comprising a piston drive mechanism having a piston, wherein the piston is configured to be retractable.

20. A laparoscopic applicator for dispensing a substance comprising a haemostatic agent, at a selected site by a surgical robotic arm, the laparoscopic applicator comprising:
- a delivery tube,
- an applicator tip connected to a distal end of the delivery tube, the applicator tip controllably operated by the robotic arm by a grip section in axial extension of the delivery tube, the grip section having a perimeter transverse to an axis comprising an apex shaped section, such that the grip section is configured for being clamped and spatially manipulated by the robotic arm, and
- an insertion guide for supporting the delivery tube, wherein the insertion guide is slidable along the axial direction of the delivery tube.

* * * * *

UNITED STATES PATENT AND TRADEMARK OFFICE
CERTIFICATE OF CORRECTION

| | | |
|---|---|---|
| PATENT NO. | : 12,490,964 B2 | Page 1 of 1 |
| APPLICATION NO. | : 18/568044 | |
| DATED | : December 9, 2025 | |
| INVENTOR(S) | : Peter Lund Hammershøj et al. | |

It is certified that error appears in the above-identified patent and that said Letters Patent is hereby corrected as shown below:

In the Claims

In Column 60, Lines 13-14, delete "means of"

Signed and Sealed this
Twentieth Day of January, 2026

John A. Squires
*Director of the United States Patent and Trademark Office*